US008126991B2

(12) United States Patent
Smith et al.

(10) Patent No.: US 8,126,991 B2
(45) Date of Patent: Feb. 28, 2012

(54) METHODS AND SYSTEMS FOR VALIDATING REAL TIME NETWORK COMMUNICATIONS

(75) Inventors: Michael Smith, Paletine, IL (US); Frank Giannantonio, Verona, WI (US)

(73) Assignee: Ticketmaster, LLC, West Hollywood, CA (US)

( * ) Notice: Subject to any disclaimer, the term of this patent is extended or adjusted under 35 U.S.C. 154(b) by 269 days.

(21) Appl. No.: 12/204,648

(22) Filed: Sep. 4, 2008

(65) Prior Publication Data
US 2009/0063667 A1 Mar. 5, 2009

Related U.S. Application Data

(60) Provisional application No. 60/969,884, filed on Sep. 4, 2007.

(51) Int. Cl.
*G06F 15/177* (2006.01)
(52) U.S. Cl. ........................................................ 709/222
(58) Field of Classification Search .................. 709/220, 709/221, 222, 223
See application file for complete search history.

(56) References Cited

U.S. PATENT DOCUMENTS

| | | |
|---|---|---|
| 5,095,196 A | 3/1992 | Miyata |
| 5,408,417 A | 4/1995 | Wilder |
| 5,496,991 A | 3/1996 | Delfer et al. |
| 5,581,461 A | 12/1996 | Coll et al. |
| 5,724,520 A | 3/1998 | Goheen |
| 5,794,207 A | 8/1998 | Walker et al. |
| 5,797,126 A | 8/1998 | Helbing et al. |
| 5,797,127 A | 8/1998 | Walker et al. |
| 5,818,914 A | 10/1998 | Fujisaki |
| 5,835,896 A | 11/1998 | Fisher et al. |
| 5,845,265 A | 12/1998 | Woolston |
| 6,023,685 A | 2/2000 | Brett et al. |
| 6,047,264 A | 4/2000 | Fisher et al. |

(Continued)

FOREIGN PATENT DOCUMENTS

AU      2000229843      8/2006

(Continued)

OTHER PUBLICATIONS

Hes, et al. "At Face Value" On biometrical identification and privacy, Registratiekamer, Sep. 1999; 78 pages.

(Continued)

*Primary Examiner* — Joseph Avellino
*Assistant Examiner* — Marshall McLeod
(74) *Attorney, Agent, or Firm* — Knobbe, Martens, Olson & Bear LLP

(57) ABSTRACT

Methods and systems for managing network communications are described. An example resource management system includes a communications manager configured to access information regarding communication protocols used by corresponding broker systems and to provide message translations based on an origin and/or destination of the message to be transmitted. A message processor is coupled to the communications manager and is configured to serialize incoming and/or outgoing broker messages and to facilitate queuing of incoming and outgoing message traffic with broker systems. A communications configurer is configured to track one or more communication attributes of broker systems and changes thereto to ensure communications between the resource management systems are broker systems are conducted in accordance with the communication attributes of the broker systems. A communications rules provider is configured to determine which broker system is to be communicated with in order to fulfill a resource request.

78 Claims, 18 Drawing Sheets

U.S. PATENT DOCUMENTS

| | | | |
|---|---|---|---|
| 6,067,532 A | 5/2000 | Gebb | |
| 6,085,169 A | 7/2000 | Walker et al. | |
| 6,094,640 A | 7/2000 | Goheen | |
| 6,107,932 A | 8/2000 | Walker et al. | |
| 6,119,096 A | 9/2000 | Mann et al. | |
| 6,240,396 B1 | 5/2001 | Walker et al. | |
| 6,243,691 B1 | 6/2001 | Fisher et al. | |
| 6,418,415 B1 | 7/2002 | Walker et al. | |
| 6,470,394 B1 | 10/2002 | Bamforth et al. | |
| 6,484,153 B1 | 11/2002 | Walker et al. | |
| 6,496,809 B1 | 12/2002 | Nakfoor | |
| 6,658,390 B1 | 12/2003 | Walker et al. | |
| 6,704,489 B1 | 3/2004 | Kurauchi et al. | |
| 6,704,713 B1 | 3/2004 | Brett | |
| 6,829,644 B2 | 12/2004 | Aufderheide | |
| 6,850,901 B1 | 2/2005 | Hunter et al. | |
| 6,854,010 B1 | 2/2005 | Christian et al. | |
| 6,907,405 B2 | 6/2005 | Brett | |
| 6,937,998 B1 | 8/2005 | Swartz et al. | |
| 6,952,737 B1 | 10/2005 | Coates et al. | |
| 6,999,936 B2 | 2/2006 | Sehr | |
| 7,124,062 B2 | 10/2006 | Gebhart | |
| 7,162,454 B1 | 1/2007 | Donner et al. | |
| 7,171,472 B2 | 1/2007 | O'Brien et al. | |
| 7,333,943 B1 | 2/2008 | Charuk et al. | |
| 7,849,133 B2 | 12/2010 | Denker et al. | |
| 7,865,379 B2 | 1/2011 | Sussman et al. | |
| 2001/0018660 A1 | 8/2001 | Sehr | |
| 2002/0029296 A1 | 3/2002 | Anuff et al. | |
| 2002/0035605 A1 | 3/2002 | McDowell et al. | |
| 2002/0042729 A1 | 4/2002 | Yajima et al. | |
| 2002/0095383 A1 | 7/2002 | Mengin et al. | |
| 2002/0116343 A1 | 8/2002 | Nakamura et al. | |
| 2002/0138771 A1 | 9/2002 | Dutta | |
| 2002/0143860 A1 | 10/2002 | Catan | |
| 2002/0178226 A1 | 11/2002 | Anderson et al. | |
| 2002/0188523 A1 | 12/2002 | Hyyppa et al. | |
| 2002/0194267 A1 | 12/2002 | Flesner et al. | |
| 2003/0023500 A1 | 1/2003 | Boies et al. | |
| 2003/0024988 A1 | 2/2003 | Stanard | |
| 2003/0036966 A1 | 2/2003 | Amra et al. | |
| 2003/0093387 A1 | 5/2003 | Nakfoor | |
| 2004/0015409 A1* | 1/2004 | Chittenden et al. | 705/26 |
| 2005/0015303 A1 | 1/2005 | Dubin et al. | |
| 2005/0021364 A1 | 1/2005 | Nakfoor | |
| 2005/0021365 A1 | 1/2005 | Nakfoor | |
| 2005/0021450 A1 | 1/2005 | Nakfoor | |
| 2005/0144115 A1 | 6/2005 | Brett | |
| 2006/0046717 A1* | 3/2006 | Bovell et al. | 455/432.3 |
| 2006/0069780 A1 | 3/2006 | Batni et al. | |
| 2006/0082439 A1 | 4/2006 | Bazakos et al. | |
| 2006/0085308 A1* | 4/2006 | Metzger | 705/34 |
| 2006/0095344 A1 | 5/2006 | Nakfoor | |
| 2006/0126201 A1 | 6/2006 | Jain | |
| 2006/0155857 A1 | 7/2006 | Feenan et al. | |
| 2006/0271462 A1 | 11/2006 | Harmon | |
| 2006/0277130 A1 | 12/2006 | Harmon | |
| 2007/0027794 A1 | 2/2007 | Brett | |
| 2007/0027798 A1 | 2/2007 | Brett | |
| 2007/0033131 A1 | 2/2007 | Brett | |
| 2007/0038582 A1 | 2/2007 | Brett | |
| 2007/0124232 A1 | 5/2007 | Brett | |
| 2007/0124259 A1* | 5/2007 | Sussman et al. | 705/400 |
| 2008/0021998 A1 | 1/2008 | Wentink | |
| 2008/0243838 A1 | 10/2008 | Scott et al. | |
| 2010/0106653 A1 | 4/2010 | Sandholm et al. | |

FOREIGN PATENT DOCUMENTS

| | | |
|---|---|---|
| AU | 2006203419 | 1/2008 |
| EP | 0 370 146 A | 5/1990 |
| EP | 1 054 335 A2 | 11/2000 |
| WO | WO 98/10361 | 3/1998 |
| WO | WO 99/06928 | 2/1999 |
| WO | WO 99/18533 | 4/1999 |
| WO | WO 99/38129 | 7/1999 |
| WO | WO 00/28485 | 5/2000 |
| WO | WO 01/03040 A1 | 1/2001 |
| WO | WO 01/39055 | 5/2001 |
| WO | WO 01/52139 A1 | 7/2001 |

OTHER PUBLICATIONS

Fujimura, "XML Ticket: Generalized Digital Ticket Definition Language", The W3C Signed XML Workshop—Copyright © 1999, 33 pages.

Matsuyama, et al. "Distributed Digital-Ticket Management for Rights Trading System", E-Commerce, 1999; pp. 110-118.

In Shirley Siu Weng, "*A Proposed* Electronic Ticket Management for trading Service in Internet", Feb. 9, 2001; 7 pages.

Article from Smart Card News, "Major Players Form Proton World International", Aug. 1998, pp. 141-160.

Fujimura, et al. "General-purpose Digital Ticket Framework", NTT Information and Communication Systems Labs, USENIX Workshop on Electronic Commerce; Aug. 31-Sep. 1998.

Fujimura, et al. "Digital-Ticket-Controlled Digital Ticket Circulation", NTT Information Sharing Platform Laboratories, USENIX Security Symposium, Aug. 23-26, 1999.

Chui, et al. "Auction on the Internate—A Preliminary Study", Department of Marketing, HK Univiersity of Science and Technology; 1999, pp. 1-7.

Asokan, et al. "SEMPER Consortium: Advanced Services, Architecture and Design", Deliverable D10 of ACTS Project AC026, Mar. 15, 1999.

U.S. Appl. No. 09/702,794, filed Nov. 1, 2000.

International Search Report and Written Opinion (dated Apr. 11, 2008); International Application No. PCT/US07/86651; Filed Dec. 6, 2007.

Article from Website; Tech Web; "Byter Up: Ballparks Go High-Tech"; Mar. 31, 1999 (4 pages).

Article from Website; Sports Venue Technology; "Pacific Bell Park, San Francisco"; (5 pages).

"Acteva and Enspot.com Sign Agreement to Provide On-Line Ticketing, Broader Distribution", Business Wire (Dec. 3, 1999).

"AuctionNet Still One-Of-A-Kind", Automotive News, S12 (Sep. 20, 1993).

"Cathay Pacific Airways Auctions a Boeing 747-400 Worth of Seats in Third Cybertraveler Auction", Business Wire (Apr. 29, 1996).

"Cathay Pacific Airways-USA Receives More than 1,300 Bids During First Five Days of CyberAuction", Business Wire (Oct. 18, 1995).

"Cathay Pacific Airways-USA to Hold First-Ever Internet CyberAuction", Business Wire (Sep. 26, 1995).

"E-TicketBoard Launches PSL Xchange for Eight NFL Teams", PR Newswire (Jul. 18, 00).

"E-TicketBoard Launches Revolutionary New Site—SeatsandSuites", PR Newswire (Oct. 17, 00).

"Keyware Unveils Multi-Application Smart Card Suite", Card News, vol. 16, No. 10 (May 30, 2001).

"Online Movie Ticket Site Launched in China", China Online (Dec. 23, 1999).

"OnSale Brings Thrill of the Auction to the Web", Link-up p. 34 (Jul./Aug. 1995).

"Season Ticket Solutions Announces Availability of Ticket Exchange for Sporting Teams and Entertainment Venues", Business Wire (Jul. 30, 2001).

"WBGH to Hold Online Computer Auction", Link-Up, p. 10 (Sep./Oct. 1988).

Banâtre, "Distributed Auction Bidding System", International Computing Symposium, vol. 4, No. 4 (Aug. 1981).

Banks, "PSL Put Owners on the Hot Seat", St. Petersburg Times, p. 10C (Oct. 31, 1993).

Beam et al, "Electronic Negotiation through Internet-Based Auctions", CITM Working Paper 96-WP-1019, http://haas.berkeley.edu/citm/publications/papers/wp-1019.pdf (Dec. 1996).

Blau, "Dormitories See Departure from Previous Years' Trends", The Tech, vol. 116, No. 38 (Aug. 30, 1996).

Boyes et al, "Auctions as an Allocation Mechanism in Academia: The Case of Faculty Offices", Journal of Economic Perspectives, vol. 3, No. 3, pp. 37-40 (Summer 1989).

Collier, "Columbia, S.C.-Based Internet Firm Helps Buy, Sell Sports Tickets", The State, (Oct. 23, 2000).
Dickey, "Raider PSL Without Permanent Place", San Francisco Chronicle, p. B2 (Jun. 26, 1997).
Dickey, "Raiders' PSLs May Be for Life", San Francisco Chronicle, p. D5 (Mar. 26, 1997).
Fisher, "Secondary Market in Consolidation Mode", Street & Smith's Sports Business Journal, p. 3 (Jul. 23, 2007).
Flint, "Cyber Hope or Cyber Hype?", Air Transport World (Oct. 1996).
Garza, "Space Cruise", Reason (May 2000).
Happel, et al.; "*Creating a Futures Market for Major Event Tickets: Problems and Prospects*"; *Cato Journal*, vol. 21, No. 3; 2002 (pp. 443-461.
Harlan, "At Least it isn't the Team's Ball that's in Somebody Else's Court", Wall Street Journal (Jun. 4, 1991).
Holbrook, "Oakland, Calif., Professional Football Team Sees Gain in Seat License Sales", Contra Costa Times (Feb. 26, 2001).
Hylton, "Dorm Lottery Starts Strong", The Tech, vol. 114, No. 34 (Aug. 29, 1994).
Jackson, "Media Futures: This Bazaar Could Put Retailers Under the Hammer", Financial Times (May 25, 1995).
Jenkins, "Giants Draw Fans into Web Team Helps Season-Ticket Holders Get Mileage Out of Plans", USA Today, p. 3C (Jun. 27, 2000).
Kasper, "Purchase Griz Playoff Tickets Now", Missoulian Online (May 3, 2001).
Koenig, "Texas Firm Links Sports Teams, Fans", Amarillo Globe-News, Feb. 20, 2000).
Kravets, "Going, Going, Gone! Real Estate Auctions in the 90s", Probate & Property, p. 38 (May/Jun. 1993).
Kroll et al, "The Commodity Futures Market Guide", Harper and Row, pp. 9-10 (1973).
Kumar, "With Stars in their Eyes, Travelers Look to Space", St. Petersburg Times, p. 1A (Jun. 11, 2000).
Labuszewski et al, "Inside the Commodity Option Markets", John Wiley & Sons, pp. 19-21 (1985).
Liao, "Sloan's Class Priority System Set to Go", The Tech, vol. 116, No. 25 (May 10, 1996).
Martin, "LiquidSeats Helps Fill the House, Sans Scalping" cnn.com, (Dec. 14, 2000).
Matsumoto et al, "Feasibility of Space Tourism 'Cost Study for Space Tour'", Proceedings of 40th IAF Congress, Paper IAF-89-700 (1989).
Menezes et al, "Simultaneous Pooled Auctions", The Journal of Real Estate Finance and Economics, vol. 17(3), pp. 219-232 (Nov. 19, 1996).
Moldovanu et al, "The Optimal Allocation of Prizes in Contests", http://www.sfb504.uni-mannheim.de/publications/dp99-75.pdf (Jul. 14, 1999).
Muret, "More Teams Gearing up to Offer Option of Stored-Credit Tickets", Street & Smith's Sports Business Journal, p. 12 (Jul. 9, 2007).
Nestor et al, "Transforming Tickets from a Commodity into a Valuable Strategic Asset", Global eTicket Exchange whitepaper, Oct. 13, 2000.
O'Neil, "Q and A", St. Louis Post-Dispatch, p. 4D (Jan. 19, 1995).
Pelline, "Cathay Pacific to Auction Off Airline Tickets on the Internet", San Francisco Chronicle, p. C4 (Apr. 30, 1996).
Riley et al, "Optimal Auctions", The American Economic Review, vol. 71, No. 3, pp. 381-392 (Jun. 1981).
Rosen et al, "Ticket Pricing", University of Chicago Center for the Study of the Economy and the State (Sep. 1995).
Rubel, "ETM to Ticketmaster: Let's Rock", Marketing News (Jun. 19, 1995).
Shulman, "VICS and Quick Response: Priority Issues for Mass Merchandisers", Supermarket Business, vol. 44, No. 10, p. 13(4) (Oct. 1989).
Stevenson, "Frosh Get at Least Fifth Choice Dorm: Women Find Shortage of Single-Sex Rooms", The Tech, vol. 115, No. 37 (Aug. 31, 1995).
Thomas, "Deadline Looms for Playoff Tickets; PSL Owners Have Until Dec. 8 to Make Purchase", St. Louis Post-Dispatch, p. D8 (Dec. 3, 1999).
Vanderporten, "Strategic Behavior in Pooled Condominium Auctions", Journal of Urban Economics 31, pp. 123-137 (1992).
Waddell, "Advantix, Tickets.com Hope Merger Brings Best of Both Ticketing Worlds", Amusement Business (Feb. 8, 1999).
Wagner, "How Retailers are Using Web Auctions to Let Customers Help Them Set Prices", http://www.internetretailer.com/printArticle.asp?id=3164 (Mar. 2001).
Weiner, "Are the Days Numbered for the Paper Ticket?", Street & Smith's Sports Business Journal, p. 17 (Jun. 18, 2007).
www.TicketOptions.com Web Pages, as retreived from archive.org (2001).
wwwSeasonTicket.com Web Pages, as retreived from archive.org (2001).
Zoltak, "Advantix Acquisitions Continue with Protix Deal", Amusement Business (Nov. 2, 1998).
Invitation to Pay Additional Fees and Partial International Search Report; International Appln. No. PCT/US2008/075265; mailed Apr. 15, 2009.
International Search Report and Written Opinion; International Application No. PCT/US2008/075265; date of mailing: Jun. 24, 2009.

* cited by examiner

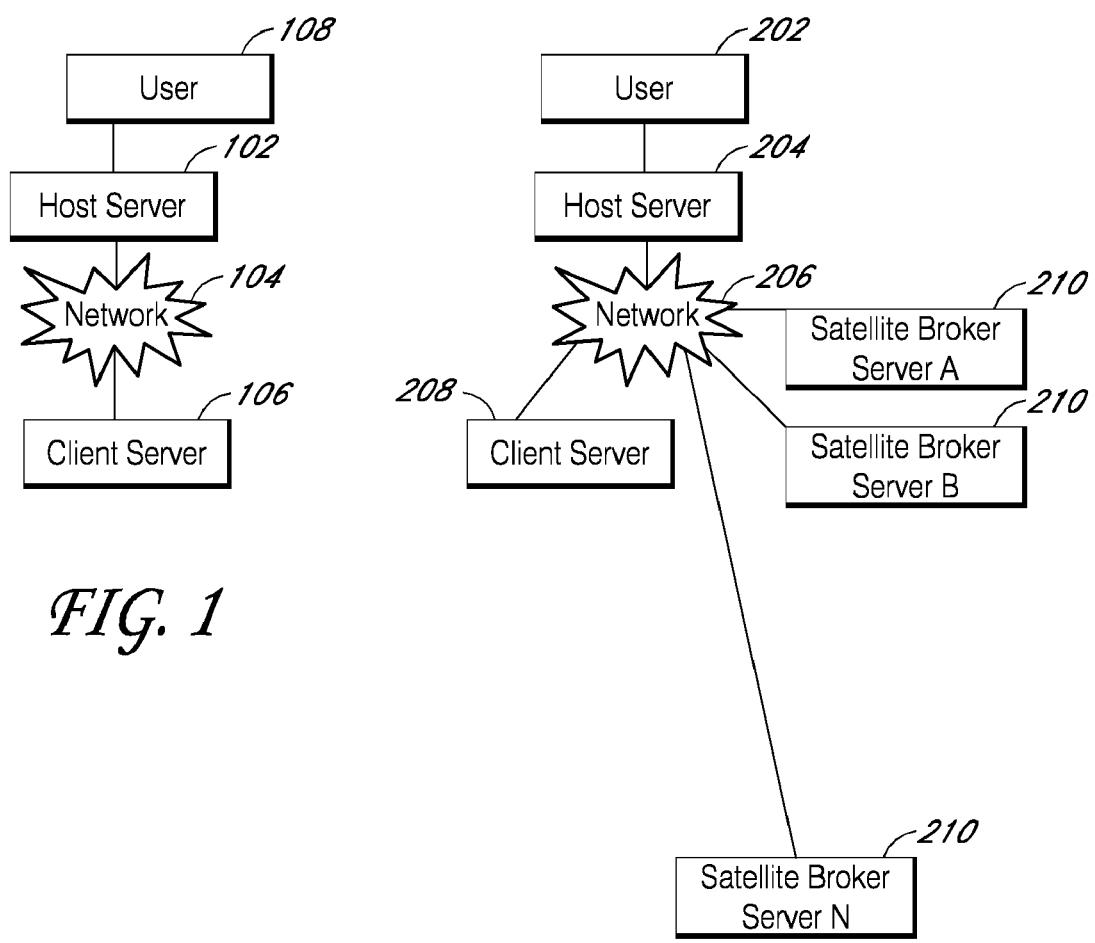

FIG. 4

Full Automation - Microsoft Internet Explorer provided by TicketsNow.com

File  Edit  View  Go  Favorite  Help

Address: http://Indev11:8080/brokerconnections/default.aspx

Full Automation - Wednesday, July 30, 2008

Client Dashboard | Orders Chart

| | | | EIBO versions | FA Agent versions |
|---|---|---|---|---|
| 295 | 80.82 % | Broker is connected and ready to accept orders (if activated) | 1.3.305.0 - 310 | 1.0.0.10 - 287 |
| 345 | 94.52 % | Broker activated for Full Automation orders | 1.3.731.0 - 16 | 1.0.1.201 - 68 |
| 19 | 5.21 % | No report for more than 5 minutes | 1.3.816.0 - 34 | N/A - 10 |
| 41 | 11.23 % | No report for more than a day | N/A - 4 | |
| 10 | 2.74 % | Have not upgraded yet | Non Eibo - 1 | |
| 365 | | Total | | |

[Refresh]

| ID | Broker | Last Connected | EIBO Version | Agent Version | Plugin Version | Activated |
|---|---|---|---|---|---|---|
| 1494 | AK Tickets | 07/22/08 04:22 PM | 1.3.305.0 | 1.0.0.10 | EIBO v1.0.0.10 | Yes |
| 498 | Go Tickets.com- NATB Member | 07/30/08 02:00 PM | 1.3.305.0 | 1.0.0.10 | EIBO v1.0.0.10 | Yes |
| 1457 | Ticket Cyclone | 07/25/08 02:05 PM | 1.3.305.0 | 1.0.0.10 | EIBO v1.0.0.10 | Yes |
| 1346 | StubWorld | 07/25/08 02:05 PM | 1.3.305.0 | 1.0.0.10 | EIBO v1.0.0.10 | Yes |
| 1538 | WahooTickets.com | 07/25/08 02:05 PM | 1.3.305.0 | 1.0.0.10 | EIBO v1.0.0.10 | Yes |
| 1558 | Special Ticket Entertainment | 07/25/08 02:05 PM | 1.3.305.0 | 1.0.1.201 | EIBO v1.1.0.0 | Yes |
| 30 | Preferred Tickets dba TicketsUpClose.com | 07/25/08 02:05 PM | 1.3.816.0 | 1.0.0.10 | EIBO v1.0.0.10 | Yes |
| 1229 | Bay State Tickets & Travel- NATB Member | 07/25/08 02:05 PM | 1.3.816.0 | 1.0.0.10 | EIBO v1.0.0.10 | Yes |
| 1521 | National Events Concierge Service | 07/25/08 02:05 PM | 1.3.305.0 | 1.0.0.10 | EIBO v1.0.0.10 | Yes |
| 1541 | One Ticket Stop | 07/25/08 02:05 PM | 1.3.305.0 | 1.0.0.10 | EIBO v1.0.0.10 | Yes |
| 1503 | Best Tickets Direct | 07/25/08 02:05 PM | 1.3.305.0 | 1.0.1.201 | EIBO v1.1.0.0 | Yes |
| 1535 | Grizzly Tickets | 07/25/08 02:05 PM | 1.3.816.0 | 1.0.0.10 | EIBO v1.0.0.10 | Yes |
| 1474 | I Need 2 Tickets | 07/25/08 02:05 PM | 1.3.305.0 | 1.0.0.10 | EIBO v1.0.0.10 | Yes |
| 1397 | Downtown Tickets | 07/25/08 02:05 PM | 1.3.305.0 | 1.0.0.10 | EIBO v1.0.0.10 | Yes |
| 1034 | Ticketfinder.com | 07/25/08 02:05 PM | 1.3.816.0 | 1.0.0.10 | EIBO v1.0.0.10 | Yes |
| 823 | Apex Tickets-NJ | 07/25/08 02:05 PM | 1.3.305.0 | 1.0.1.201 | EIBO v1.1.0.0 | Yes |
| 1518 | North American Tix | 07/25/08 02:05 PM | 1.3.305.0 | 1.0.0.10 | EIBO v1.0.0.10 | Yes |
| 1081 | Bakersan Ticket Service | 07/25/08 02:05 PM | 1.3.305.0 | 1.0.0.10 | EIBO v1.0.0.10 | Yes |
| 1036 | Red Zone Tickets- NATB Member | 07/25/08 02:05 PM | 1.3.305.0 | 1.0.0.10 | EIBO v1.0.0.10 | Yes |
| 1401 | All Sports Tickets | 07/25/08 02:05 PM | 1.3.305.0 | 1.0.0.10 | EIBO v1.0.0.10 | Yes |
| 1164 | Ticket Wholesaler.com | 07/25/08 02:05 PM | 1.3.731.0 | 1.0.0.10 | EIBO v1.0.0.10 | Yes |
| 1196 | Find Tickets, LLC | 07/25/08 02:05 PM | 1.3.305.0 | 1.0.0.10 | EIBO v1.0.0.10 | Yes |
| 1560 | SmallWorldTickets | 07/25/08 02:05 PM | 1.3.816.0 | 1.0.0.10 | EIBO v1.0.0.10 | Yes |
| 813 | Night on the Town-Covina | 07/25/08 02:05 PM | 1.3.305.0 | 1.0.0.10 | EIBO v1.0.0.10 | Yes |
| 1511 | Easy Street Tickets | 07/25/08 02:05 PM | 1.3.305.0 | 1.0.0.10 | EIBO v1.0.0.10 | Yes |

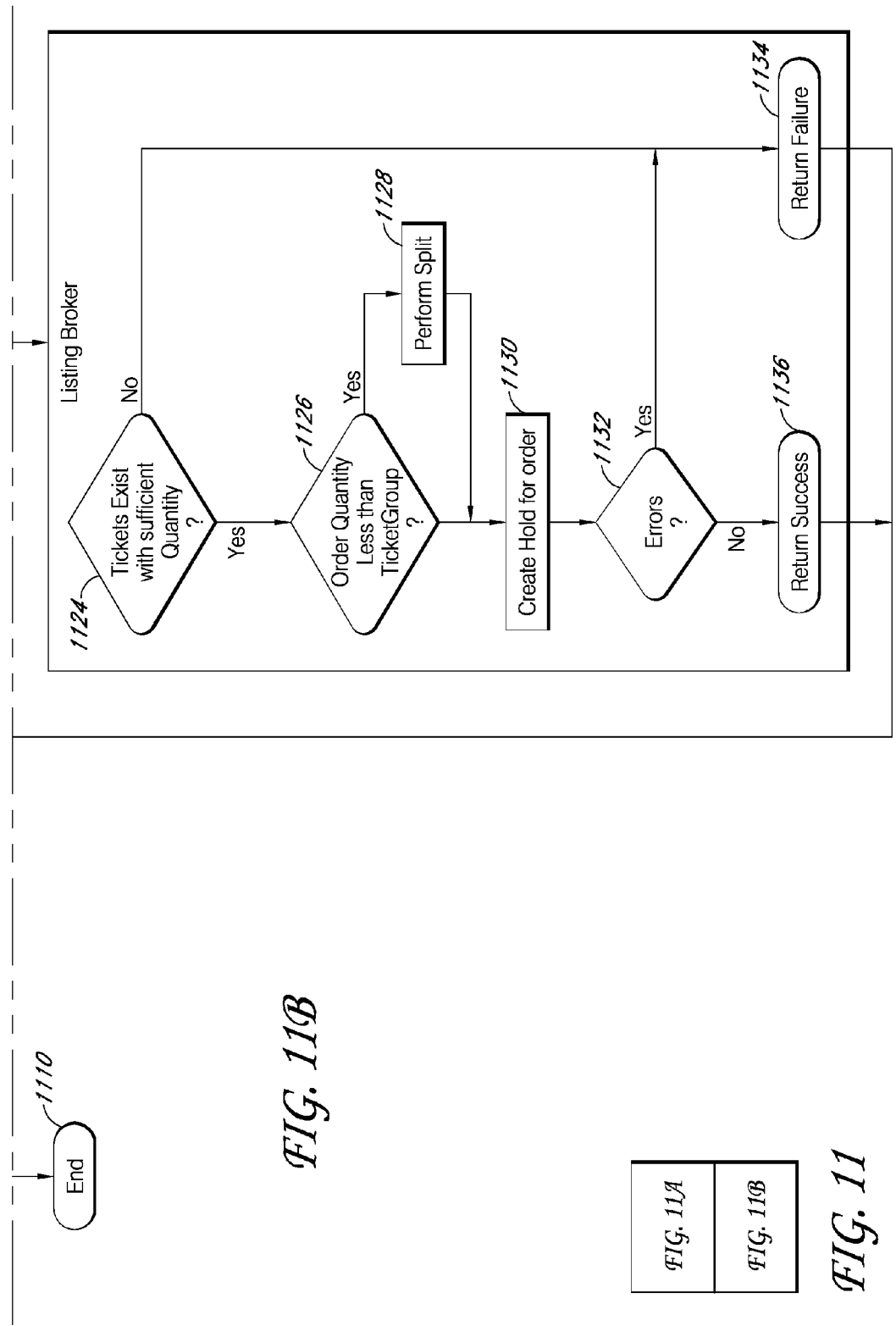

METHODS AND SYSTEMS FOR VALIDATING REAL TIME NETWORK COMMUNICATIONS

PRIORITY CLAIM

Applications Cross-Reference to Related

The present application claims priority from U.S. Patent Application No. 60/969,884, filed Sep. 4, 2007, the content of which is incorporated herein in its entirety.

STATEMENT REGARDING FEDERALLY SPONSORED R&D

Not applicable.

PARTIES OF JOINT RESEARCH AGREEMENT

Not applicable.

REFERENCE TO SEQUENCE LISTING, TABLE, OR COMPUTER PROGRAM LISTING

Not applicable.

BACKGROUND OF THE INVENTION

1. Field of the Invention

The present disclosure relates to network communications and resource access, and in particular, to methods and systems for monitoring network communications status, identifying available resources, and determining resource access status.

2. Description of the Related Art

It is becoming increasingly important for certain computer services to access remote data in real time. The remote data may be hosted on one or more servers associated with one or more entities. However, often overburdened or faulty network channels often hinder timely access of such data.

SUMMARY OF THE INVENTION

The present disclosure relates to network communications and resource access, and in particular, to methods and systems for monitoring network communications status, identifying available resources, determining resource access status, and allocating resources.

An example embodiment provides a resource management system coupled to a plurality of remote systems, such as broker systems having inventories of resources, such as admission vouchers (e.g., event tickets). The management system includes a data store that stores substantially real-time status regarding the inventory of brokers associated with corresponding broker systems. Via the resource management system, a user can search for inventory across the inventory of a plurality of brokers, select resources (e.g., ticket inventory) of a broker, and have the resources transferred to the user. Optionally, code provided by the management system is transmitted to broker systems. The code communicates with the management system, optionally providing updates and reserving tickets (e.g., marking them as on hold or sold) in the broker's inventory database in response to corresponding ticket requests from the management system.

In an example embodiment, a request for a first resource from a first requester is received at a resource management system. The system is coupled to a plurality of remote systems managing resources. A resource data store stores resource identifiers and statuses that are updated in substantially real time. A remote system controlling the first resource is identified. Optionally, a message format understood by the remote system is identified based at least in part on information obtained from a remote system module, such as a plug-in. A message is formatted (in the management system or elsewhere), optionally using a mark-up language (e.g., XML), including an identifier associated with the first resource and an identifier associated with the first requester. The management system (or another system) optionally serializes and transmits the message over a network to the remote system. The management system receives an indication via the remote system (e.g., using the management system provided code executed on the remote system) as to whether the remote system has placed a first resource hold or marked the resource as sold or is otherwise reserved for the request.

An example embodiment provides a resource management system comprising: a communications manager configured to access information regarding communication protocols used by corresponding broker systems and to provide message translations based on an origin and/or destination of the message to be transmitted; a message processor coupled to the communications manager configured to serialize incoming and/or outgoing broker messages and to facilitate queuing of incoming and outgoing message traffic with broker systems; a communications configurer configured to track one or more communication attributes of broker systems and changes thereto to ensure communications between the resource management systems are broker systems are conducted in accordance with the communication attributes of the broker systems; a communications rules provider configured to determine which broker system is to be communicated with in order to fulfill a first ticket request; a data store configured to store substantially real time status information regarding ticket inventories of a plurality of broker systems; and a search engine configured to search across ticket inventories of a plurality of broker systems.

Optionally, the resource management system is configured to communicate with an auto-updater module associated with a first broker system to thereby facilitate software updates on the first broker system. Optionally, the resource management system is configured to communicate with a secure addressable endpoint associated with a first broker system that maintains an inventory of event tickets and to obtain real-time status information regarding the inventory. Optionally, the resource management system is configured to receive information regarding configurations changes for the plurality of broker systems. Optionally, the resource management system is configured to provide information regarding some or all of the following: the percentage and/or number of brokers available to accept ticket orders; the percentage and/or number of brokers that have not reported information regarding their ticket inventory for one or more specified periods of time; the percentage and/or number of brokers that have not upgraded a first software to a first software version; the number of brokers utilizing a first version of the first software; a unique identifier associated with a first broker associated with the first broker system; a time the first broker system last connected to and/or provided an inventory updates to the resource management system. Optionally, the resource management system is configured to provide information regarding the percentage and/or number of brokers that have not reported information regarding their ticket inventory for one or more specified periods of time. Optionally, the resource management system is configured to maintain a blacklist specified by at least one broker that indicates by type which potential purchasers are not permitted to obtain resources from the at least one broker.

An example embodiment provides method for managing network communications, comprising: receiving a request for a first resource from a first requester at a resource management system, the resource management system coupled to a plurality of broker systems; maintaining a resource data store storing resource identifiers and associated statuses updated in substantially real time based on status data received from the plurality of broker systems; identifying a broker system controlling the first resource using the resource data store; optionally identifying a message format that will be understood by the broker system based at least in part on information obtained from a module associated with the broker system; formatting a message in accordance with the identified message format, the message including an identifier associated with the first resource and an identifier associated with the first requester; optionally serializing the message and transmitting the serialized message over a network to the broker system; receiving an indication from the broker system as to whether the broker system has placed a hold on the first resource for the first requester and/or marked the resource as sold for the first requester; and if an indication is received from the broker system that the broker system has placed a hold on the first resource for the first requester and/or marked the resource as sold for the first requester, at least partly causing the first resource to be transferred to the first requester.

The method optionally further comprises causing at least in part a first resource request to be formatted as an XML message. The method optionally further comprises causing the module to be provided via the resource management system to one or more broker systems. The method optionally further comprises receiving an indication as to whether at least one resource request requested a quantity of resources that exceeds a broker specified maximum. The method optionally further comprises receiving an indication as to whether at least one resource request requested a quantity of resources that was less than a broker specified minimum. The method optionally further comprises maintaining a blacklist specified by at least one broker that indicates which potential purchasers are not permitted to obtain resources from the at least one broker. The method optionally further comprises maintaining a blacklist specified by least one broker that indicates by name which potential purchasers are not permitted to obtain resources from the at least one broker. The method optionally further comprises maintaining a blacklist specified by at least one broker that indicates by type which potential purchasers are not permitted to obtain resources from the at least one broker. Optionally, the request specifies a quantity of resources greater than one. The method optionally further comprises assigning unique resource identifiers to corresponding resources from the plurality of broker systems. Optionally, the first resource is an event admission voucher. The method optionally further comprises at least partly causing at least one software application on the broker system to be automatically updated to enable a communication between the resource management system and the broker system. The method optionally further comprises providing software that receives an indication as to a configuration change on at least one broker system; and at least partly causing the module to be updated or replaced based at least in part on receiving an indication regarding a first configuration change. The method optionally further comprises receiving an indication that a software configuration of the broker system has changed.

One embodiment provides a method for managing network communications, comprising: receiving at a resource management system over a network from a plurality of broker systems substantially real-time status information regarding resources managed by the broker systems; maintaining a resource data store storing resource identifiers and associated real-time status information; monitoring the communication status with the plurality of broker systems; if the communication status of a given broker system is determined to be unsatisfactory, storing an indication that the status of resources managed by the given broker system is not reliable and inhibiting the offering of resources from the given broker; receiving a request for a first resource from a first requester at the resource management system; identifying a first broker system controlling the first resource using the resource data store; formatting a message including an identifier associated with the first resource and an identifier associated with the first requester; transmitting the message over the network to the first broker system; receiving an indication from the first broker system as to whether the first broker system has placed a hold on the first resource for the first requester and/or marked the resource as sold for the first requester; and if an indication is received from the broker system that the broker system has placed a hold on the first resource for the first requester and/or marked the resource as sold for the first requester, facilitating the transfer of the first resource to the first requester.

The method optionally further comprises receiving communication protocol information from a plurality of broker systems, wherein at least one broker system uses a different communication protocol than at least one other broker system; at least partly based on the received protocol information, identifying a communication protocol associated with the first broker; and formatting the message in accordance with the identified protocol. Optionally, the first request specifies a quantity of resources greater than one. Optionally, the message is a serialized XML message. The method optionally further comprises assigning unique resource identifiers to corresponding resources from the plurality of broker systems. Optionally, the first resource is an event admission voucher. By way of example, the first resource is a ticket. Optionally, the first resource is a ticket includes an association between a user identification device and a right to access an event stored in a data store. The method optionally further comprises at least partly causing at least one software application on the first broker system to be updated. The method optionally further comprises receiving an indication that a software configuration of the first broker system has changed. Optionally, a first request for a resource includes: a ticket quantity and/or a ticket identifier. Optionally, a first request for a resource includes: a seat section; a starting seat; and/or an ending seat. The method optionally further comprises processing ticket request responses from a plurality of broker systems, wherein a first plurality of ticket responses include some or all of the following statuses: success; insufficient quantity; requested tickets do not exist; requested tickets already on hold. The method optionally further comprises processing at least one response to a resource request for a ticket from at least one broker system indicating that seats corresponding to the at least one request are contiguous. The method optionally further comprises processing at least one response to a resource request for a ticket from at least one broker system indicating a ticket ship date. The method optionally further comprises processing at least one response to a resource request for a ticket from at least one broker system indicating an order cross reference identifier. The method optionally further comprises automatically tracking the configuration or a plurality of broker systems and facilitating the provision of software updates to the broker systems at least partly based on configuration changes. Optionally, the management system initiates communication with the first broker system. The method optionally further comprises storing broker defined rules for a plurality of rules; receiving a second request from a second requester for a second resource, wherein the second requester is a broker; identifying a second ticket broker that controls the second resource; accessing a rule defined by the second broker, wherein the second broker defined rule indicates whether the second broker will approve an order from another broker; and applying the second broker rule to the second request. The method optionally further comprises providing information regarding some or all of the following: the percentage and/or number of brokers available to accept ticket orders; the percentage and/or number of brokers that have not reported information regarding their ticket inventory for one or more specified periods of time; the percentage and/or number of brokers that have not upgraded a first software to a first software version; the number of brokers utilizing a first version of the first software; a unique identifier associated with a first broker associated with the first broker system; a time the first broker system last connected to and/or provided an inventory updates to the resource management system.

In an example embodiment, a method for managing network communications, comprises: receiving a request for a first resource from a first requester at a resource management system, the resource management system coupled to a plurality of broker systems; maintaining a resource data store storing resource identifiers and associated statuses updated in substantially real time based on status data received from the plurality of broker systems; identifying a broker system controlling the first resource using the resource data store; identifying a message format that will be understood by the broker system based at least in part on information obtained from a module associated with the broker system; formatting a message in accordance with the identified message format, the message including an identifier associated with the first resource and an identifier associated with the first requester, wherein the message is intended to cause the first resource to be marked as sold and/or on hold; optionally serializing the message; transmitting the message over a network to the broker system; receiving an indication from the broker system as to whether the broker system has placed a hold on the first resource and/or marked the first resource as sold for the first requester; and if an indication is received from the broker system that a hold has been placed on the first resource for the first requester and/or the first resource has been marked as sold for the first requester, at least partly causing the first resource to be transferred to the first requester.

An example embodiment provides a method for managing network communications, comprising: receiving a request for a first resource from a first requester at a resource management system, the resource management system coupled to a plurality of broker systems; maintaining a resource data store storing resource identifiers and associated statuses updated in substantially real time based on status data received from the plurality of broker systems; identifying a broker system controlling the first resource using the resource data store; identifying a message format that will be understood by the broker system based at least in part on information obtained from a module associated with the broker system; formatting a message in accordance with the identified message format, the message including an identifier associated with the first resource and an identifier associated with the first requester, wherein the message is intended to cause the first resource to be marked as sold and/or on hold; at least partly causing the message to be serialized, wherein the serialized message is transmitted over a network to the broker system; receiving an indication via the broker system as to whether the broker system has placed a hold on the first resource and/or marked the first resource as sold for the first requester; and if an indication is received from the broker system that a hold has been placed on the first resource for the first requester and/or the first resource has been marked as sold for the first requester, at least partly causing the first resource to be transferred to the first requester.

BRIEF DESCRIPTION OF THE DRAWINGS

FIG. 1 illustrates an example environment that can be used in conjunction with processes described herein.
FIG. 2 illustrates another example environment that can be used in conjunction with processes described herein.
FIGS. 4-6 illustrate example user interfaces.

DETAILED DESCRIPTION OF PREFERRED EMBODIMENTS

Figure 3:
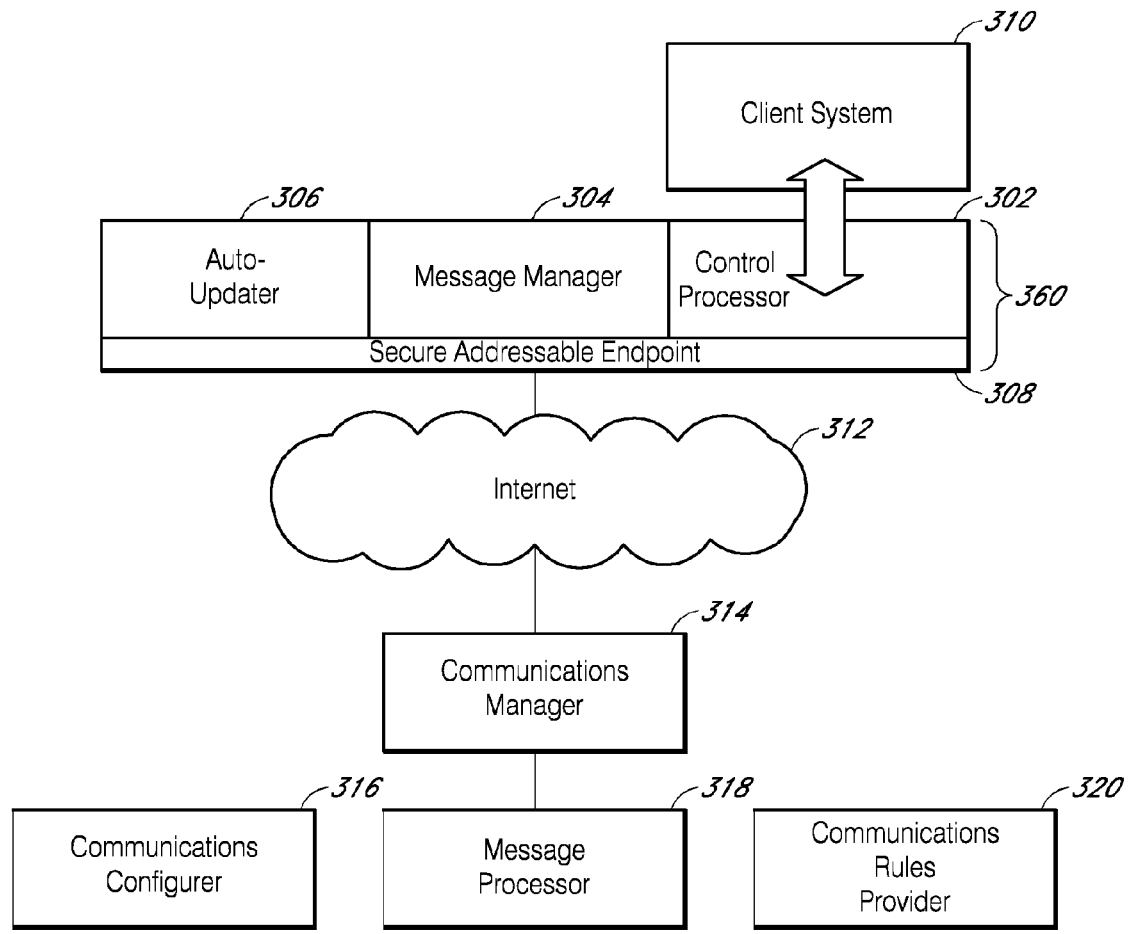
FIG. 3 illustrates example components that can be utilized with systems illustrated in FIGS. 1 and 2.

The present disclosure relates to network communications and resource access, and in particular, to methods and systems for monitoring network communications status, identifying available resources, determining resource access status, and allocating resources.

Certain embodiments of the present disclosure include systems and methods for processing web-based ticket transactions in real-time.

Unless otherwise indicated, the functions described herein may be performed by software modules including executable code and instructions running on one or more general-purpose computers. The computers can include one or more central processing units (CPUs) that execute program code and process data, memory, including one or more of volatile memory, such as random access memory (RAM) for temporarily storing data and data structures during program execution, non-volatile memory, such as a hard disc drive, optical drive, or FLASH drive, for storing programs and data, including databases, which may be referred to as a "system database," and a wired and/or wireless network interface for accessing an intranet and/or Internet.

In addition, the computers can include a display for displaying user interfaces, data, and the like, and one or more user input devices, such as a keyboard, mouse, pointing device, microphone and/or the like, used to navigate, provide commands, enter information, provide search queries, and/or the like. However, the systems described herein can also be implemented using special purpose computers, state machines, and/or hardwired electronic circuits. If the context so indicates, the term "terminal" as used herein is intended to refer to an electronic device, such as a general purpose computer, laptop, personal digital assistant, phone, interactive television, in-car entertainment/gps system, and the like, that can interface to other electronic devices (e.g., via a wired or wireless communications channel), and that includes a mechanism via which a user can provide data and/or commands (e.g., a voice recognition system, a keyboard interface, a touch screen, etc.), and a mechanism via which information and/or instructions can be provided to the user (e.g., a display interface, voice output system, Braille output system, etc.). While the term "server" is used herein, it is understand that other electronic processing devices can be used as well.

Further, the example processes described herein do not necessarily have to be performed in the described sequence, and not all states have to be reached or performed.

Throughout the following description, the term "Web site" is used to refer to a user-accessible server site that implements basic and/or other World Wide Web standards for the coding and transmission of documents, such as hypertextual documents. These standards currently include HTML (the Hypertext Markup Language), which can be used to generate Web pages, and HTTP (the Hypertext Transfer Protocol). It should be understood that the term "site" or "computer system" are not intended to imply a single geographic location, as a Web or other network site can, for example, include multiple geographically-distributed computer systems that are appropriately linked together. Furthermore, while the following description relates to an embodiment utilizing the Internet and related protocols, other networks, such as a network of interactive televisions, wireless phones, and other protocols, may be used as well.

While the following discussion may often relate to computer resources (e.g., processor time, network bandwidth, database access) or tickets (e.g., a voucher to indicate that one has paid for or is entitled to admission to a theatre, concert, amusement park, zoo, aquarium, museum, concert, or other attraction, or entitled to travel on an airplane, public transit, train, or other mode of transportation, and may indicate that the holder is entitled to use a specific seat) in order to illustrate the use and application of the disclosed systems and methods, the disclosed systems and methods can be applied to other types of units, inventory, or finite resources, such as products or other priority rights. A ticket can be a physical ticket (e.g., with the name of an event that the ticket can be used to gain admission to), an electronic token (e.g., stored on a smartcard), an association stored in a database between an admission right and an identifier of the ticket purchaser/holder (e.g., such as a credit card, driver's license, student ID card, passport) so that the identifier can be used to identify the holder and grants the holder admission to the event, a barcode image transmitted to a mobile communication device, etc.

Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

In one aspect, the present disclosure relates to a web-based ticket inventory and sales management system that ensures the availability of tickets (e.g., a concert ticket, an airplane ticket, a train ticket, a bus ticket, a ticket to a sports event, a movie ticket, a theatre ticket, and/or an opera ticket, etc.) purchased through the management system. The management system actively maintains communications links with one or more ticket broker systems. Because of the "always"-active communications links (where a number does not have to be dialed via a POTS phone or modem each time to establish a connection and communicate status updates with large time gaps between calls), changes to the status of tickets in a ticket broker's database are communicated to the management system in real-time. By ensuring that the management system has accurate inventory information, the management system may guarantee to a ticket buyer that a ticket is available when a customer seeks to purchase the ticket. As used herein, "real-time" is intended to cover both real-time and near real-time events, such that the likelihood that a purchased ticket is not available for delivery to a purchaser is appreciably small. Further, by knowing the shipping time for tickets (e.g., for physical tickets) of brokers and the date/time of the corresponding events, the management system can ensure that tickets are not offered and/or sold to a user if the tickets cannot be timely delivered (e.g., where timely delivered is a threshold time prior to the event).

In one embodiment, upon receiving a purchase confirmation (e.g., upon receiving verification of the customer's payment information), the purchased ticket is marked as sold in the ticket broker's system. When the ticket is successfully marked as sold in the ticket broker's database, the management system receives an identifier confirming that the ticket status has been updated. When the management system receives confirmation that the ticket's availability status has been successfully updated, the system sends the customer a notification that they have successfully purchased the ticket.

The management system may interact (directly or indirectly) with one or more ticket brokers to provide customers with a large number of databases in which to search for tickets. In other embodiments, the host server may further interact with sub-brokers (e.g., one or more brokers of brokers) to further expand the ticket database presented to a customer base. A ticket broker may be a single individual, a small or large business, a ticket aggregator, or any other entity having one or more tickets to sell.

In one embodiment, when the management system receives a request to purchase a ticket (e.g., the customer places the ticket in a shopping cart, the customer begins to enter credit card information and/or information of other payment types), the system requests that a hold status be placed on the ticket by the broker having the tickets that are associated with the purchase request. The hold status is updated in real time for the ticket in the broker's database (e.g., to ensure the ticket is not sold to another user while the customer is completing the purchase process). The management system can then allow the customer a pre-determined amount of time (e.g., 1 minute, 2, minutes, 3 minutes, 4 minutes, 5 minutes, 6 minutes, 10 minutes, or other time amount) to finalize the transaction, such as by entering credit card information, or information of another payment means. In one embodiment, if the payment information is not verified within the pre-determined amount of time, the hold status can be removed from the ticket and the ticket again made available for purchase. Once the hold status is removed from the ticket, the ticket may reappear in search results and can be available for purchase by other potential customers.

In another aspect, the present disclosure relates to a method for establishing a communication link with a ticket broker and monitoring the status of the communication link with the ticket broker. The status of the communication link can be continuously or periodically monitored, for example, based on a received signal from the broker system. The broker system can be configured to send signals to the management system to indicate to the management system that the communications link between the broker system and the management system is still active (e.g., via an "I'm alive" signal). The signals can be sent at pre-determined intervals of time. For example, the signals can be sent frequently (e.g., every few milliseconds or every few seconds) such that the management system is regularly or constantly apprised of the status of the communications link. By monitoring the status of the communication link in real-time, the system can have a high degree of confidence that it will have received any updates that may have occurred to the inventory of tickets managed by the ticket broker.

For example, once a ticket purchase transaction is complete, the ticket status can be updated and reflected on the ticket supplier's database in real time, to prevent the management system or brokerage system from selling a ticket that is not available. Moreover, the management system will have a high degree of assurance that a request to the ticket broker (e.g., a transaction request) can be placed to the broker in real time and that the request will therefore be fulfilled. If, however, a determination is made that the communications link with a given broker is not healthy (e.g., because a certain amount of time has elapsed without receiving the periodic signal from the broker system or because the frequency of the signal is not what is expected), the management system optionally halts offering customers tickets from that broker until the communications link is healthy and a ticket inventory status update has been performed, to ensure that tickets that may already have been sold by the broker or on hold by the broker for one customer is not sold to another customer.

In one embodiment, the management system is configurable to identify and track changes to system configurations of the ticket broker systems. For the management system to identify system configurations of ticket broker systems, the ticket broker may undergo a registration process in which it grants access to the management system (e.g., to the broker ticket inventory data) and provides information about the ticket broker system, system updates, configuration updates, inventory information, database configuration, etc. Updated configuration information may be periodically, automatically provided to the management system by a software agent that is installed on the ticket broker system. The management system is optionally platform independent and can communicate securely with client/broker systems, which may be behind an unknown configuration of firewalls and/or routers.

In addition, the management system is able to communicate with broker systems, such as to initiate transactions to purchase tickets and/or to initiate access to the broker's database to search for a ticket based on a set of search criteria, when the signals received from the broker systems indicate that the communications link between the management system and the broker system is active and healthy.

In one embodiment, to implement the method for monitoring the status of the communication session with a ticket broker, code, such as an agent (e.g., a software application) can be installed on the broker system to facilitate a registration process enabling the management system to remain in communication with the broker system. For example, the agent can be distributed manually or automatically via the management system. The installed agent can detect changes to the system configuration on the broker system (e.g., by comparing broker configuration information from a first period of time with current broker configuration information, and alter its communication or access methodology to ensure that a two-way communication link is maintained with the management system. In a further embodiment, the agent installed on the broker system enables a two-way communication between the management system and the broker system, regardless of the specific security implementation and/or network configuration (e.g., router, switch, and/or network hub settings) of the broker system.

By way of further illustration, in an example embodiment, code (e.g., an agent) resides and executes on the listing broker's system contains or accesses a database that maintains information, such as port numbers, protocols, request/response timings, and other information about connecting to and communicating with the management system. Similarly, the management systems maintains a database of information about some or all of the broker connections, recording response time, protocols used, port numbers, etc. This allows for differences in computer performance between brokers, and in the quality of Internet service. For example, the management system can operate broker systems that have up to date operating systems, high speed servers and a high bandwidth network pipe to the Internet, as well as those using old operating systems, old personal computers as servers, and use a dial-up connection to access the Internet. This enables the connection monitoring system to be adaptive. For example, one broker might be considered very slow if 5 seconds goes by without a response (e.g., a broker with a broadband connection), whereas, for another broker (e.g., with a dial up connection), 15 seconds could be quite good. Thus, the system can assign different response threshold values to different brokers in determining whether there is a broker communication problem and in determining whether a corrective action (such as those described herein) is to be taken.

Optionally, the broker-side code stores or is otherwise aware of a plurality of communication protocols and methods for connecting to the management system. If a communications problem is detected (e.g., ticket status updates fall below a certain threshold value or data is being lost) by the broker-side code or management system (which informs the broker-side code of the problem) the broker-side code may automatically heal ("auto-heal") its connection with the management system by trying one or more of the alternative protocols/connection methods. Optionally, the management system (or manual intervention) may be used to reprogram the broker-side code to use a different protocol/connection method.

Optionally, to enable the management system to communicate with broker systems across a variety of broker protection systems (e.g., firewalls), communication between a given broker system and the management system may be initiated from the broker side, and a port and protocol combination is used that is recognized as safe by the broker's firewall (if any). Thus, communications between the broker system and the management system will be facilitated, as the proper navigation path from the broker system to the management system will be transmitted to the management system, and the management system will know how to navigate the firewall, routers, etc. The management system will recognize such attempts and record the data, so it can initiate further communications. Thus, in certain embodiments for certain communications, rather than initiate a given communication, the management system provides code to the broker-side system so that the broker-side system can initiate the communication stream, and so that the management system can communicate with the broker system, even though it is locked safely away behind all of its security layer(s).

Communication sessions between the management system and the broker system can be established over any communication protocol, since the implementation is platform independent. For example, communication can be established over, but not limited to, protocols of the data link layer, the network layer, the transport layer, the session layer, and/or the application layer. Specific protocols include, but are not limited to, the Internet protocol suite (TCP/IP), the Open Systems Interconnection (OSI), FTP, UPnP, ISDN, SDH, L2F, L2TP, LLDP, PPP, PPTP, STP, PCP, Multi-protocol label switching (MPLS), Internetwork Packet Exchange (IPS), TCP, UDP, NCP, NFS, HTTP, IRC, Jabber, LDAP, NNTP, SMTP, TPTP, etc. The management system and the broker systems may be comprised of one or more computing devices, such as servers, desktop computer, laptop computers, etc. Various features described herein may be distributed throughout such computing devices and may rely upon on or more local or remote services.

In one embodiment, each broker system has a unique identifier that may be assigned by the management system. The management system optionally stores in a database or other data store the unique identifier in association with the broker account information (e.g., broker name, website URL, other electronic addresses, physical address, email address, contact person, financial account information, and/or other information). Tickets provided by the brokers are identified by a unique identifier, such that the tickets available for purchase through the management system are uniquely identifiable by the management system. The unique ticket identifier is optionally stored in association with the unique broker identifier of the broker that owns/controls (e.g., as an agent or otherwise) the ticket. Systems status can be monitored in real-time, as identified by the broker system ID, for example, the status of the system, the health status of the connection, transaction history/log, system configuration, system upgrades/changes, system downtime, etc. The status can be stored in a database or other data store in association with the broker system ID, thereby allowing reports regarding the broker system and/or communications link status to be generated (in real time and/or periodically), enabling a system operator to monitor the current and historical performance of a broker system and/or communications link.

FIGS. 1 and 2 illustrate examples of the management system (represented by the host server) communicating with one or more ticket broker systems (represented by the client servers or satellite broker servers) over a network. In the configuration illustrated in FIG. 1 (illustrating a local installation at a broker), a management system host server 102 is connected with a user (e.g., a ticket customer) terminal 108 (e.g., a computer, a phone, a networked television, etc.) over a network, such as the Internet or a wireless network. The host server 102 is also connected via a network 104 to a client server 106. The configuration illustrated in FIG. 2 illustrates a configuration that may be used for a large broker who has a number of offices around the country, or a number of other brokers who work for the large broker, or an instance where a number of brokers have formed a consortium. The configuration may also be representative of a situation where satellite brokers have another instance of the host server, and additional clients, as depicted in FIG. 1. A host server 204 is connected with a user (e.g., a ticket customer) terminal 202 over a network, such as the Internet or a wireless network. The host server 204 is also connected via a network 206 to a client server 208 and one or more satellite ticket broker servers 210. The client/broker servers include or are coupled to ticket inventory databases.

In an example embodiment, the client servers (including the broker servers 210) are registered with the host server 204, such that the host server can establish a communication link and communication sessions with the client servers. Using the communication link, ticket inventory databases associated with the client servers are made available to a customer searching for tickets through the host server.

In one embodiment, a software agent is installed on some or all partner client servers and satellite broker servers to enable the servers to communicate with the host server. In addition to ensuring that a communication link is maintained between the servers, the software agent may determine, track, and report to the host server the different system configurations of client servers and/or satellite brokers (e.g., periodically and/or when a configuration change is detected). Having accurate system configurations ensures that any software updates that may be pushed from the host server will operate correctly on the client servers and/or satellite brokers (e.g., where the update is selected and/or configured based on the current broker system configuration). Thus, the software agent enables the broker/client side to be self-updating, to understand news messages, commands, protocols, and add functionality automatically and optionally without human intervention.

The installed software agent may also automatically detect business rules specific to the clients and/or satellite brokers and communicates such business rules to the host server such that modifications to the host server can be made to ensure compatibility with the clients. In one embodiment, business rules and system configurations (e.g., operating system, system status, hardware and/or software upgrades, firewall and/or other security system changes, router setting changes, etc.) are tracked by the software agent residing on the client server and communicated to the host server such that a compatible service and/or customer support to the client server can be provided.

In one embodiment, upon establishment of a secure and robust (e.g., healthy) communications link between the host server and a client or satellite broker server, a unique identifier can be assigned and/or associated with each client or satellite broker server. The identifier may be session dependent or independent. In addition, a ticket ID can be further assigned to available ticket inventory accessible via the client servers and/or satellite broker servers.

The network (e.g., networks 104, 206) over which the host server and the client/broker server communicate, may include, but is not limited to an open network, such as the Internet, personal area network, local area network (LAN), campus area network (CAN), metropolitan area network (MAN), wide area network (WAN), wireless local area network (WLAN), or a private network, such as an intranet, extranet. In one embodiment, communications to and from the server agent may be achieved by a secure communications protocol, such as secure sockets layer (SSL), transport layer security (TLS). In addition, data and/or transactional details may be encrypted based on any convenient, known, or to be developed manner, such as, but not limited to, DES, Triple DES, RSA, Blowfish, Advanced Encryption Standard (AES), CAST-128, CAST-256, Decorrelated Fast Cipher (DFC), Tiny Encryption Algorithm (TEA), eXtended TEA (XTEA), Corrected Block TEA (XXTEA), and/or RC5, etc.

For example, a EIBO (event inventory box office point of sale application) application can run on a machine, such as a server, and one or more clients connect to that machine. A given listing broker can run the EIBO application and a client on the same personal computer. Other listing brokers may have a more powerful server, and the client software is optionally installed on various computers (e.g., a personal computer) that connect to the server.

A broker machine may run the EIBO server. The EIBO server may run that server as a client of an EIBO server running on the management system. Certain brokers may be large enough to need a robust POS, and may have a relationship with other brokers (e.g., sub-brokers) or with a consortium of brokers who have pooled their resources to have a shared IT presence. A given broker system executes a point of sale (POS) system. A given POS optionally has its own database, and a given broker loads the broker's ticket inventory local to his POS. The "large" broker or consortium, optionally loads the inventory from satellite brokers to another database.

Thus, in an example embodiment, the management system runs an instance of the EIBO application that "scoops" up tickets from the other brokers using EIBO. These tickets may be conceptually in two (or more) places, and the local broker controls the inventory because it is the listing broker who has the tickets in hand. Other brokers are retail brokers. Optionally, the management system operator does not own inventory (although optionally the operator does own inventory).

A listing broker owns tickets, while a retail broker sell tickets for others (e.g., for the listing broker) and get tickets from the listing broker. Retail brokers' tickets can appear on multiple retail broker websites. Further, a listing broker can also be a retail broker, and can be the same broker.

The management system can go out to the database of the local broker that controls the tickets requested by a customer, and mark the tickets as sold, optionally without the intervention of the broker who actually owns the tickets. In the case of satellite brokers, the management system can go to the large broker's server, and from there, to the satellite broker's database server, and mark the ticket as sold.

FIG. 3 illustrates example software modules installed on a client server (e.g., client servers 106, 208) and/or a host system (e.g., management system host servers 102, 204), according to one embodiment.

As illustrated in FIG. 3, the software modules of the example management system host include some or all of the following: a communications configurer module 316, a communications manager module 314, a message processor module 318, and a communications rules provider module 320, according to one embodiment.

The message processor module 318 enables communication with user devices (e.g., customer devices) such as a laptop computer, a desktop, a processing unit, a SmartPhone, a BlackBerry device, a PDA, a Treo, and/or an iPhone, a networked television, other terminals, etc. In one embodiment, the message processor module 318 is able to communicate with a plurality of protocols (e.g., any known, future and/or convenient protocol such as, but not limited to, XML, SMS, MMS, and/or email, etc). The message processor module 318 may further optionally serialize incoming and/or outgoing messages and facilitate queuing of incoming and outgoing message traffic.

The communications manager module 314 acts as a message translator to translate a message from one communications protocol to another. In addition, the communications manager module 314 may identify different versions of a message (message versioning) and provide relevant translations based on an origin and/or destination of the message to be transmitted. The communications manager module 314 optionally provides installation automation. The communications manager module 314 communicates with the broker (including client system 310 and modules 360), and can be configured to receive the signals indicating the health status of an established communications link (e.g., a periodic signal from a broker system, which if received without dropouts, indicates a healthy link). Authentication of customer information (e.g., logon information, payment information) can also be processed, received, or verified by the communications manager module 314.

The result of the authentication process can be further relayed by the communications manager module 314 to the relevant recipient once the authenticity of the customer has been determined. In one embodiment, the communications manager module 314 can authenticate the client system server and identify any configuration changes to the client server such that automatic updates and be provided to the client. For example, the communications manager module 314 can facilitate the installation of software on the client end for service upgrades or system support purposes that correspond to the client system's current configuration.

The host server includes a communication configurer module 316 for tracking the attributes of a client system needed to establish a communication session. In one embodiment, the communication configurer module 316 further ensures that the communication between the host and the client system 310 are conducted in accordance with the identified communication attributes and/or rules. The communication configurer module 316 maintains an updated record of the communication attributes of one or more client systems should a change occur at the client system. In one embodiment, the communications configurer module 316 ensures that the communications manager module 314 can deliver the payload provided by the message processor module 318 to the client system (e.g., by ensuring that the correct protocol corresponding to the client system is used).

The host server may further include the communications rules provider module 320. In one embodiment, the communications rules provider module 320 determines which client system (e.g., which broker system) that the host server needs to communicate with in order to fulfill a particular request. The request may or may not be triggered by a customer. For example, the request can be to search a broker database for tickets based on criteria submitted by a potential customer (e.g., event type, event name, venue name, date, number of seats, price range of tickets, seating location, and/or additional/different criteria). The request may also be to purchase a ticket from a relevant ticket broker. The communications rules provider module 320 may track attributes of the broker system and/or the nature of the request, to determine which broker system to transmit the request to (e.g., based on inventories, time to shipment, and/or ticket prices of the brokers).

In addition to maintaining an association between tickets and brokers, the communications rules provider module may also enforce various rules associated with the sale of tickets by brokers. In an example embodiment, a given ticket in the management system is associated with a unique identifier (e.g., assigned by the management system, the broker, or other entity), and a given ticket tracked by the system may be associated with a particular ticket seller.

By utilizing the ticket and ticket seller identifiers, various rules may be imposed by the communication rules provider module governing the sale of each ticket (e.g., to whom the tickets can be sold (wherein certain users (e.g., as identified via a purchaser identifier/contact information), such as those on a blacklist stored in memory (e.g., specified brokers and/or retail customers), are barred from purchasing tickets; wherein certain types of users, such as other brokers or retail customers, are barred from purchasing tickets, etc.), who is permitted to resell tickets, the maximum number of tickets a broker or other buyer is permitted to purchase, etc.). For example, Ticket Broker A may allow Ticket Broker C and Ticket Broker D to sell Ticket Broker A's tickets, but may not allow Ticket Broker B to sell Ticket Broker A's tickets. The communication rules provider ensures that data is not sent to parties not authorized to receive it (e.g., to control those brokers that can be communicated with and which messages are sent).

The communications rules provider module 320 may also impose other resale rules that depend on the type of ticket, the day of ticket, and other factors. Ticket brokers often provide tickets for sale at differing tiers (e.g., orchestra, box, upper level, etc.). The sale of tickets of differing tiers can be restricted based on the location of the seating, the time of the show, the day of the show, etc. For example, a ticket supplier may prefer to sell premiere tickets (e.g., front row seats, orchestra seats) through the supplier's own distribution channels rather than through other ticket brokers. Similarly, a ticket supplier may prefer to sell tickets to certain artists (e.g., Sting concerts, Rolling Stone concerts) through the ticket supplier's own distribution channels, whereas tickets to other artists can be sold by other ticket brokers. Thus, a given ticket identifier may be stored in association with an indication as to who the ticket can and/or cannot be sold to. In addition or instead, a record may be stored in a data store for a given artist and/or venue indicating whether tickets for the artist and/or venue can be sold to other brokers, retail customers, etc. Similarly, a ticket supplier may decide that tickets to events on or close to certain holidays should not be made available for sale by other ticket brokers. Other types of relational rules and/or preferences between ticket brokers, the management system, and customers may be configured through various rules implemented by the communications rules provider module 320.

The software modules 360 residing on the client server include, but are not limited to, an auto-updater module 306, a message manager module 304, and/or a control processor module 302. Together, these modules comprise a secure addressable endpoint agent 308 that acts as a client side adapter and enables the host server to interface with the client system 310 in a secure and reliable fashion.

The auto-updater module 306 automatically updates the agent software to enable the agent software to understand new, messages, commands, and/or protocols, based on a system configuration/change initiated on the host server or the client server. The auto-updater module may also install new or updated software to provide support and/or enhancements, based on a system configuration change detected on the client server. System configuration changes that would necessitate changes to the agent software can include, but are not limited to, a software/hardware upgrade, a security upgrade, a router configuration change, a change in security settings, etc. For example, if the auto-updater module 306 determines that a communication link with the host server has been lost for a pre-determined amount of time, the auto-updater module 306 can obtain system configuration information about the client server to help re-establish the communication link. Such information may include new settings/configurations on one or more hardware devices or new or upgraded software on or connected to the client server. Thus, the auto-updater module 306 can detect or be informed by other software when there is a new version of agent software with additional functionality and/or deficiency/bug corrections or when there is a change with respect to the client software, hardware, communications channel, etc.), and perform updates accordingly.

Based on the newly-obtained system configuration for the client server, the auto-updater module 306 can cause a new communication link to be re-established with the host server. In one embodiment, upon establishment of the communication link, system configuration information about the client server can also be provided to the host server to facilitate the connection to or downloading of software to the client server.

In one embodiment, when a poor health signal is detected by the host server (e.g., when the health signal is only sporadically received but the communication link is not necessarily lost), the host server can send a command to the auto-updater module 306 to instruct the auto-updater 306 to obtain system configuration information about the client server. The updated system configuration information may be used in an attempt to revive the unhealthy communications link (e.g., by resending a resource request). For example, the code running at the listing broker's site is optionally installed with administrator privileges, which enables the code to manage the broker's server. The code utilizes the appropriate system calls for the operating system to fix or reestablish communications. By way of example and not limitation, model and driver information is optionally obtained for routers in the system in order querying them. By way of further example, if the code determines that a new brand of router has been installed, it can adapt to that change, or to the change in network configuration, or other changes.

Instead or in addition, the host server (e.g., via the communications manager 314) can send specific instructions to the auto-updater 306 to specify tests or checks to be performed on the client server to determine the changes to the system configurations (e.g., by automatically performing or requesting an inventory check of system hardware and/or software). For example, the components involved in the chain of hops through a network can be queried and analyzed. Thus, for example, if a new ISP (Internet service provider) is being used and the management system traffic is being filtered, or a new router was installed and the software needs to change its configuration, or if someone made a change to the operating system that affects port the management system is using to communicate, the management system (or operator) can communicate with the ISP, change it back, or choose from a new available port, respectively.

The specific tests may be necessary to help establish the communication link, if, for example, the automatic tests fail to provide sufficient information for the communication link to be re-established, if additional information is needed about a particular configuration change, and/or if the client system is not initially supported by the auto-updater 306, etc.

The control processor module 302 provides message processing for messages received from the host server. For example, the control processor module 302 may identify whether the message is a request to access the inventory and/or to determine the availability of a particular ticket. The control processor module 302 can further identify a request to place a ticket on hold, or to mark a ticket as having been sold. In some embodiments, the control processor module 302 can identify a request to mark a ticket as available after the ticket was placed on hold or marked as sold.

The secure addressable endpoint agent 308 further includes a message manager module 304 that facilitates communication with the client system database, point-of-sale, and/or other subsystems owned and managed by the client. The control processor 302 converts commands received from the host server into commands that interoperate with the client system 310 and various subsystems.

The secure addressable endpoint agent 308 further generates a health signal that is transmitted to the host server for monitoring. The health signal is optionally a short message of a few bytes or many bytes in length that may be transmitted on a frequent basis (e.g., every few milliseconds or seconds). The communications manager 314 on the host server monitors the health signal provided by the agent to ensure that the communication link between the host server and the client server is still operational.

Additional or fewer modules can be included on the client side or the host side without deviating from the spirit of this disclosure. Note that the modules could be implemented in one or more instances of software. The functionalities described herein need not be implemented in separate modules, for example, one or more functions, such as the configurer module and the communications manager module 314, can be implemented in one software instance and/or one software/hardware combination. Other combinations are similarly be contemplated.

Example user interfaces, such as those configured to manage client servers (e.g., broker servers), according to one embodiment will now be described.

FIG. 4 illustrates an example dashboard user interface that provides system status and versioning of brokers. The example dashboard provides a list of brokers (e.g., that hold tickets that are to be resold and/or that that mediate between a buyer and a seller) connected to the management system and showing broker status, including, but not limited to, the last connection time between the management server and each broker server (optionally, the connection time is color-coded based on length of connection duration), the version of software currently installed on the client server, the version of the agent (e.g., the secure endpoint) that is being executed on the client server, and the version of plug-in operating on the client. Further, the activation status of the client server is also shown to indicate whether the client server is able to participate in real-time transactions. Summary information is also provided on the dashboard to indicate the total number of broker servers having active communication links that are available for real-time communication, as well as the number of broker servers having broken communication links that are not available for communication.

In the illustrated example, the following is calculated (where applicable) and reported:

the percentage and number of brokers (e.g., the brokers authorized to connect to the system and to make their inventory available) connected (or accessible) and ready to accept orders;

the percentage and number of brokers activated for full automation orders (e.g., where the listing broker does not have to be manually contacted in order to place a ticket order or to confirm that a given listed ticket is still available);

the percentage and number of brokers that have not reported (e.g., their available ticket inventory) for one or more specified periods of time (e.g., 5 minutes, a day, and/or other specified time periods);

the percentage of brokers and number that have not upgraded yet (e.g., upgraded software to the most recent applicable version of software);

the total number of brokers;

the number of brokers that are utilizing a given version(s) of software (e.g., EIBO versions (Event Inventory Box Office point of sale application), Agent versions, etc.);

In a table format (although other formats can be used), for a given broker:

the identifier (a unique number or alphanumeric ID) associated with a corresponding broker;

the broker name;

the data/time the broker system last connected to and/or provided inventory updates to the host system.

the versions of various software on the client server;

an activation indication (where, in order to ensure that access to the management system is not granted to a malicious person or broker, a broker needs to first request activation, and an authorized management system operator grants such access, and then allows traffic from the "activated" broker. Optionally, in order for the management system to access a given broker system, the broker has to agree to accept such connection. This process is in place to better ensure that no connections are set up that both parties haven't first agreed to. An activation indication can include a written agreement, a verbal and/or written order, and/or a flag stored in a database.)

Optionally, the foregoing data is automatically updated periodically and/or when a specified event occurs (e.g., a user activating a refresh control).

Figure 5:
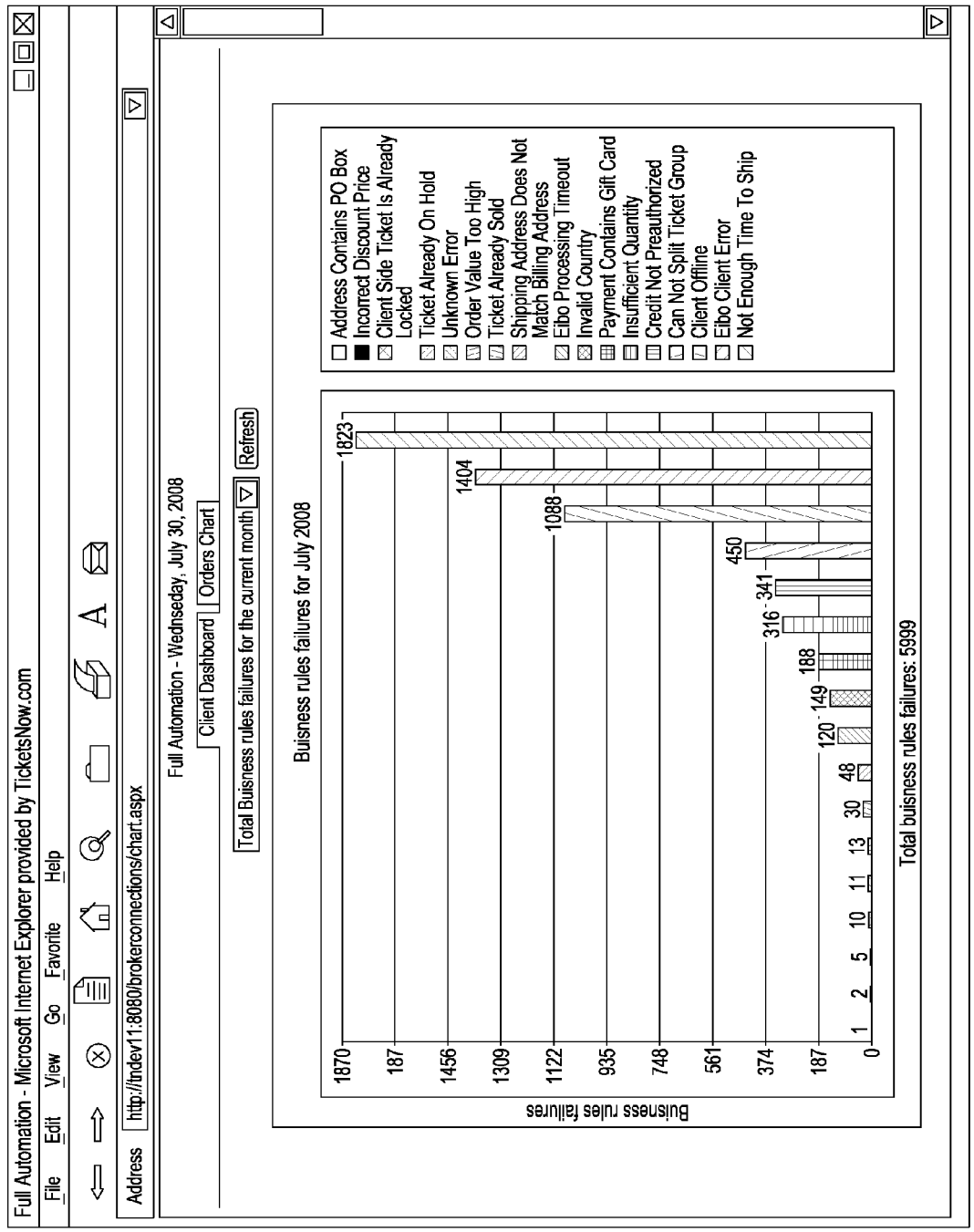

FIG. 5 illustrates an example dashboard user interface that provides a report on reasons orders/ticket requests failed. This example provides a summary of errors (e.g., business rules failures) that have been identified and/or are being remedied in the system, optionally for a specified user(s) or system(s) over a specified period of time (e.g., the current month, the current week, the current day, the current hour, the last month, the last 3 months, the last 6 months, etc.). A user interface is provided (e.g., via a menu or otherwise) via which the user can specify the time period and/or the types of errors that are to be reported. For example, the errors may be business rules related, including application rules related, communication related, and/or other types of errors.

In the illustrated example, the failures are reported via a bar graph, wherein different color or otherwise distinguished bars correspond to different errors. Other formats can be used (e.g., pure text, pie chart, graph, etc.). In addition, the number of errors for a given type of error and for the total number of errors are reported numerically. Examples of the types of business rules failures (e.g., specified by a broker/client) are as follows, although fewer, additional, or different errors can be reported:

Address contains a POBox (where a rule specifies that a user cannot use a POBox as a mailing address and/or a billing address);

Incorrect discount price (e.g., where the user entered an incorrect/not applicable discount price or coupon);

Ticket already locked/on hold (e.g., where another user is somewhere in the midst of a purchase process for a ticket specified in an order so that the specified ticket is unavailable to others, but may become available if the purchase process is not completed);

Ticket already sold (where a ticket specified in an order is already sold);

Order value is higher than a specified amount;

Unknown error;

Shipping address does not match billing address (where the business rule specifies the shipping address and billing address need to be the same);

EIBO processing timeout;

Invalid country (e.g., where the customer location is in a country that the client/broker does not service);

Payment contains a gift card (e.g., where the rule specifies that gift cards cannot be used to pay for tickets);

Insufficient quantity (e.g., where the rule specifies that a minimum number of tickets need to be ordered);

Exceeds maximum quantity (e.g., where the rule specifies that a given user cannot order more than a specified maximum number of tickets for a specified event or overall);

Cannot split ticket group (e.g., where user is try to order fewer than all of the tickets in a specified set of tickets that a rule specifies need to be purchased as a group);

Credit not preauthorized;

Client offline (e.g., where the broker client is offline or otherwise unavailable);

Client error;

Not enough time to ship (e.g., not enough time to ship event tickets being ordered so that they will arrive sufficiently prior to the event (e.g., at least one day, two days, or other specified period of time)).

Figure 6:
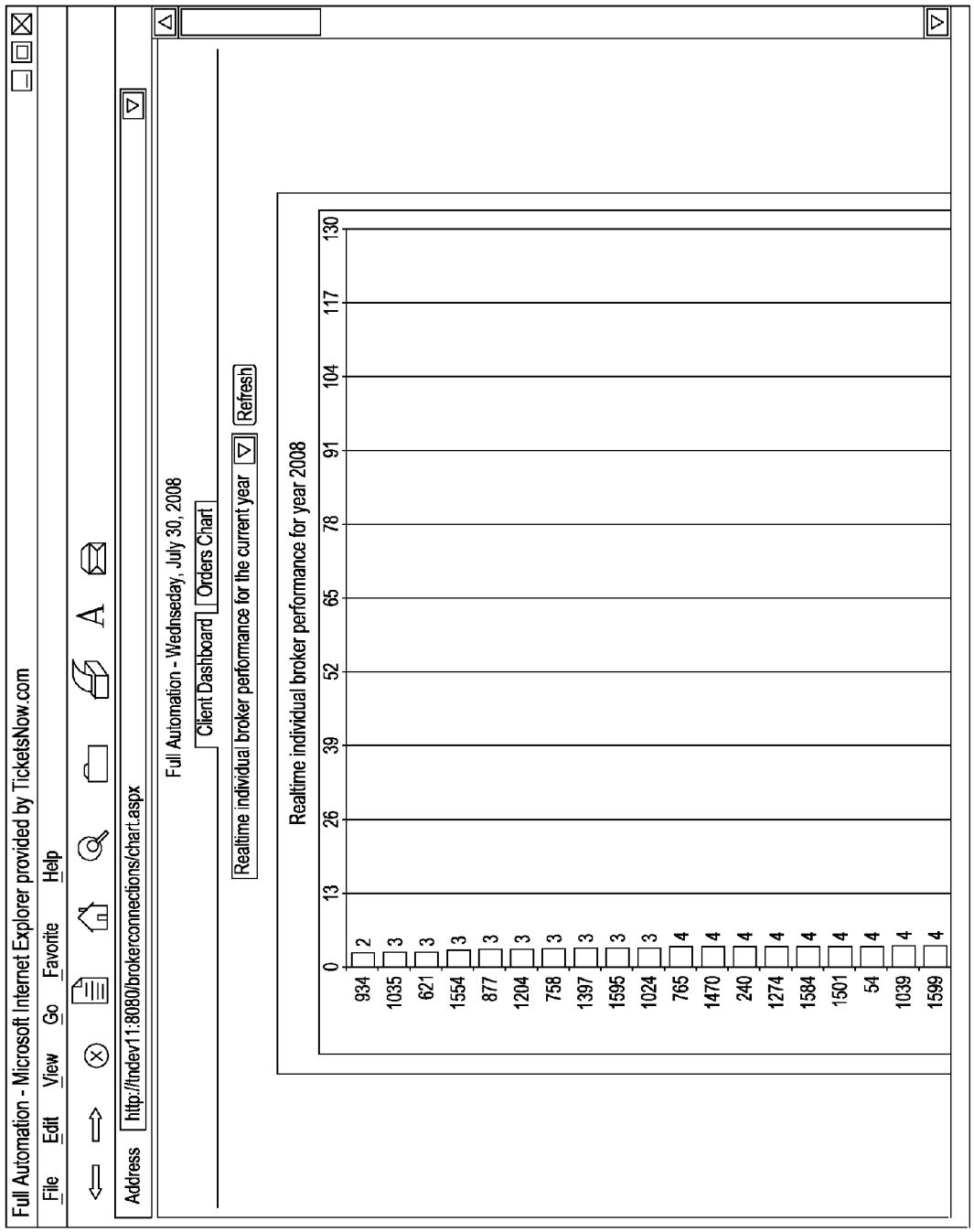

FIG. 6 illustrates an example performance report of a broker over a specified period of time (e.g., real-time individual broker performance for a specified year, month, week, day, etc.). A user interface is provided (e.g., via a menu or otherwise) via which the user can specify the time period and/or the types of performance that are to be reported. In the illustrated example, a plot of the average response time (in milliseconds) over a pre-determined period of time to initiate real-time transactions with the brokers. The number of transactions over which the broker performance is averaged is also reported. The report is optionally updated in substantially real time (e.g., automatically and/or in response to activation of a refresh control). Optionally, response times (e.g., average response times) that exceed a specified threshold are highlighted/emphasized via an icon, color coding, or otherwise to more readily visually indicate a performance problem that needs to be remedied and/or to determine with a broker should be excluded from participating in the future.

Using the various dashboards, performance issues can be identified from plotting average and/or median response times (e.g., of the client/broker server), with or without knowing the specific software and/or hardware settings and configurations of the client server.

Additional example dashboards will now be described. An example dashboard shows the percent of tickets sold in a specified time period (e.g., the current year, month, day) using a given process, such as the process illustrated in FIG. 8). This enables a user to determine the effectiveness of a given process for enabling a purchaser to purchase tickets from brokers as compared to other processes.

Figure 8:
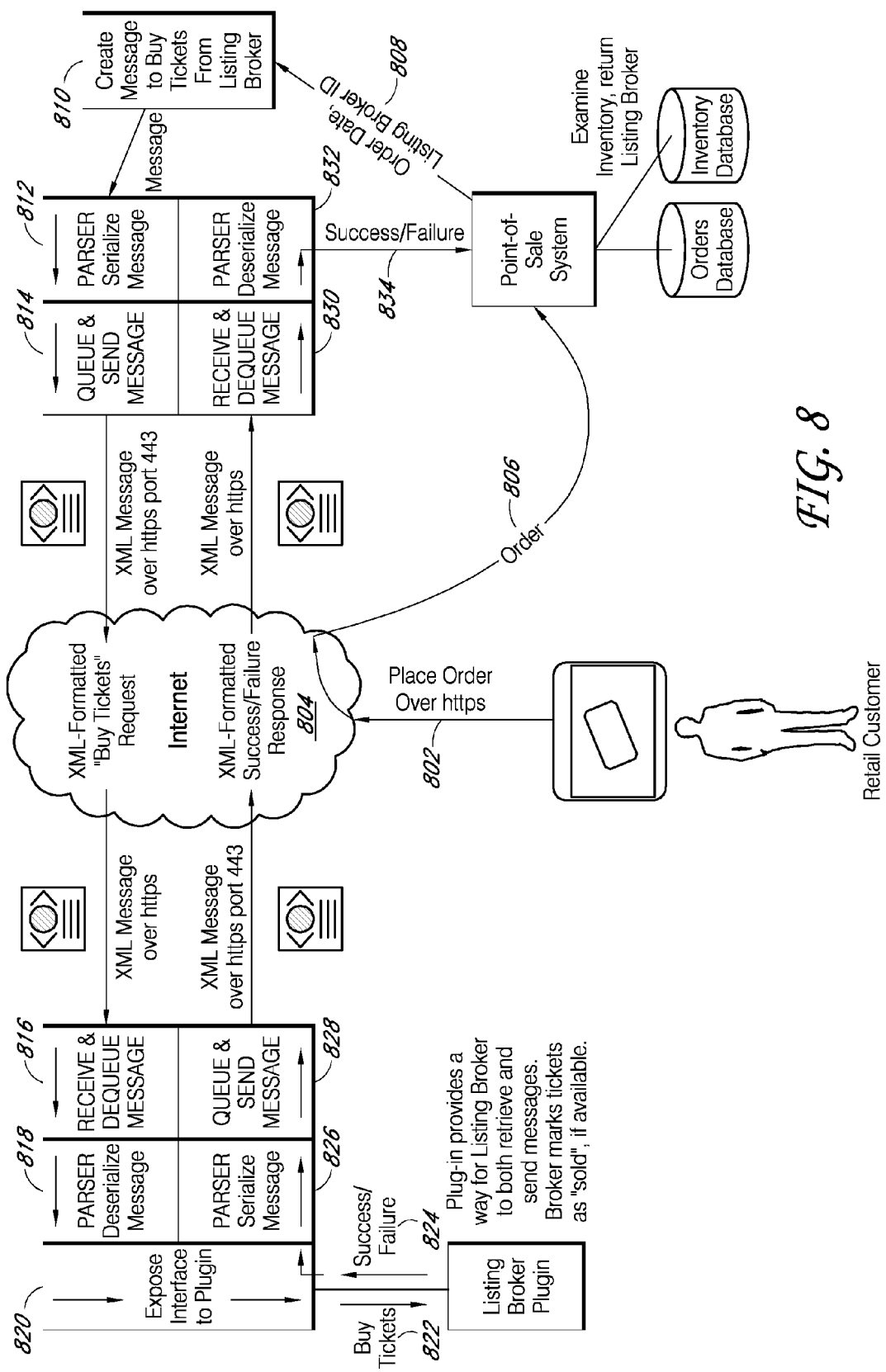
FIG. 8 illustrates an example activity flow.

Another example dashboard reports on the percent of total inventory that is eligible to be sold using a given process, such as that illustrated in FIG. 8 (e.g., the inventory of brokers who agree to participate in the process and are "activated").

Another example dashboard reports on the success rate per broker (e.g., the success rate of completing a ticket purchase). This dashboard can be used to identify suspicious cases where the management system continually attempts to fulfill orders using an inventory database associated with a broker that is supposed to have real-time inventory status, but where the orders are denied for various reasons, such as the ticket is on hold (e.g., which may indicate that the corresponding broker is not providing real-time inventory data).

Another example dashboard reports on the amount of time that a broker is connected to the management system over a specified period of time (e.g., the last 24 hours, week, month, year, or from first activation). This dashboard can provide an indication as to which brokers are frequently unavailable and when (e.g., because the operator has gone home for the weekend, and shut off their database), wherein the unavailability prevents the sale of the broker's ticket by the management system during the downtime.

Another example dashboard reports on communications failures (e.g., to identify where someone's ISP is having problems, or where a broker's server is running out of disk space, or memory) so that the problem can be addressed.

Figure 7:
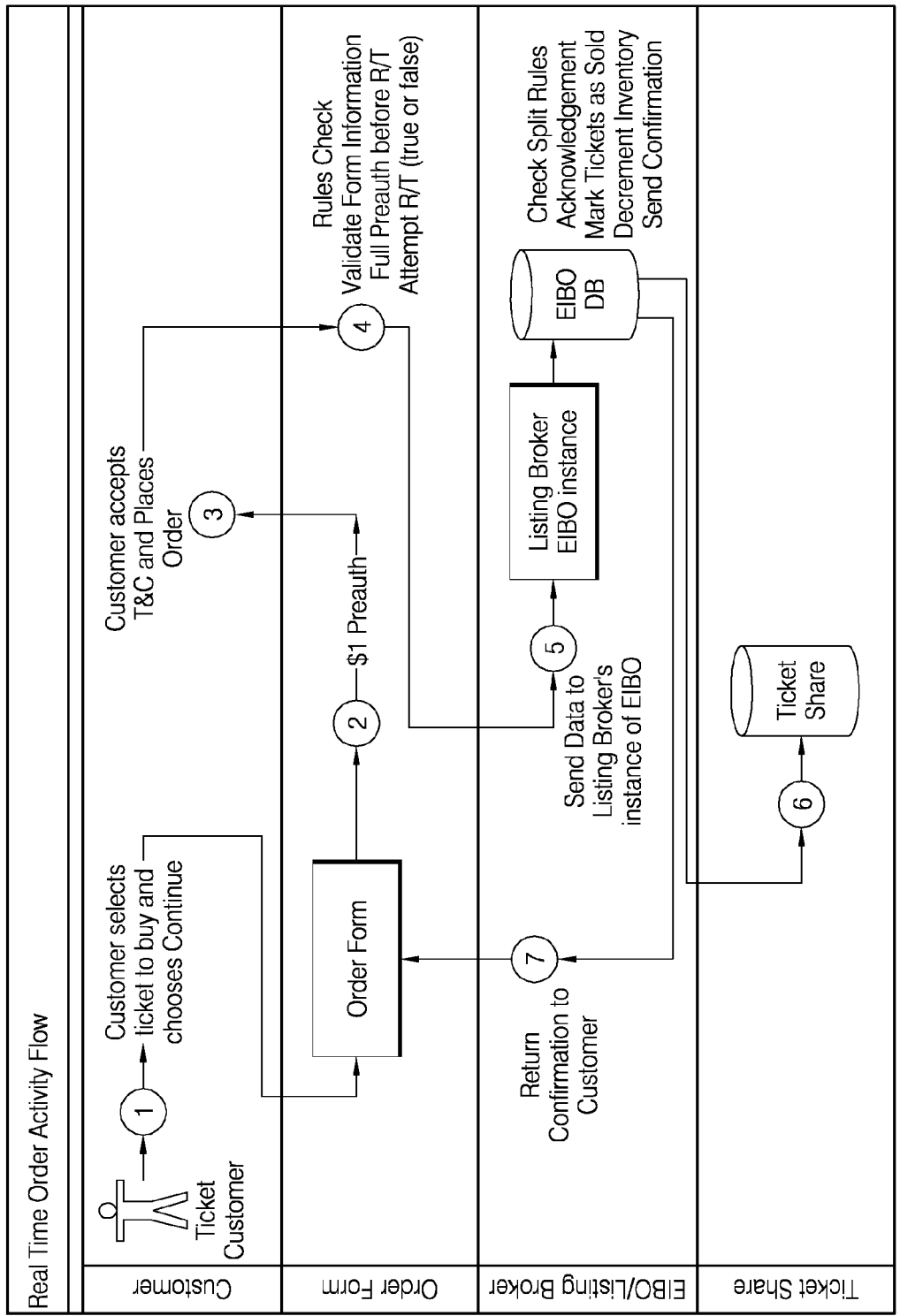
FIG. 7 illustrates an example transaction process.

Referring now to FIG. 7, an example order/purchase activity flow diagram is illustrated. The order flow is optionally used in conjunction with certain embodiments, but other order flows can be used as well, and the invention is not limited to use with a particular order flow. The illustrated process is optionally performed in real time or substantially real time. At state 1, a user, such as a ticket customer, accesses a form, such as web page form hosted by the management system host server discussed above. The user interface optionally presents one or more listings of events (e.g., concerts, sporting events, movies, etc., optionally organized into corresponding categories) and/or a search user interface via which the user can search for events and/or tickets for one or more events.

For example, the search user interface optionally includes one or more search fields. By way of illustration, a search field is provided (e.g., provided as a drop down menu listing one or more predefined terms and/or as a blank field via which the user can type in one or more terms) that can be used to specify a geographical area (e.g., city, state, zip code, etc.). In addition or instead, a search field is provided (e.g., provided as a drop down menu listing one or more predefined terms and/or as a blank field via which the user can type in one or more terms) that can be used to specify an event type (e.g., music, music-type (e.g., classical, rock, jazz, country, children's, pop, etc.), sports, theater, etc.). In addition or instead, a search field is provided (e.g., provided as a drop down menu listing one or more predefined terms and/or as a blank field via which the user can type in one or more terms) that can be used to specify an artist, team, movie, play and/or venue.

The user can activate a search control (e.g., a dedicated search initiate control, a return key, etc.), and the host system, using a local or remote search engine, then performs a search using the search criteria specified by the user, and identifies corresponding matches (if any) from the broker inventories as similarly discussed elsewhere herein. The search results are then presented to the user (e.g., listing events and/or event tickets). The search listing can include some or all of the following types of information, optionally in a table format:

Event name;
Date/time
Venue/Venue location;
Price per ticket;
Seat section;
Seat Row;
Number of tickets available;
Minimum tickets that can be purchased;
Maximum tickets that can be purchased;
Form of ticket (e.g., physical ticket, electronic ticket, etc.).

The search listing can be ordered from least expensive to most expensive, most expensive to least expensive, based on section, the number of available consecutive/contiguous seats, or otherwise. Optionally, a user interface is provided via which the user can specify the ordering (e.g., by clicking on a corresponding column heading). Optionally, tickets that have a hold placed on them (e.g., because another user is in the process of potentially purchasing the tickets) are excluded from the search results. Optionally, tickets that have a hold placed on them are included in the search results, but with an indication (e.g., the phrase "hold" and/or a graphical hold icon) that the tickets are on hold, optionally, with an indication as to when the hold period will expire if the tickets are not successfully purchased by the user from whom the tickets are on hold. Optionally, the hold status is updated in substantially real time to indicate if the hold status has changed. The user then selects a ticket (or a set of tickets). Optionally, the user can narrow the search via one or more search fields (e.g., via which the user can specify quantity, minimum price, and/or maximum price).

Once the user selects a ticket (or tickets), the user activates a "continue" control. An order form is presented via which the user can enter name, contact information (e.g., shipping address, payment information (e.g., payment instrument information, such as credit card number, debit card number, expiration date, billing address, etc.)). If the user already has an account with a service associated with the host server, the user optionally logs in (e.g., by providing a password and/or user ID), and the user's shipping and/or billing information is accessed from a customer database.

At state 2, a pre-authorization process is performed. For example, the process optionally determines if the user has already been preauthorized to make the purchase using data stored in a customer database. Optionally, information provided by the user via the order form is inspected and validated (e.g., the payment information is checked to determine if is valid, that the payment instrument has not expired, that there adequate funds/credit to cover the purchase, etc.). At state 3, the terms and conditions relating to the purchase are presented to the user. If the user indicates acceptance of the terms and conditions (e.g., by activating an "accept" type button), the order is placed and the process proceeds to state 4. At state 4 a rules check (e.g., a rule that specifies in which states tickets can or cannot be sold, the number of tickets that can be sold, that specifies how much lead time is needed in order to ship a ticket so that it reaches the purchaser prior to the event, etc.) is performed (although this process is optionally performed at an earlier or later state), and the data entered by the customer is validated. If the rules are satisfied and data validated, the process proceeds to state 5, and the data is sent to the listing broker supplying the ticket being purchased (e.g., to the listing brokers software instance of the agent). EIBO rules (e.g., specified by the listing broker, such as "do not sell the last 2 tickets for a specified event", "do not sell any tickets that are priced greater than a specified threshold value, do not sell to one or more specified persons/entities) are checked, and acknowledgement of the purchase request is returned to the host server, the ticket is marked as sold (to ensure, for example, that the ticket is not inadvertently sold again by the broker), the brokers ticket inventory count is decremented by an amount corresponding to the number of tickets being sold, and a confirmation of the sale is transmitted to the host server. At state 6, the host server database is synchronized with the ticket broker database to update the inventory data and corresponding status. Optionally, such synchronization is performed periodically (e.g., every 30 seconds, 1 minute, 2 minutes, 3 minutes, 4 minutes, 5 minutes, 10 minutes, 30 minutes, or other regular or irregular period) and/or in response to an action (e.g., a ticket purchase, a ticket search, etc.). At state 7, a confirmation is returned by the broker system to the management system, and from the management system to the customer.

FIG. 8 illustrates another example activity flow. The activity flow is product non-specific and optionally utilizes open standards. The flow illustrates how someone with access to a web browser (or other user interface that can access network resources) can buy tickets from a middleman, such as the operator of the management system, and how the middleman can acquire the desired inventory for the user in a real-time transaction from one or more brokers. At state 802, a user (e.g., a retail customer/individual customer) places an order (e.g., a ticket request), which at state 804 is transmitted over the Internet via a secure protocol (e.g., https (Hypertext Transfer Protocol over Secure Socket Layer)). The order may specify one or more specific tickets (e.g., reserved seat tickets for an event that specify the seat number/row/section or general admission/non-reserved seating tickets) or an acceptable quality, price range, or seating section as specified by the customer. At state 806, the order is received at a point of sale system (e.g., a website hosted by the management system host server or a ticket broker with their own inventory of tickets or other retail broker), which is coupled to an orders database and an inventory database.

The point of sale system identifies a listing broker that matches/corresponds to the order (e.g., by examining the inventory database which optionally contains substantially real time updates of broker vendors). At state 808, the point of sale system transmits the order data (e.g., including some or all of the following: number of tickets requested, event data/time, broker price (with discount were appropriate, wherein the discount may be an agreed upon discount from the broker's list ticket price that is granted to the management system operator, wherein the system operator may charge the purchaser the list price and retain the discount amount as payment for facilitating the transaction), ticket group identifier (used by the point of sale system to identify ticket inventory), point of sale ticket identifier, event name, venue name, seat row, seat section, starting seat, ending seat, purchaser identifier (e.g., contact information of purchaser, a broker identifier code if the purchaser is a broker, etc.), and listing broker identifier to a message creation module which creates a message to purchase the ticket(s) from the corresponding listing broker using some or all of the order data. At state 812, the message is received by a parser module. The parser module formats the ticket order message as an XML formatted buy tickets request message (although other formats, including format using other markup languages can be used), wherein the ticket order message is encoded and serialized. At state 814, the message is queued and transmitted to over a network to another point of sale system (e.g., associated with the listing broker).

For example, the XML formatted message is transmitted using a secure protocol over the Internet (or other network) to a module which, at state 816, receives and dequeues the tickets request message on the listing broker server. At state 818, the message is then processed by a parser module that parses and deserializes the message. At state 820, the message is then provided to the listing client/broker plugin (e.g., a piece of code that knows how to talk to the listing broker's POS, and/or assists with the process, so that a call can be mode to the local POS to pass the correct parameters).

At state 822, the order message is received by the listing broker, and the listing broker server processes the ticket request and determines if a corresponding ticket is available (e.g., not sold, locked, and/or not on hold) by examining the tickets and associated ticket status (e.g., available, on hold, locked, sold) via the listing broker inventory database. At state 824, if the ticket is available, the broker system marks the ticket as sold in the listing broker database (or optionally held if the user payment information has not yet been verified), makes the tickets unavailable to others, sells the ticket, and transmits a message via the plug-in indicating that the order was successful/accepted. If the ticket is not available, a request failure message is transmitted via the plug-in.

By way of example, a ticket order response message can include some or all of the following:
 a result element (with a true value if the ticket request is confirmed, and a false if the request is not confirmed);
 a message element (e.g., a free form message, which for example can be used for diagnostic information regarding errors or to provide an explanation as to an inability to fulfill a ticket order);
 a status code (e.g., with a value of: success, unknown client error, insufficient quantity, tickets do not exists, cannot split ticket, incorrect discount price, ticket already on hold, etc.);
 is consecutive seating (e.g., with a value indicating whether seating is contiguous);
 seat row;
 seat section;
 starting seat;
 ending seat;
 ship date (estimated ship date to user);

order cross reference identifier/number (foreign system order reference number).

At state 826, the message from the plug-in is then processed by a parser that encodes and serializes the success or failure message as an XML formatted message. At state 828, the XML formatted message is then queued and transmitted using a secure protocol over the Internet (or other network) to a module on the host server which, at state 830, receives and dequeues the tickets request message. At state 832, the message is then processed by a parser module which parses/decodes and deserializes the message. At state 834, the success/failure message is then transmitted to the point of sale system (e.g., of the retail broker). The point of sale then completes the sales process (if the tickets were available) and transmits a sales confirmation to the user (e.g., via a web page, email, SMS message, or otherwise), and updates its inventory and order database accordingly. If the ticket order was not successful, the user is so informed.

Figure 9:
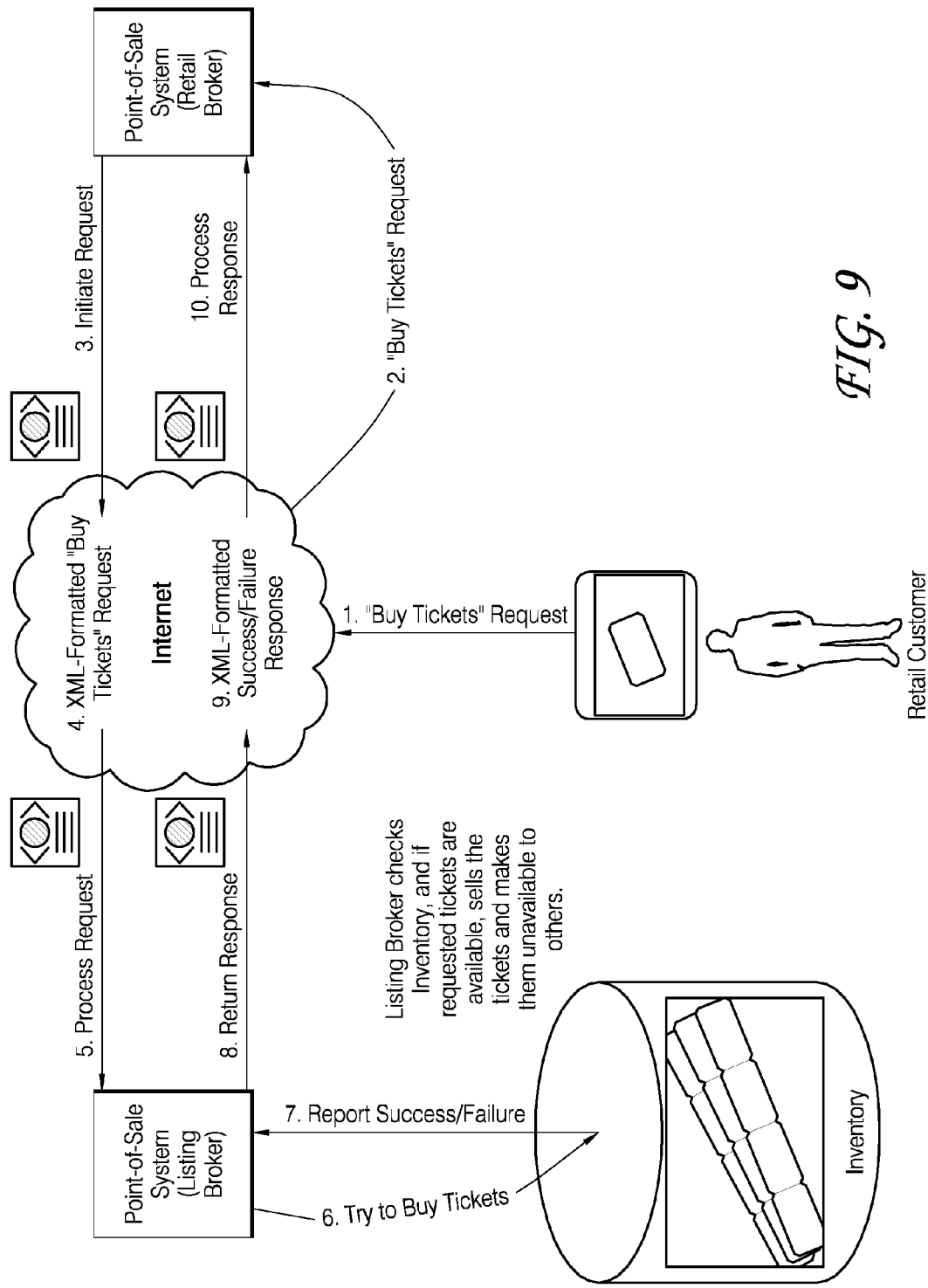
FIG. 9 illustrates example services.

FIG. 9 illustrates another example activity flow. At state 1, a user (e.g., a retail customer/individual customer) places an order (e.g., a ticket request) over the Internet via a secure protocol (e.g., https). The order may specify one or more specific tickets (e.g., reserved seat tickets for an event that specify the seat number/row/section or general admission/non-reserved seating tickets) or an acceptable quality, price range, or seating section as specified by the customer. At state 2, the order is received at a point of sale system (e.g., a ticket broker server associated with a retail broker), which is optionally coupled to an orders database and an inventory database of the broker.

The point of sale system identifies a listing broker that matches/corresponds to the ticket request (e.g., by examining the inventory database which optionally contains substantially real time updates of broker vendors to determine which broker holds/controls the tickets). At state 3, the point of sale system initiates a ticket request and transmits the order data (e.g., including some or all of the following: number of tickets requested, event data/time, broker price (with a discount the listing broker is providing the management system operator, were appropriate), ticket group identifier (used by the point of sale system to identify ticket inventory), point of sale ticket identifier, event name, venue name, seat row, seat section, starting seat, ending seat), and listing broker identifier to a parser module, which, formats the ticket order message as an XML formatted buy tickets request message (although other formats, including format using other markup languages can be used), wherein the ticket order message is encoded and serialized and transmitted to over a network to another point of sale system (e.g., associated with the listing broker).

At state 5, a module receives and dequeues the tickets request message on the listing broker server. The message is then processed by a parser module which parses/decodes and deserializes the message. The message is then provided to the listing client/broker system (e.g., a plugin which enables the listing broker to retrieve and send messages).

At state 6, the listing broker server processes the order and determines if a corresponding ticket is available (e.g., not sold, not locked, and/or not on hold) by examining the tickets and associated ticket status (e.g., available, on hold, locked, sold) via the listing broker inventory database. If the ticket is available, the broker system marks the ticket as sold in the listing broker database (or optionally on hold if addition confirmation is needed from the management system, such as confirmation that the user's payment instrument has been verified, at which point the ticket will be marked as sold), makes the tickets unavailable to others, sells the ticket, and at state 7 transmits a message intended for the management system host processor indicating that the order was successful/accepted. If the ticket is not available, a failure message is transmitted.

At state 8, the message from the plug-in is then processed by a parser that encodes and serializes the success or failure message as an XML formatted message. At state 9, the XML formatted message is then queued and transmitted using a secure protocol over the Internet (or other network) to a module that receives and dequeues the tickets request message. At state 10, the message is then processed by a parser module which parses/decodes and deserializes the message. The success/failure message is then transmitted to the point of sale system (e.g., of the retail broker). The point of sale then completes the sales process (if the tickets were available) and transmits a sales confirmation to the user (e.g., via a web page, email, SMS message, or otherwise), and updates its inventory and order database accordingly. If the ticket order was not successful, the user is so informed.

Figure 10:
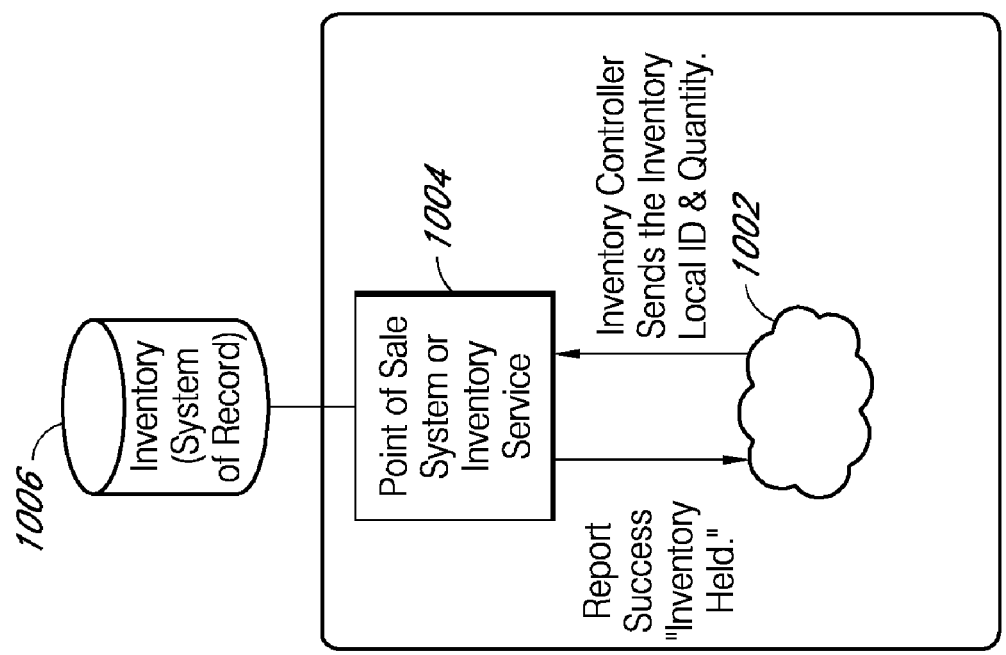
FIG. 10 illustrates another example inventory component.

FIG. 10 illustrates an example inventory system. An inventory controller 1002 is configured to transmit the inventory local identifier and quantity to a point of sale system or inventory service 1004 (e.g., that of an associated listing broker). The point of sale or inventory system 1004 is configured to process orders sent via the inventory controller and determine the availability of tickets in an inventory database 1006. The point of sale or inventory system 1004 is further configured to report a successful order (e.g., report inventory held) if the requested tickets are available, and a failure if the tickets are not available.

Figure 11A:
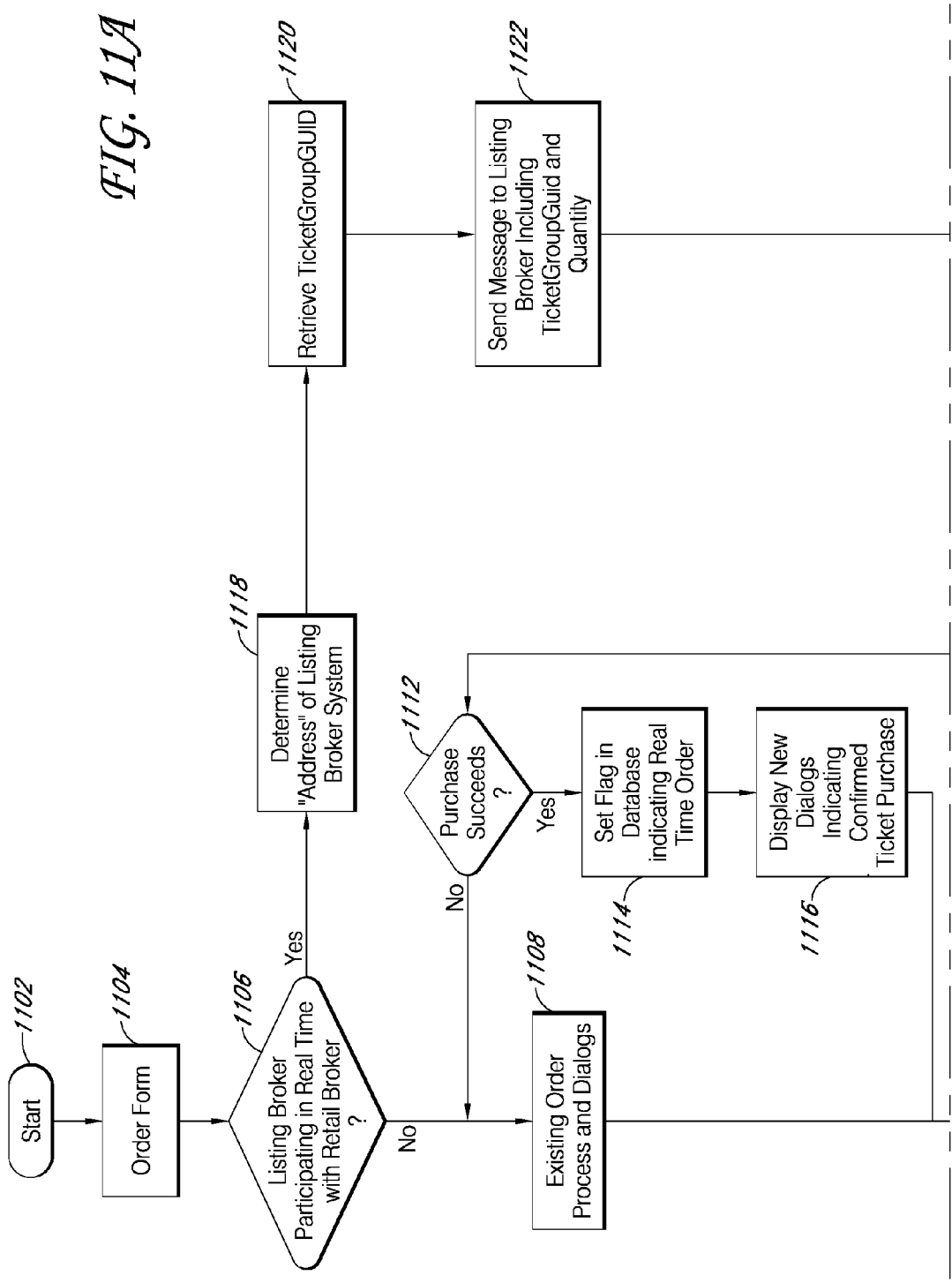
FIG. 11 (including FIGS. 11A-B) illustrates an example transaction process.
Figure 12:
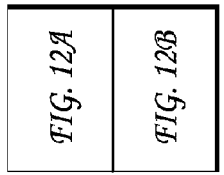
FIG. 12 (including FIGS. 12A-B) illustrates an example data flow.
Figure 12A:
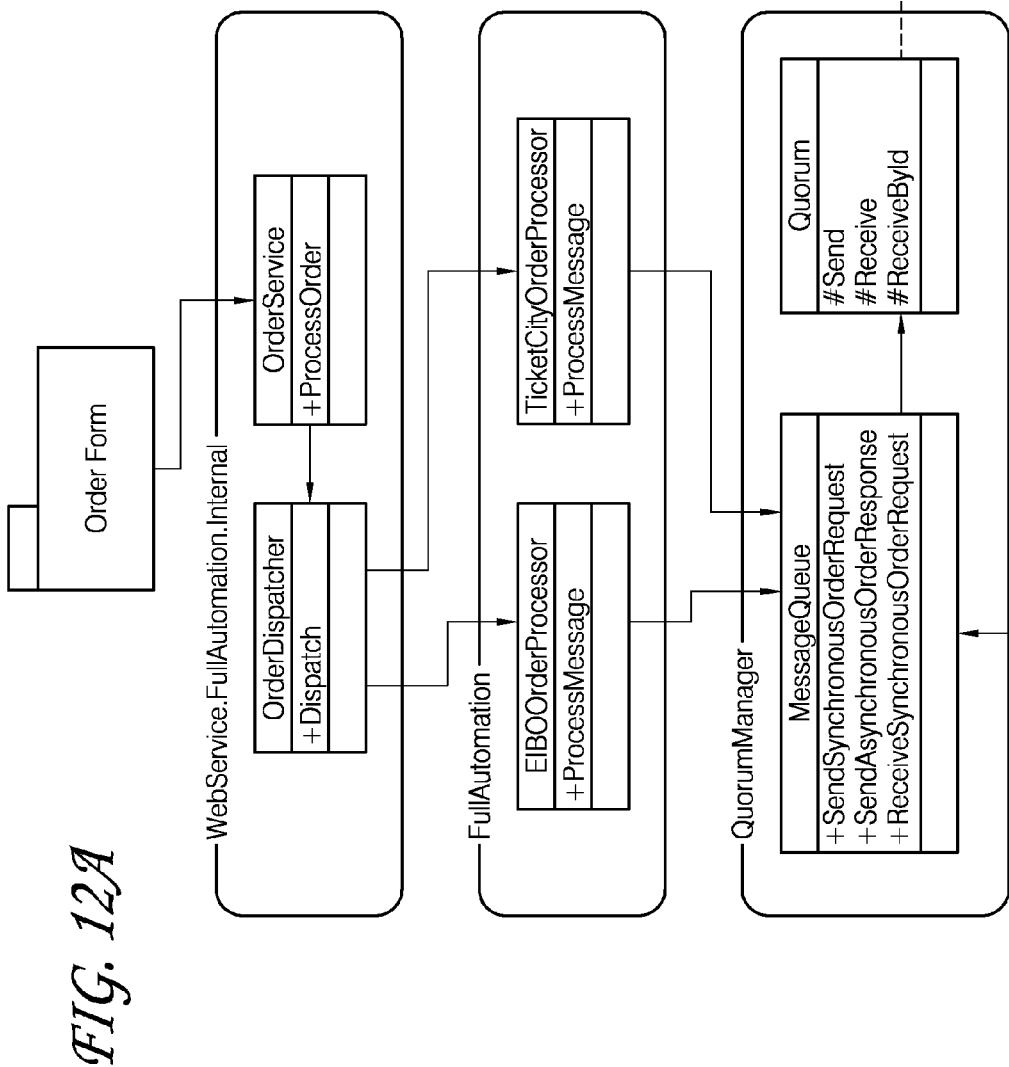
Figure 12B:
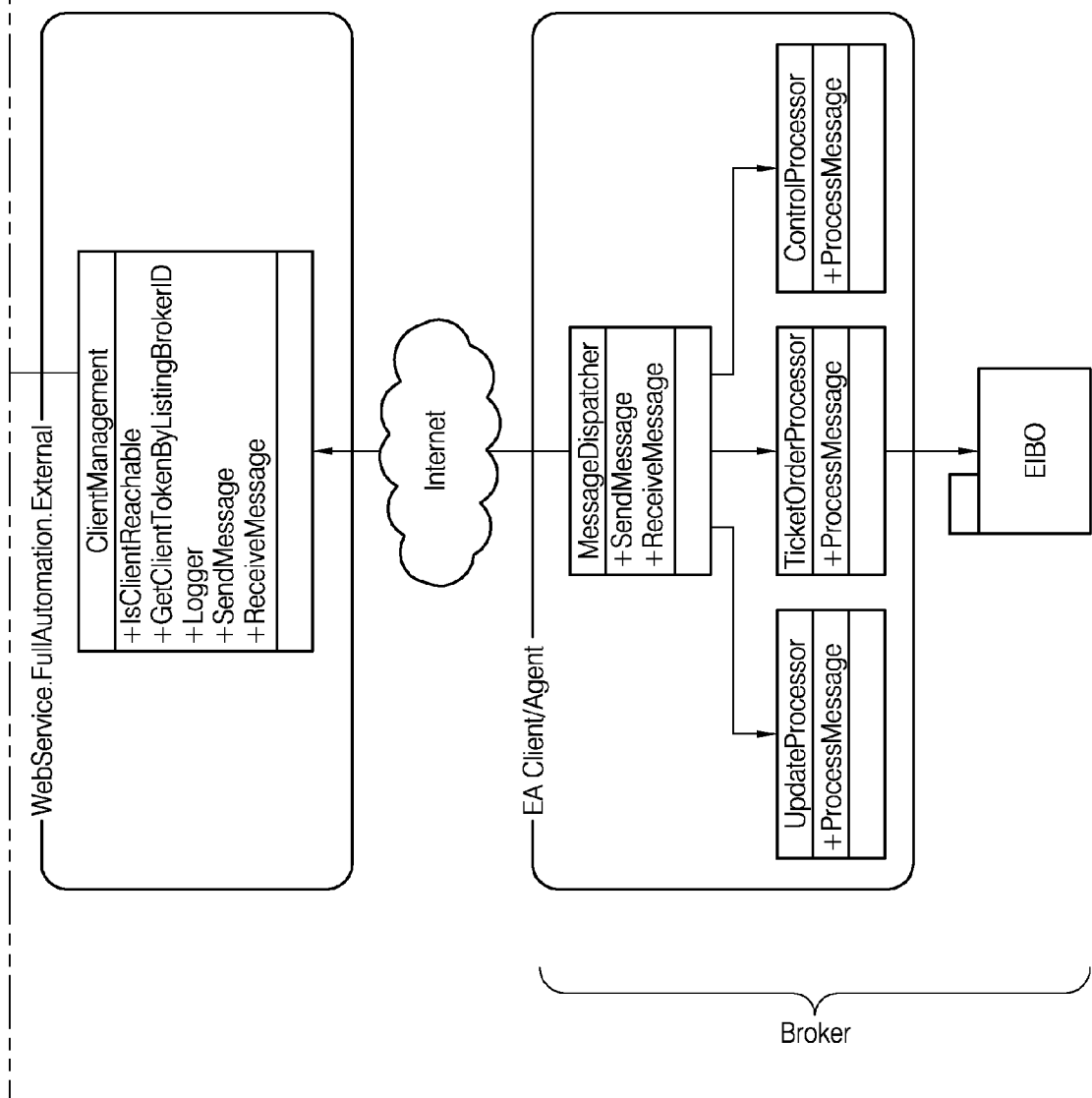

FIG. 11 illustrates an example transaction process. At state 1102, the process begins. At state 1104, an order form hosted on a website server (e.g., a host server associated with a service, such as a retail broker/aggregator, that provides access to tickets of a plurality of ticket brokers) is accessed by a user via a user terminal (e.g., a computer, phone, television, etc.). The user places a request or order for one or more tickets (e.g., specific reserved seat tickets or an acceptable quality, price range, or seating section). If a specific ticket is being ordered a unique identifier associated with the ticket (TicketID) is used to lookup (e.g., in a host server inventory database) who is the listing broker that owns/controls the ticket. At state 1106, a determination is made (e.g., by the host server) as to whether a listing broker is participating in real-time ordering with the host server. If the listing broker is participating in real-time ordering with the host server, the process proceeds to state 1118, and the address of the broker is determined (e.g., using an electronic address database that lists the listing brokers address (e.g., URL)). At state 1120, a ticket group identifier (TicketGroupGUID, which may be an identifier assigned by the management system for a group of tickets offered by a ticket holder via the listing broker or owned outright by the listing broker) is retrieved from the host server inventory database using the ticket identifier (TicketID) assigned by the listing broker. A message, including the ticket group identifier (TicketGroupGUID) and the ticket quantity being ordered is transmitted to the listing broker system. Optionally, the TicketID and TicketGroupGUID may be the same value.

At state 1124, the listing broker system determines that the listing broker has access to a sufficient quantity of appropriate tickets to satisfy the request ticket quantity (e.g., using the ticket group identifier (TicketGroupGUID) as a search key). If the listing broker does not have access to a sufficient quantity of tickets, the process proceeds to state 1134 and a failure message is returned.

If, at state 1124, the listing broker system determines that the listing broker has access to a sufficient quantity, the process proceeds to state 1126, and a determination is made as to whether the requested quantity is less that the ticket group quantity (associated with the TicketGroupGUID). If the requested quantity is less that the ticket group quantity, the process proceeds to state 1128 and the ticket group is split into two or more groups, where one group is sufficient to satisfy the requested quantity. At state 1130, the requested tickets are marked as being held for the user. At state 1132, a determination is made as to whether any failures occurred (e.g., business rules failures). If no error occurred, a success message is returned. If an error occurred, a failure message is returned.

At state 1112, a determination is made as to whether the purchase was successful. If not, the user is optionally so informed (e.g., via a webpage in substantially real time and/or via an email, SMS message, etc.), and the process ends at state 1110. If the purchase was successful, the process proceeds to state 1114, and a flag is set in the host server database indicating that the real time order has been placed. At state 1116, a notification is transmitted to the user (e.g., in substantially real time via a web page, or via an email, SMS message, instant message or otherwise) confirming the ticket purchase. At state 1110, the process ends.

If, at state 1106, a determination is made that the listing broker is not participating in real-time ordering with the host server, the process proceeds to state 1108 and a non-real time order process is performed, wherein the order is placed with the listing broker at a later time or at the current time, but where the order processing takes place at a later time or over an extended period of time. The process then proceeds to state 1110, and the process ends.

Figure 13:
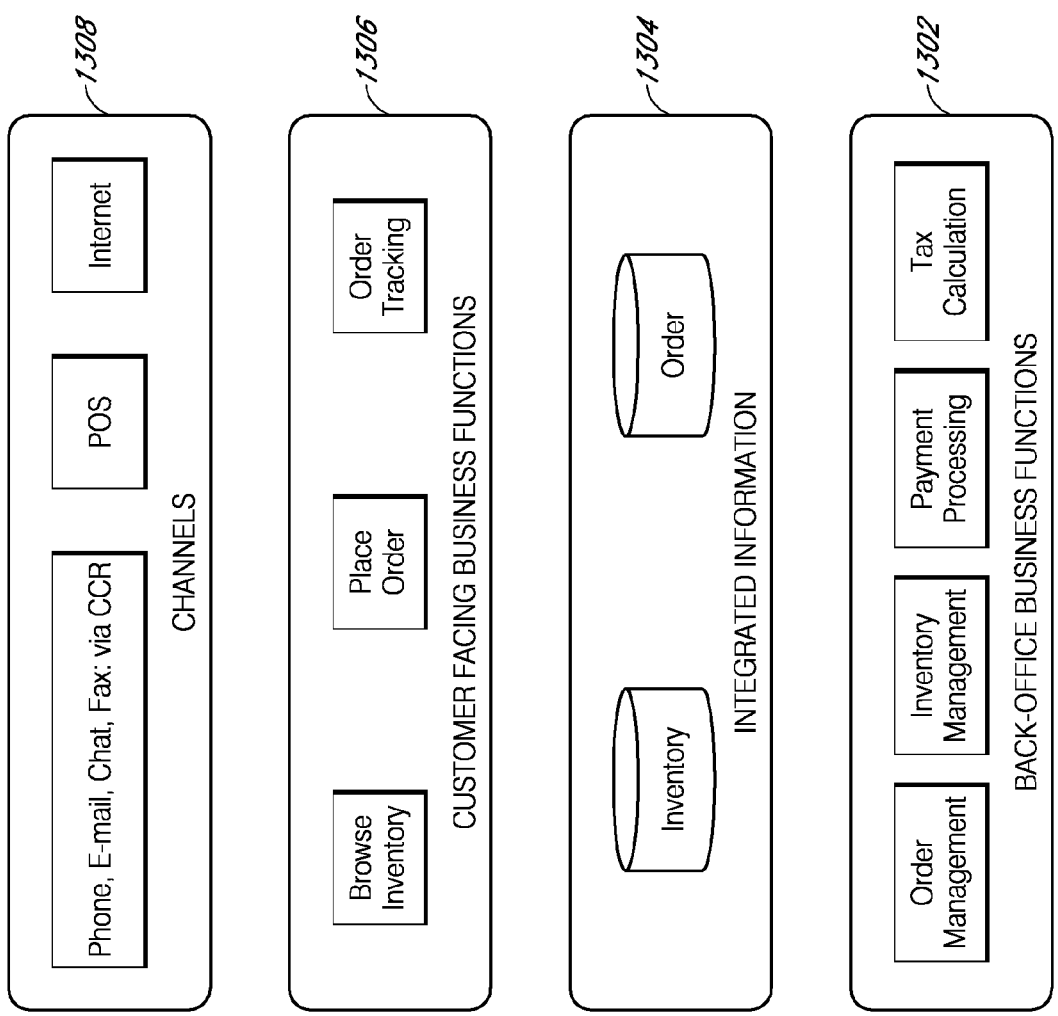
FIG. 13 illustrates example components.

FIG. 13 illustrates example components, although fewer, additional, and different components can be used. Back office functions 1302 are implemented via order management, inventory management, payment processing, and tax calculation modules. Integrated information components 1204 include an inventory database (e.g., including ticket inventory data obtained in substantially real time from a plurality of brokers). Example customer facing business components include a browse inventory module (enabling a user to browse through ticket inventors and/or search for tickets), an order placement module (via which a user can place an order for tickets), and an order tracking module (which tracks the order process and provide notifications to the user regarding the success or failure of an order, as well as delivery/shipping information).

Channel components (communication mediums via which the system interacts with a user) include phone (e.g., human and/or automated interactive voice response systems), email, fax, point of sale, and Internet applications via which a user can access the system, search for tickets, place ticket orders, and receive order status information.

A ticket order from a user (e.g., an individual user or a broker) may be placed via a channel, (e.g., fax, phone, point of sale terminal, Internet, etc.) for one or more tickets associated with corresponding unique identifiers. The order is received by the common business services (e.g., the order management module. The order management module can request the inventory management module to place a hold on the requested tickets. The inventory management module accesses the retail inventory database(s) (e.g., those of the listing broker(s)), authenticates the ticket identifiers, and instructs the associated one or more retail POS/broker system to place a hold on the tickets. For example, the inventory management system passes order information (e.g., client ID, TicketID, Quantity) to a database management system. If the corresponding broker/retail POS has not opted in to selling tickets via the management system or has a rule that prohibits the sale of tickets to the broker associated with the client ID, a failure will be returned. Otherwise, the tickets are placed on hold.

The retail POS (point of sale) verifies that the hold was placed on the tickets and communicates the hold verification to the inventory management module that records the hold in its data store. The inventory management system transmits an acknowledgement of the hold to the order management system. If the inventory management module does not receive a response from the POS or receives a failure message, the inventory management module signals a failure to the order management system. The order management module communicates with the tax calculation module to calculate the taxes, if any, on the order. The order management module also instructs the payment processing module to process the payment for the ticket order. The order management module also transmits an order acknowledgement/confirmation via one or more of the channels. Optionally, the order is guaranteed. The order management module optionally coordinates the seeking and reporting of real-time ticket status from the broker system or other point of sale system. Optionally, orders routed via the order management module will take priority (have a higher priority) over orders placed at approximately the same time via other ordering systems. Optionally, orders routed via the order management module will have a lower priority relative to orders placed at approximately the same time via other ordering systems. If for some reason the purchase process fails, the order management system communicates the failure to the inventory management module, and the hold is taken off the tickets. Otherwise, if the purchase process is successful, the order management system communicates the success to the inventory management module, and the tickets are marked as sold.

Figure 14:
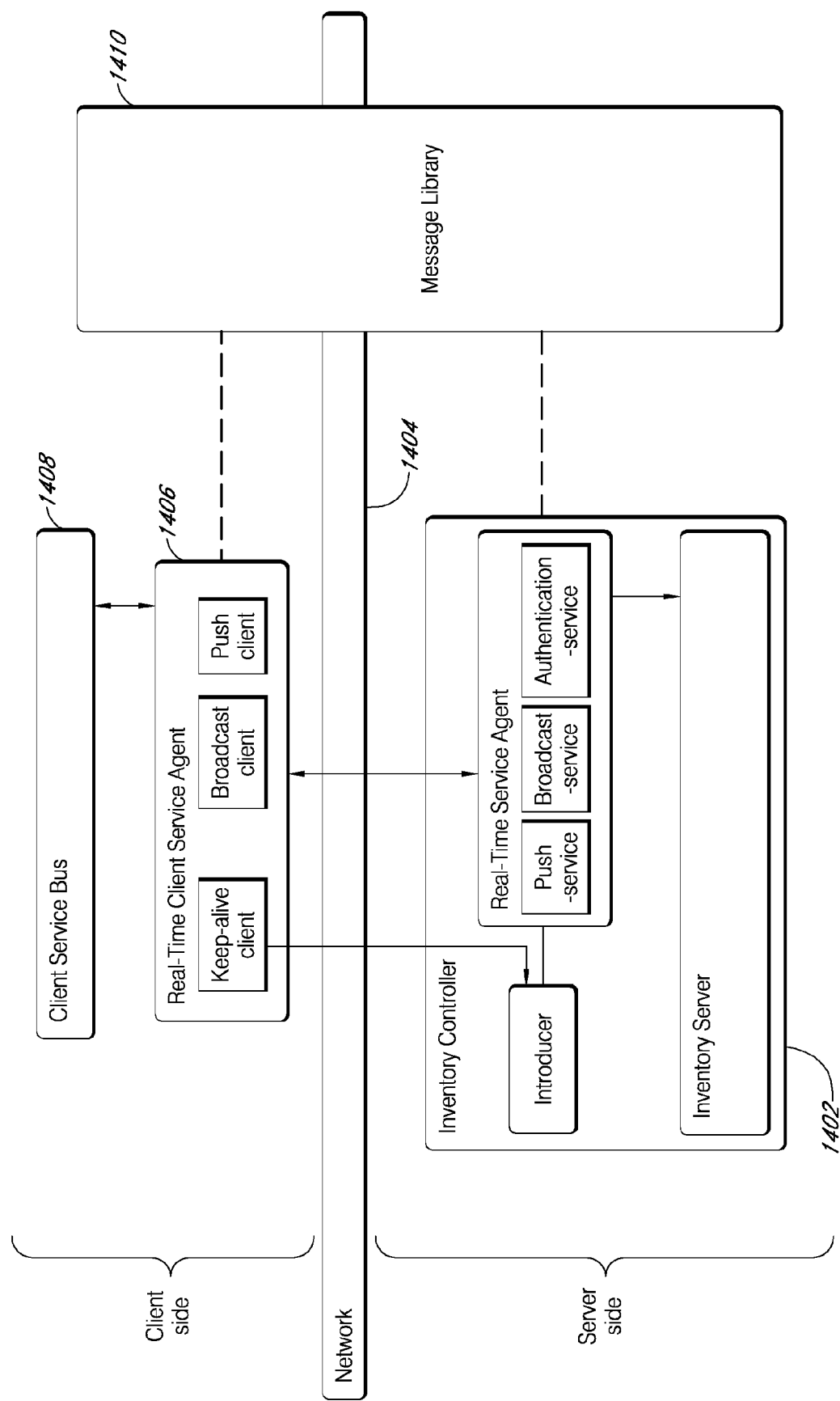
FIG. 14 illustrates example system components.

FIG. 14 illustrates example inventory controller 1402 components, client service agent 1406 components, and their interconnections with a network 1404, a client service bus 1408 (an interface used to access real-time services), and a message library 1410 (which stores common definitions for messages used by real-time services.

The example host server-side inventory controller 1402 includes an introducer (where the listing broker would initiate communications with the management system by first communicating with the introducer and which tracks the health of the connection to corresponding brokers) a real time service agent (e.g., including a push service (e.g., a service for sending messages from the management system to one or more broker systems, either to specific brokers or via a broadcast message to all (connected) broker systems or a subset thereof), a broadcast service, and an authentication service (to authenticate a given broker system and to determine if the broker system is authorized to communicate with the broker system), and an inventory server (e.g., that searches and accesses inventory data and implements business rules). The host server-side inventory controller 1402 receives and transmits messages across the network 1404 (e.g., the Internet or other network) with the client service agent 1406. The real time client chat service agent 1406 includes a keep alive client (that keeps the connection across the network 1404 to the inventory controller 1402 alive), a broadcast client, and a message client.

Figure 15:
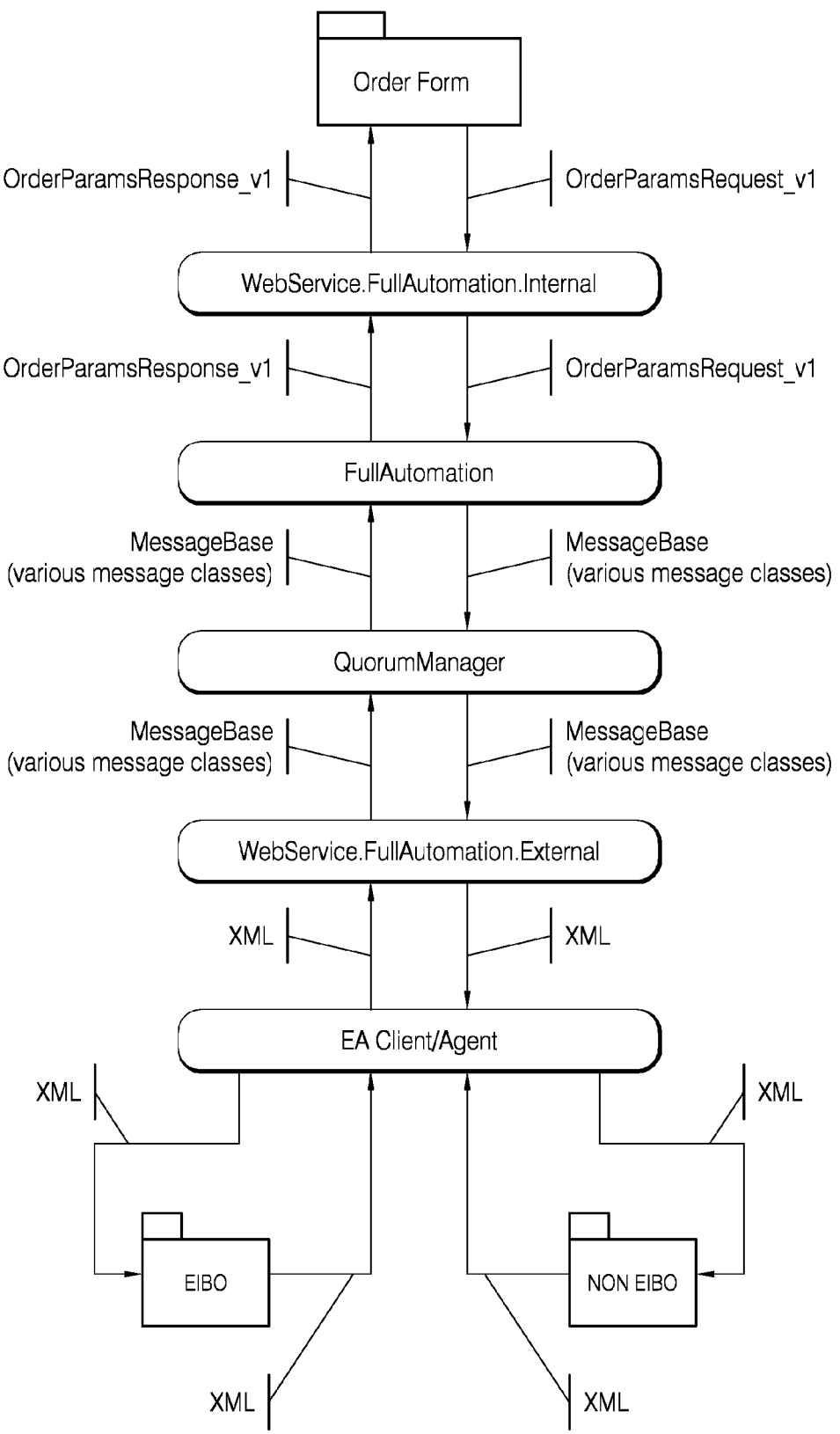
FIG. 15 illustrates an example message flow.

FIG. 15 illustrates an example message flow. User order parameters (e.g., specified event tickets, quantity, etc.) provided via an order form is received by web services/internal, are then passed to an auction module, which transmits messages associated with one or more corresponding message classes to a quorum manager. The quorum manager transmits the message to web services/external, which formats the message using XML. The XML formatted message is transmitted to the client/agent, which is the received using EIBO and/or non-EIBO data store.

Similarly, the EIBO and non-EIBO pass data back to the client/agent, which returns XML formatted messages to the web services/external, and so on.

Figure 16A:
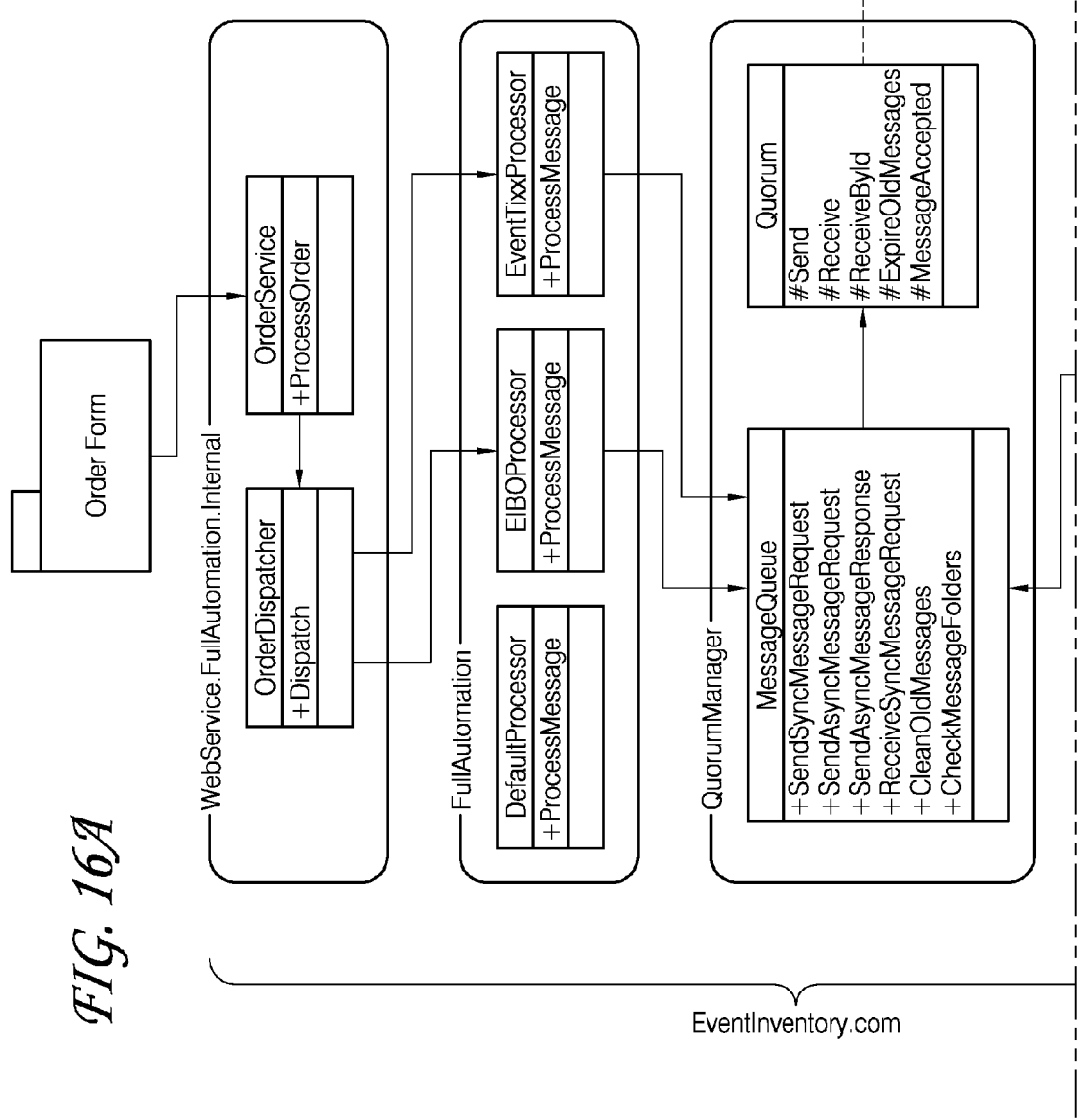
FIG. 16 (including FIGS. 16A-B) illustrates example service processing.
Figure 16B:
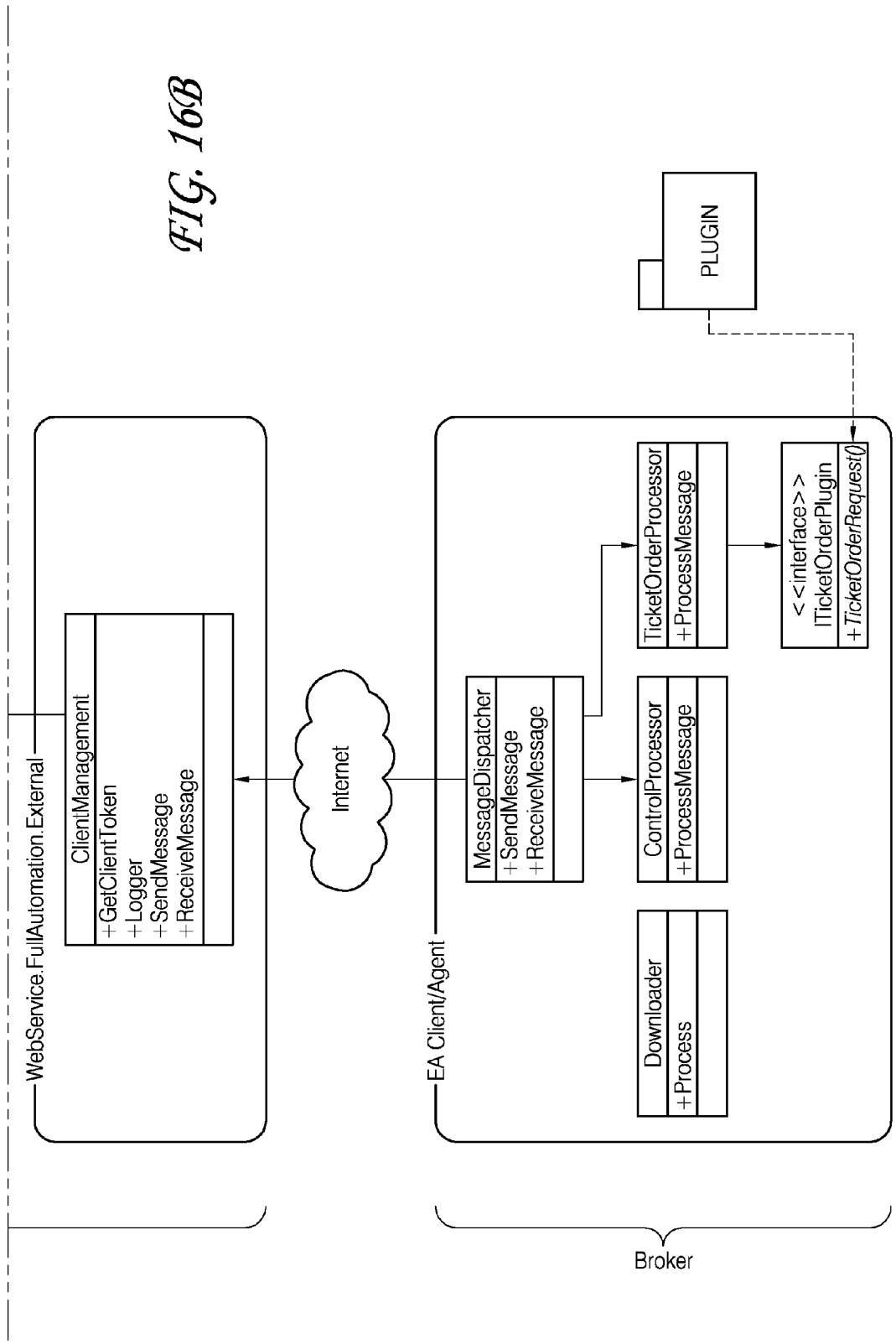

FIG. 16 illustrates example optional services. An order is processed by an order service. The order is provided to an order dispatch service that transmits the order to an order processor that processes the order.

The broker client/agent includes a message dispatcher used to receive or send messages (e.g., over a network). An update processor processes messages which can be used to update ticket inventory records. A ticket order processor service processes ticket order and communicates with the EIBO. A control processor processes messages as similarly described above (e.g., identifies whether the message is a request to access the inventory and/or to determine the availability of a particular ticket; identify a request to place a ticket on hold, or to mark a ticket as having been sold; and/or identify a request to mark a ticket as available after the ticket was placed on hold or marked as sold, etc.).

Thus, as described herein, certain embodiments provide systems and methods for integrating multiple systems, including multiple proprietary systems, while providing high-throughput, secure, real time communication (initiated by the host server or a client broker system), without exposing the client/broker system to other broker system.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which is in no way intended to limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Although embodiments have been described with reference to specific exemplary embodiments, it will be evident that the various modification and changes can be made to these embodiments. Accordingly, the specification and drawings are to be regarded in an illustrative sense rather than in a restrictive sense. The foregoing specification provides a description with reference to specific exemplary embodiments. It will be evident that various modifications may be made thereto without departing from the broader spirit and scope as set forth in the claims. The specification and drawings are, accordingly, to be regarded in an illustrative sense rather than a restrictive sense.

What is claimed is:

1. A method for managing network communications, comprising:

receiving a request for a first resource from a first requester at a resource management system, the resource management system coupled to a first plurality of broker systems, wherein the resource management system is separate from the first plurality of broker systems, wherein at least one broker system in the first plurality of broker systems is operated by a different entity than an entity operating the resource management system, and at least one broker system in the first plurality of broker systems maintains a different inventory of resources than another broker system in the first plurality of broker systems, and wherein at least one broker system in the first plurality of broker system utilizes a different message format than at least other broker system in the first plurality of broker systems;

maintaining a resource data store storing resource identifiers and associated statuses updated in substantially real time based on status data received from the first plurality of broker systems;

identifying a first broker system in the first plurality of broker systems controlling the first resource using the resource data store;

identifying a message format that will be understood by the first broker system based at least in part on information obtained from a module associated with the first broker system;

formatting a message in accordance with the identified message format of the first broker system, the message including an identifier associated with the first resource and an identifier associated with the first requester, wherein the message is configured to cause, at least in part, the first resource to be marked as sold and/or on hold by the first broker system;

at least partly causing the message to be serialized, wherein the serialized message is transmitted over a network to the first broker system;

receiving an indication via the first broker system as to whether the first broker system has placed a hold on the first resource and/or marked the first resource as sold for the first requester; and if an indication is received from the first broker system that a hold has been placed on the first resource for the first requester and/or the first resource has been marked as sold for the first requester, at least partly causing the first resource to be transferred to the first requester.

2. The method as defined in claim 1, the method further comprising,
causing at least in part a first resource request to be formatted as an XML message.

3. The method as defined in claim 1, the method further comprising causing the module to be provided via the resource management system to one or more broker systems.

4. The method as defined in claim 1, the method further comprises receiving an indication as to whether at least one resource request requested a quantity of resources that exceeds a broker specified maximum of offered resources, wherein the offered resources are offered tickets.

5. The method as defined in claim 1, the method further comprises receiving an indication as to whether at least one resource request requested a quantity of resources that was less than a broker specified minimum of offered resources, wherein the offered resources are offered tickets.

6. The method as defined in claim 1, the method further comprising maintaining a blacklist specified by at least one broker that indicates which potential purchasers are not permitted to obtain resources from the at least one broker.

7. The method as defined in claim 1, the method further comprising maintaining a blacklist specified by least one broker that indicates by name which potential purchasers are not permitted to obtain resources from the at least one broker.

8. The method as defined in claim 1, the method further comprising maintaining a blacklist specified by at least one broker that indicates by type of potential purchaser which potential purchasers are not permitted to obtain resources from the at least one broker.

9. The method as defined in claim 1, wherein the request specifies a quantity of resources greater than one.

10. The method as defined in claim 1, the method further comprising assigning unique resource identifiers to corresponding resources from the first plurality of broker systems.

11. The method as defined in claim 1, wherein the first resource is an event admission voucher.

12. The method as defined in claim 1, the method further comprising:
providing an auto-updater module for the first broker system, the auto-updater module configured to perform operations comprising:
detecting a communication error between the first broker system and the resource management system; and
at least partly in response to detecting the communication error between the first broker system and the resource management system, causing at least one software application or setting on the first broker system to be automatically updated.

13. The method as defined in claim 1, the method further comprising:
providing software that receives an indication as to a configuration change on at least one broker system; and
at least partly causing the module associated with the first broker system to be updated or replaced based at least in part on receiving an indication regarding a first configuration change of the first broker system.

14. The method as defined in claim 1, the method further comprising receiving an indication that a software configuration of the first broker system has changed.

15. A method for managing network communications, comprising:
receiving at a resource management system over a network from a first plurality of broker systems substantially real-time status information regarding resources managed by respective broker systems in the first plurality of broker systems, wherein the resource management system is separate from the first plurality of broker systems, wherein at least one broker system in the first plurality of broker systems is operated by a different entity than an entity operating the resource management system, and at least one broker system in the first plurality of broker systems maintains a different inventory of resources than another broker system in the first plurality of broker systems;
maintaining a resource data store storing resource identifiers and associated real-time status information;
receiving a request for a first resource from a first requester at the resource management system;
identifying a first broker system in the first plurality of broker systems controlling the first resource using the resource data store;
formatting a message including an identifier associated with the first resource and an identifier associated with the first requester;
transmitting the message over the network to the first broker system;
receiving an indication from the first broker system as to whether the first resource has been reserved for the first requester; and
if an indication is received from the first broker system that the first resource has been reserved for the first requester, facilitating the transfer of the first resource to the first requester.

16. The method as defined in claim 15, transmitting code configured to execute on the first broker system, wherein the code is configured to store an indication that a specified ticket is sold in response to a communication from the resource management system.

17. The method as defined in claim 15, the method further comprising:
monitoring the communication status with the first plurality of broker systems;
if the communication status of a given broker system is determined to be unsatisfactory, storing an indication that the status of resources managed by the given broker system is not reliable and inhibiting the offering of resources from the given broker system.

18. The method as defined in claim 15, the method further comprising:
receiving communication protocol information from a plurality of broker systems, wherein at least one broker system uses a different communication protocol than at least one other broker system;
at least partly based on the received protocol information, identifying a communication protocol associated with the first broker system; and
formatting the message in accordance with the identified protocol and using information related to the identified protocol in determining when a communications error has occurred with respect to the first broker system.

19. The method as defined in claim 15, wherein the first request specifies a quantity of resources greater than one.

20. The method as defined in claim 15, wherein the message is a serialized XML message.

21. The method as defined in claim 15, the method further comprising assigning unique resource identifiers to corresponding resources from the first plurality of broker systems.

22. The method as defined in claim 15, wherein the first resource is an event admission voucher.

23. The method as defined in claim 15, wherein the first resource is a ticket.

24. The method as defined in claim 15, wherein the first resource is a ticket, wherein the ticket includes an association between a user identification device and a right to access an event stored in a data store.

25. The method as defined in claim 15, the method further comprising providing an updater module for the first broker system, the updater module configured to perform operations comprising:
  detecting a communication error between the first broker system and the resource management system; and
  at least partly in response to detecting the communication error between the first broker system and the resource management system, causing at least one software application or setting on the first broker system to be automatically updated.

26. The method as defined in claim 15, the method further comprising receiving an indication that a software configuration of the first broker system has changed.

27. The method as defined in claim 15, wherein a first request for at least one resource includes:
  a ticket quantity; and
  a ticket identifier.

28. The method as defined in claim 15, wherein a first request for at least one resource includes:
  a seat section;
  a starting seat; and
  an ending seat.

29. The method as defined in claim 15, the method further comprising processing a first plurality of ticket request responses from at least a first portion of the plurality of broker systems, wherein a first plurality of ticket responses include the following status:
  success;
  insufficient quantity;
  requested tickets do not exist;
  requested tickets already on hold or sold.

30. The method as defined in claim 15, the method further comprising processing at least one response to a resource request for a ticket from at least one broker system indicating that seats corresponding to the at least one request are contiguous.

31. The method as defined in claim 15, the method further comprising processing at least one response to a resource request for a ticket from at least one broker system indicating a ticket ship date.

32. The method as defined in claim 15, the method further comprising processing at least one response to a resource request for a ticket from at least one broker system indicating an order cross reference identifier.

33. The method as defined in claim 15, the method further comprising automatically tracking the configuration or a of the first plurality of broker systems and facilitating the provision of software updates to one or more of the first plurality of broker systems at least partly based on configuration changes of the one or more of the first plurality of broker systems.

34. The method as defined in claim 15, the method further comprising:
  storing a plurality of rules defined by one or more brokers;
  receiving a second request from a second requester for a second resource, wherein the second requester is a broker;
  identifying a second ticket broker that controls the second resource;
  accessing a rule defined by the second broker, wherein the second broker defined rule indicates whether the second broker will approve an order from another broker; and
  applying the second broker rule to the second request.

35. The method as defined in claim 15, the method further comprising providing information regarding:
  the percentage and/or number of brokers available to accept ticket orders; and
  the percentage and/or number of brokers that have not reported information regarding their ticket inventory for one or more specified periods of time.

36. The method as defined in claim 15, the method further comprising providing information regarding:
  the percentage and/or number of brokers that have not upgraded a first software to a first software version; and
  the number of brokers utilizing a first version of the first software.

37. The method as defined in claim 15, the method further comprising providing information regarding:
  a unique identifier associated with a first broker associated with the first broker system; and
  a time the first broker system last connected to and/or provided an inventory updates to the resource management system.

38. The method as defined in claim 15, further comprising provide a report indicating the percent of tickets sold in a specified time period using a specified process.

39. The method as defined in claim 15, further comprising provide a report indicating the percent of an inventory of tickets that is eligible to be sold using a specified process.

40. The method as defined in claim 15, further comprising providing a report indicating the success rate for at least a portion of the first plurality of brokers relating to completion of ticket transactions.

41. The method as defined in claim 15, further comprising provide a report indicating an amount of time that a given broker is connected to the management system.

42. Programmatic code stored on a non-transitory computer readable medium, that when executed by a computing system comprising one or more computing devices is configured to cause the computing system perform operations comprising:
  receive from a first plurality of broker systems substantially real-time status information regarding resources managed by the first plurality of broker systems,
  wherein at least one broker system in the first plurality of broker systems is separate from at least one other broker system in the first plurality of broker systems, and at least one broker system in the first plurality of broker systems uses a different message format than at least one other broker system in the first plurality of broker systems, and at least one broker system in the first plurality of broker systems maintains a different inventory of resources than another broker system in the first plurality of broker systems;
  maintain a resource data store storing resource identifiers and associated real-time status information;
  receive a request for a first resource from a first requester;
  identify a first broker system controlling the first resource using the resource data store;
  generate a message including an identifier associated with the first resource and an identifier associated with the first requester;
  transmit the message to the first broker system;
  receive an indication as to whether the first broker system has made available the first resource to the first requester; and if an indication is received from the first broker system that the first broker system has made available the first resource to the first requester, facilitate the transfer of the first resource to the first requester.

43. The programmatic code as defined in claim 42, wherein the programmatic code is further configured to cause the computing system to perform operations comprising: process at least one response to a resource request for at least one ticket from at least one broker system indicating that seats corresponding to the at least one resource request for at least one ticket are contiguous.

44. The programmatic code as defined in claim 42, wherein the programmatic code is further configured to cause the computing system to perform operations comprising: process at least one response to a resource request for a ticket from at least one broker system indicating a ticket ship date.

45. The programmatic code as defined in claim 42, wherein the programmatic code is further configured to cause the computing system to perform operations comprising: process at least one response to a resource request for a ticket from at least one broker system indicating an order cross reference identifier.

46. The programmatic code as defined in claim 42, wherein the programmatic code is further configured to cause the computing system to perform operations comprising: automatically track the configuration of the first plurality of broker systems and facilitate the provision of software updates to one or more of the first plurality of broker systems at least partly based on configuration changes of the one or more of the first plurality of broker systems.

47. The programmatic code as defined in claim 42, wherein the programmatic code is further configured to cause the computing system to perform operations comprising:
to store a plurality of rules defined by one or more brokers;
receive a second request from a second requester for a second resource, wherein the second requester is a broker;
identify a second ticket broker that controls the second resource;
access a rule defined by the second broker, wherein the second broker defined rule indicates whether the second broker will approve an order from another broker; and
apply the second broker rule to the second request.

48. The programmatic code as defined in claim 42, wherein the programmatic code is further configured to cause the computing system to perform operations comprising:
provide information regarding:
the percentage and/or number of brokers available to accept ticket orders; and
the percentage and/or number of brokers that have not reported information regarding their ticket inventory for one or more specified periods of time.

49. The programmatic code as defined in claim 42, wherein the programmatic code is further configured to cause the computing system to perform operations comprising:
provide information regarding:
the percentage and/or number of brokers that have not upgraded a first software to a first software version; and
the number of brokers utilizing a first version of the first software.

50. The programmatic code as defined in claim 42, wherein the resources are event tickets.

51. A system for managing network communications, comprising:
a computing device;
programmatic code stored in a non-transitory computer readable medium, that when executed by a computing system comprising one or more computing devices is configured to cause the computing system to perform operations comprising:
receiving a request for a first resource from a first requester at a resource management system, the resource management system coupled to a first plurality of broker systems
wherein at least one broker system in the first plurality of broker systems is separate from at least one other broker system in the first plurality of broker systems, and at least one broker system in the first plurality of broker systems uses a different message format than at least one other broker system in the first plurality of broker systems, and at least one broker system in the first plurality of broker systems maintains a different inventory of resources than another broker system in the first plurality of broker systems;
maintaining a resource data store storing resource identifiers and associated statuses updated in substantially real time based on status data received from the first plurality of broker systems;
identifying a broker system controlling the first resource using the resource data store;
identifying a message format that will be understood by the broker system based at least in part on information obtained from a module associated with the broker system;
formatting a message in accordance with the identified message format, the message including an identifier associated with the first resource and an identifier associated with the first requester, wherein the message instructs the broker system to cause the first resource to be marked as sold and/or on hold;
transmitting the message over a network to the broker system;
receiving an indication via the broker system as to whether the broker system has placed a hold on the first resource and/or marked the first resource as sold for the first requester; and
if an indication is received from the broker system that a hold has been placed on the first resource for the first requester and/or the first resource has been marked as sold for the first requester, at least partly causing the first resource to be transferred to the first requester.

52. The system as defined in claim 51, the operations further comprising,
causing at least in part a first resource request to be formatted as an XML message.

53. The system as defined in claim 51, the operations further comprising causing the module to be provided via the resource management system to one or more broker systems.

54. The system as defined in claim 51, the operations further comprises receiving an indication as to whether at least one resource request requested a quantity of resources that exceeds a broker specified maximum of offered resources, wherein the offered resources comprise offered tickets.

55. The system as defined in claim 51, the operations further comprises receiving an indication as to whether at least one resource request requested a quantity of resources that was less than a broker specified minimum of offered resources, wherein the offered resources comprise offered tickets.

56. The system as defined in claim 51, the operations further comprising maintaining a blacklist specified by at least one broker that indicates which potential purchasers are not permitted to obtain resources from the at least one broker.

57. The system as defined in claim 51, the operations further comprising maintaining a blacklist specified by least one broker that indicates by name which potential purchasers are not permitted to obtain resources from the at least one broker.

58. The system as defined in claim 51, the operations further comprising maintaining a blacklist specified by at least one broker that indicates by type of potential purchaser which potential purchasers are not permitted to obtain resources from the at least one broker.

59. The system as defined in claim 51, wherein the request specifies a quantity of resources greater than one.

60. The system as defined in claim 51, the operations further comprising assigning unique resource identifiers to corresponding resources from the first plurality of broker systems.

61. The system as defined in claim 51, wherein the first resource is an event admission voucher.

62. The system as defined in claim 51, the operations further comprising providing a module for the broker system, the updater module configured to perform operations comprising:
  detecting a communication error between the broker system and the resource management system; and
  at least partly in response to detecting the communication error between the broker system and the resource management system, causing at least one software application or setting on the broker system to be automatically updated.

63. The system as defined in claim 51, the operations further comprising:
  providing software that receives an indication as to a configuration change on at least one broker system; and
  at least partly causing the module on the at least one at least one broker system for which an indication of a configuration change has been received to be updated or replaced based at least in part on receiving an indication regarding a first configuration change regarding the at least one broker system.

64. The system as defined in claim 51, the operations further comprising receiving an indication that a software configuration of the broker system has changed.

65. Programmatic code stored in a non-transitory computer readable medium, that when executed by a computing system comprising one or more computing devices is configured to cause the computing system to perform operations comprising:
  receiving a request for a first resource from a first requester at a resource management system, the resource management system coupled to a plurality of broker systems,
  wherein the resource management system is separate from the first plurality of broker systems, and at least one broker system in the first plurality of broker systems maintains a different inventory of resources than another broker system in the first plurality of broker systems, and wherein at least one broker system in the first plurality of broker system utilizes a different message format than at least other broker system in the first plurality of broker systems;
  maintaining a resource data store storing resource identifiers and associated statuses updated in substantially real time based on status data received from the first plurality of broker systems;
  identifying a broker system controlling the first resource using the resource data store;
  identifying a message format that will be understood by the broker system based at least in part on information obtained from a module associated with the broker system;
  formatting a message in accordance with the identified message format, the message including an identifier associated with the first resource and an identifier associated with the first requester, wherein the message instructs the broker system to cause the first resource to be marked as sold and/or on hold;
  transmitting the message over a network to the broker system;
  receiving an indication via the broker system as to whether the broker system has placed a hold on the first resource and/or marked the first resource as sold for the first requester; and
  if an indication is received from the broker system that a hold has been placed on the first resource for the first requester and/or the first resource has been marked as sold for the first requester, at least partly causing the first resource to be transferred to the first requester.

66. The programmatic code as defined in claim 65, the operations further comprising,
  causing at least in part a first resource request to be formatted as an XML message.

67. The programmatic code as defined in claim 65, the operations further comprising causing the module to be provided via the resource management system to one or more broker systems.

68. The programmatic code as defined in claim 65, the operations further comprises receiving an indication as to whether at least one resource request requested a quantity of resources that exceeds a broker specified maximum of offered resources, wherein the offered resources comprise offered tickets.

69. The programmatic code as defined in claim 65, the operations further comprises receiving an indication as to whether at least one resource request requested a quantity of resources that was less than a broker specified minimum of offered resources, wherein the offered resources comprise offered tickets.

70. The programmatic code as defined in claim 65, the operations further comprising maintaining a blacklist specified by at least one broker that indicates which potential purchasers are not permitted to obtain resources from the at least one broker.

71. The programmatic code as defined in claim 65, the operations further comprising maintaining a blacklist specified by least one broker that indicates by name which potential purchasers are not permitted to obtain resources from the at least one broker.

72. The programmatic code as defined in claim 65, the operations further comprising maintaining a blacklist specified by at least one broker that indicates by type of potential purchaser which potential purchasers are not permitted to obtain resources from the at least one broker.

73. The programmatic code as defined in claim 65, wherein the request specifies a quantity of resources greater than one.

74. The programmatic code as defined in claim 65, the operations further comprising assigning unique resource identifiers to corresponding resources from the first plurality of broker systems.

75. The programmatic code as defined in claim 65, wherein the first resource is an event admission voucher.

76. The programmatic code as defined in claim 65, the operations further comprising providing a module for the broker system, the updater module configured to perform operations comprising:
- detecting a communication error between the broker system and the resource management system; and
- at least partly in response to detecting the communication error between the broker system and the resource management system, causing at least one software application or setting on the broker system to be automatically updated.

77. The programmatic code as defined in claim 65, the operations further comprising:
- providing software that receives an indication as to a configuration change on at least one broker system; and
- at least partly causing the module on the broker system to be updated or replaced based at least in part on receiving an indication regarding a first configuration change of the broker system.

78. The programmatic code as defined in claim 65, the operations further comprising receiving an indication that a software configuration of the broker system has changed.

* * * * *

UNITED STATES PATENT AND TRADEMARK OFFICE
CERTIFICATE OF CORRECTION

PATENT NO. : 8,126,991 B2
APPLICATION NO. : 12/204648
DATED : February 28, 2012
INVENTOR(S) : Michael Smith et al.

It is certified that error appears in the above-identified patent and that said Letters Patent is hereby corrected as shown below:

On the Title page:

(Item 75), Inventors, line 1, Change "Paletine, IL" for Michael Smith to --Palatine, IL--.

(Item 56), Page 2, Col. 2, line 10, Under Other Publications, change "In" to --In,--.

(Item 56), Page 2, Col. 2, line 20 Under Other Publications, change "Internate" to --Internet--.

(Item 56), Page 2, Col. 2, line 21, Under Other Publications, change "Univiersity" to --University--.

(Item 56), Page 2, Col. 2, line 44, Under Other Publications, change "Xchange" to --Exchange--.

(Item 56), Page 2, Col. 2, line 57, Under Other Publications, change ""WBGH" to --"WGBH--.

(Item 56), Page 3, Col. 1, line 29, Under Other Publications, change "Feb. 20," to --(Feb. 20,--.

(Item 56), Page 3, Col. 2, line 37, Under Other Publications, change "retreived" to --retrieved--.

(Item 56), Page 3, Col. 2, line 39, Under Other Publications, change "wwwSeasonTicket.com" to --www.SeasonTicket.com--.

(Item 56), Page 3, Col. 2, line 39, Under Other Publications, change "retreived" to --retrieved--.

In the Specifications:

Column 3, line 46, After "specified by" insert --at--.

Column 11, line 4, Change "(IPS)," to --(IPX),--.

Signed and Sealed this
Tenth Day of July, 2012

David J. Kappos
*Director of the United States Patent and Trademark Office*

CERTIFICATE OF CORRECTION (continued)
U.S. Pat. No. 8,126,991 B2

Column 20, line 31, Change "Date/time" to --Date/time;--.

Column 22, line 36, Change "mode" to --made--.

In the Claims:

Column 29, line 26, In Claim 7, after "specified by" insert --at--.

Column 31, line 54, In Claim 33, after "configuration" delete "or a".

Column 35, line 2, In Claim 57, after "specified by" insert --at--.

Column 35, line 36 (Approx.), In Claim 63, after "module on the" delete "at least one".

Column 36, line 52 (Approx.), In Claim 71, after "specified by" insert --at--.

(12) EX PARTE REEXAMINATION CERTIFICATE (9750th)
United States Patent
Smith et al.

(10) Number: US 8,126,991 C1
(45) Certificate Issued: Jul. 16, 2013

(54) METHODS AND SYSTEMS FOR VALIDATING REAL TIME NETWORK COMMUNICATIONS

(75) Inventors: Michael Smith, Palatine, IL (US); Frank Giannantonio, Verona, WI (US)

(73) Assignee: Ticketmaster, L.L.C.

Reexamination Request:
No. 90/012,339, Jul. 23, 2012

Reexamination Certificate for:
Patent No.: 8,126,991
Issued: Feb. 28, 2012
Appl. No.: 12/204,648
Filed: Sep. 4, 2008

Certificate of Correction issued Jul. 10, 2012

Related U.S. Application Data

(60) Provisional application No. 60/969,884, filed on Sep. 4, 2007.

(51) Int. Cl.
*G06F 15/177* (2006.01)

(52) U.S. Cl.
USPC ......................................................... 709/222

(58) Field of Classification Search
None
See application file for complete search history.

(56) References Cited

To view the complete listing of prior art documents cited during the proceeding for Reexamination Control Number 90/012,339, please refer to the USPTO's public Patent Application Information Retrieval (PAIR) system under the Display References tab.

*Primary Examiner* — Adam Basehoar

(57) ABSTRACT

Methods and systems for managing network communications are described. An example resource management system includes a communications manager configured to access information regarding communication protocols used by corresponding broker systems and to provide message translations based on an origin and/or destination of the message to be transmitted. A message processor is coupled to the communications manager and is configured to serialize incoming and/or outgoing broker messages and to facilitate queuing of incoming and outgoing message traffic with broker systems. A communications configurer is configured to track one or more communication attributes of broker systems and changes thereto to ensure communications between the resource management systems are broker systems are conducted in accordance with the communication attributes of the broker systems. A communications rules provider is configured to determine which broker system is to be communicated with in order to fulfill a resource request.

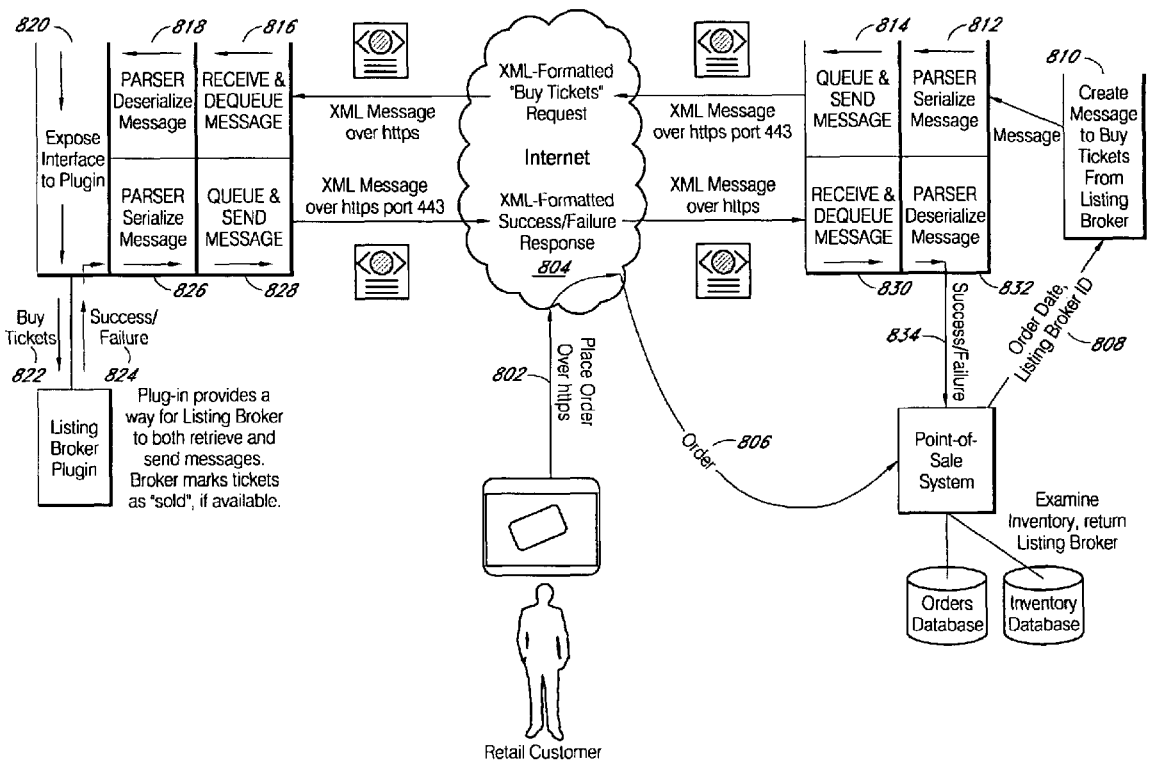

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 17 is cancelled.

Claims 1-8, 10, 13-16, 21, 25, 26, 30-33, 35-49, 51, 52, 54, 55, 63-69, 77 and 78 are determined to be patentable as amended.

Claims 9, 11, 12, 18-20, 22-24, 27-29, 34, 50, 53, 56-62 and 70-76, dependent on an amended claim, are determined to be patentable.

New claims 79-144 are added and determined to be patentable.

1. A method for managing network communications, comprising:
   receiving a request for a first resource from a first requester at a resource management system, the resource management system coupled to a first plurality of broker systems,
   wherein the resource management system is separate from the first plurality of broker systems,
   wherein at least one broker system in the first plurality of broker systems is operated by a different entity than an entity operating the resource management system, and at least one broker system in the first plurality of broker systems maintains a different inventory of resources than another broker system in the first plurality of broker systems, and
   wherein at least one broker system in the first plurality of broker system utilizes a different message format than at least other broker system in the first plurality of broker systems;
   maintaining a resource data store storing resource identifiers and associated statuses updated in substantially real time based on status data received from the first plurality of broker systems;
   identifying a first broker system in the first plurality of broker systems controlling the first resource using the resource data store;
   identifying a message format that will be understood by the first broker system based at least in part on information obtained from a module associated with the first broker system;
   formatting a message in accordance with the identified message format of the first broker system, the message including an identifier associated with the first resource and an identifier associated with the first requester, wherein the message is configured to cause, at least in part, the first resource to be marked as sold and/or on hold by the first broker system;
   at least partly causing the message to be serialized, wherein the serialized message is transmitted over a network to the first broker system;
   receiving [an] *a first* indication via the first broker system as to whether the first broker system has placed a hold on the first resource and/or marked the first resource as sold for the first requester; [and]
   if [an] *the first* is received from the first broker system that a hold has been placed on the first resource for the first requester and/or the first resource has been marked as sold for the first requester, at least partly causing the first resource to be transferred to the first requester;
   *monitoring a communication status with the first plurality of broker systems; and*
   *if the communication status of a given broker system is determined to be unsatisfactory, storing a second indication that the status of resources managed by the given broker system is not reliable and inhibiting the offering of resources from the given broker system.*

2. The method as defined in claim 1, the method further comprising[.]*:*
   causing at least in part a first resource request to be formatted as an XML message.

3. The method as defined in claim 1, the method further comprising*:*
   causing the module to be provided via the resource management system to one or more broker systems.

4. The method as defined in claim 1, the method further [comprises] *comprising:*
   receiving [an] *a third* indication as to whether at least one resource request requested a quantity of resources that exceeds a broker specified maximum of offered resources, wherein the offered resources are offered tickets.

5. The method as defined in claim 1, the method further [comprises] *comprising:*
   receiving [an] *a third* indication as to whether at least one resource request requested a quantity of resources that was less than a broker specified minimum of offered resources, wherein the offered resources are offered tickets.

6. The method as defined in claim 1, the method further comprising*:*
   maintaining a blacklist specified by at least one broker that indicates which potential purchasers are not permitted to obtain resources from the at least one broker.

7. The method as defined in claim 1, the method further comprising*:*
   maintaining a blacklist specified by at least one broker that indicates by name which potential purchasers are not permitted to obtain resources from the at least one broker.

8. The method as defined in claim 1, the method further comprising*:*
   maintaining a blacklist specified by at least one broker that indicates by type of potential purchaser which potential purchasers are not permitted to obtain resources from the at least one broker.

10. The method as defined in claim 1, the method further comprising*:*
    assigning unique resource identifiers to corresponding resources from the first plurality of broker systems.

13. The method as defined in claim 1, the method further comprising:
    providing software that receives [an] *a third* indication as to a configuration change on at least one broker system; and
    at least partly causing the module associated with the first broker system to be updated or replaced based at least in part on receiving [an] *the third* indication regarding a first configuration change of the first broker system.

14. The method as defined in claim 1, the method further comprising:
receiving [an] *a third* indication that a software configuration of the first broker system has changed.

15. A method for managing network communications, comprising:
receiving at a resource management system over a network from a first plurality of broker systems substantially real-time status information regarding resources managed by respective broker systems in the first plurality of broker systems,
wherein the resource management system is separate from the first plurality of broker systems,
wherein at least one broker system in the first plurality of broker systems is operated by a different entity than an entity operating the resource management system, and at least one broker system in the first plurality of broker systems maintains a different inventory of resources than another broker system in the first plurality of broker systems;
maintaining a resource data store storing resource identifiers and associated real-time status information;
receiving a request for a first resource from a first requester at the resource management system;
identifying a first broker system in the first plurality of broker systems controlling the first resource using the resource data store;
formatting a message including an identifier associated with the first resource and an identifier associated with the first requester;
transmitting the message over the network to the first broker system;
receiving [an] *a first* indication from the first broker system as to whether the first resource has been reserved for the first requester; [and]
if [an] *the first* indication is received from the first broker system that the first resource has been reserved for the first requester, facilitating the transfer of the first resource to the first requester;
*monitoring a communication status with the first plurality of broker systems; and*
*if the communication status of a given broker system is determined to be unsatisfactory, storing a second indication that the status of resources managed by the given broker system is not reliable and inhibiting the offering of resources from the given broker system.*

16. The method as defined in claim 15, *the method further comprising:*
transmitting code configured to execute on the first broker system, wherein the code is configured to store an indication that a specified ticket is sold in response to a communication from the resource management system.

21. The method as defined in claim 15, the method further comprising:
assigning unique resource identifiers to corresponding resources from the first plurality of broker systems.

25. The method as defined in claim 15, the method further comprising:
providing an updater module for the first broker system, the updater module configured to perform operations comprising:
detecting a communication error between the first broker system and the resource management system; and
at least partly in response to detecting the communication error between the first broker system and the resource management system, causing at least one software application or setting on the first broker system to be automatically updated.

26. The method as defined in claim 15, the method further comprising:
receiving [an] *a third* indication that a software configuration of the first broker system has changed.

30. The method as defined in claim 15, the method further comprising:
processing at least one response to a resource request for a ticket from at least one broker system indicating that seats corresponding to the at least one request are contiguous.

31. The method as defined in claim 15, the method further comprising:
processing at least one response to a resource request for a ticket from at least one broker system indicating a ticket ship date.

32. The method as defined in claim 15, the method further comprising:
processing at least one response to a resource request for a ticket from at least one broker system indicating an order cross reference identifier.

33. The method as defined in claim 15, the method further comprising:
automatically tracking the configuration of the first plurality of broker systems; and
facilitating the provision of software updates to one or more of the first plurality of broker systems at least partly based on configuration changes of the one or more of the first plurality of broker systems.

35. The method as defined in claim 15, the method further comprising:
providing information regarding:
[the] *a* percentage and/or number of brokers available to accept ticket orders; and
[the] *a* percentage and/or number of brokers that have not reported information regarding their ticket inventory for one or more specified periods of time.

36. The method as defined in claim 15, the method further comprising:
providing information regarding:
[the] *a* percentage and/or number of brokers that have not upgraded a first software to a first software version; and
[the] *a* number of brokers utilizing a first version of the first software.

37. The method as defined in claim 15, the method further comprising:
providing information regarding:
a unique identifier associated with a first broker associated with the first broker system; and
a time the first broker system last connected to and/or provided an inventory updates to the resource management system.

38. The method as defined in claim 15, *the method* further comprising:
[provide] *providing* a report indicating the percent of tickets sold in a specified time period using a specified process.

39. The method as defined in claim 15, *the method* further comprising:
[provide] *providing* a report indicating the percent of an inventory of tickets that is eligible to be sold using a specified process.

40. The method as defined in claim 15, *the method* further comprising:

providing a report indicating the success rate for at least a portion of the first plurality of brokers relating to completion of ticket transactions.

41. The method as defined in claim 15, *the method* further comprising:
[provide] *providing* a report indicating an amount of time that a given broker is connected to the management system.

42. Programmatic code stored on a non-transitory computer readable medium, that when executed by a computing system comprising one or more computing devices is configured to cause the computing system perform operations comprising:
[receive] *receiving* from a first plurality of broker systems substantially real-time status information regarding resources managed by the first plurality of broker systems,
wherein at least one broker system in the first plurality of broker systems is separate from at least one other broker system in the first plurality of broker systems, and at least one broker system in the first plurality of broker systems uses a different message format than at least one other broker system in the first plurality of broker systems, and at least one broker system in the first plurality of broker systems maintains a different inventory of resources than another broker system in the first plurality of broker systems;
[maintain] *maintaining* a resource data store storing resource identifiers and associated real-time status information;
[receive] *receiving* a request for a first resource from a first requester;
[identify] *identifying* a first broker system controlling the first resource using the resource data store;
[generate] *generating* a message including an identifier associated with the first resource and an identifier associated with the first requester;
[transmit] *transmitting* the message to the first broker system;
[receive an] *receiving a first* indication as to whether the first broker system has made available the first resource to the first requester; [and]
if [an] *the first* indication is received from the first broker system that the first broker system has made available the first resource to the first requester, [facilitate] *facilitating* the transfer of the first resource to the first requester;
*monitoring a communication status with the first plurality of broker systems; and*
*if the communication status of a given broker system is determined to be unsatisfactory, storing a second indication that the status of resources managed by the given broker system is not reliable and inhibiting the offering of resources from the given broker system.*

43. The programmatic code as defined in claim 42, wherein the programmatic code is further configured to cause the computing system to perform operations comprising: [process] *processing* at least one response to a resource request for at least one ticket from at least one broker system indicating that seats corresponding to the at least one resource request for at least one ticket are contiguous.

44. The programmatic code as defined in claim 42, wherein the programmatic code is further configured to cause the computing system to perform operations comprising: [process] *processing* at least one response to a resource request for a ticket from at least one broker system indicating a ticket ship date.

45. The programmatic code as defined in claim 42, wherein the programmatic code is further configured to cause the computing system to perform operations comprising: [process] *processing* at least one response to a resource request for a ticket from at least one broker system indicating an order cross reference identifier.

46. The programmatic code as defined in claim 42, wherein the programmatic code is further configured to cause the computing system to perform operations comprising: automatically [track] *tracking* the configuration of the first plurality of broker systems and facilitate the provision of software updates to one or more of the first plurality of broker systems at least partly based on configuration changes of the one or more of the first plurality of broker systems.

47. The programmatic code as defined in claim 42, wherein the programmatic code is further configured to cause the computing system to perform operations comprising:
[to store] *storing* a plurality of rules defined by one or more brokers;
[receive] *receiving* a second request from a second requester for a second resource, wherein the second requester is a broker;
[identify] *identifying* a second ticket broker that controls the second resource;
[access] *accessing* a rule defined by the second broker, wherein the second broker defined rule indicates whether the second broker will approve an order from another broker; and
[apply] *applying* the second broker rule to the second request.

48. The programmatic code as defined in claim 42, wherein the programmatic code is further configured to cause the computing system to perform operations comprising:
[provide] *providing* information regarding:
[the] *a* percentage and/or number of brokers available to accept ticket orders; and
[the] *a* percentage and/or number of brokers that have not reported information regarding their ticket inventory for one or more specified periods of time.

49. The programmatic code as defined in claim 42, wherein the programmatic code is further configured to cause the computing system to perform operations comprising:
[provide] *providing* information regarding:
[the] *a* percentage and/or number of brokers that have not upgraded a first software to a first software version; and
[the] *a* number of brokers utilizing a first version of the first software.

51. A system for managing network communications, comprising:
a computing device;
programmatic code stored in a non-transitory computer readable medium, that when executed by a computing system comprising one or more computing devices is configured to cause the computing system to perform operations comprising:
receiving a request for a first resource from a first requester at a resource management system, the resource management system coupled to a first plurality of broker systems wherein at least one broker system in the first plurality of broker systems is separate from at least one other broker system in the first plurality of broker systems, and at least one broker system in the first plurality of broker systems uses a different message format than at least one other broker system in the first plurality of broker systems, and at least one broker system in the first plurality of broker systems maintains a different inventory of resources than another broker system in the first plurality of broker systems;

maintaining a resource data store storing resource identifiers and associated statuses updated in substantially real time based on status data received from the first plurality of broker systems;

identifying a broker system controlling the first resource using the resource data store;

identifying a message format that will be understood by the broker system based at least in part on information obtained from a module associated with the broker system;

formatting a message in accordance with the identified message format, the message including an identifier associated with the first resource and an identifier associated with the first requester, wherein the message instructs the broker system to cause the first resource to be marked as sold and/or on hold;

transmitting the message over a network to the broker system;

receiving [an] *a first* indication via the broker system as to whether the broker system has placed a hold on the first resource and/or marked the first resource as sold for the first requester; [and]

if [an] *the first* indication is received from the broker system that a hold has been placed on the first resource for the first requester and/or the first resource has been marked as sold for the first requester, at least partly causing the first resource to be transferred to the first requester;

*monitoring a communication status with the first plurality of broker systems; and*

*if the communication status of a given broker system is determined to be unsatisfactory, storing a second indication that the status of resources managed by the given broker system is not reliable and inhibiting the offering of resources from the given broker system.*

52. The system as defined in claim 51, the operations further comprising[.]*:* causing at least in part a first resource request to be formatted as an XML message.

54. The system as defined in claim 51, the operations further [comprises] *comprising* receiving [an] *a third* indication as to whether at least one resource request requested a quantity of resources that exceeds a broker specified maximum of offered resources, wherein the offered resources comprise offered tickets.

55. The system as defined in claim 51, the operations further [comprises] *comprising* receiving [an] *a third* indication as to whether at least one resource request requested a quantity of resources that was less than a broker specified minimum of offered resources, wherein the offered resources comprise offered tickets.

63. The system as defined in claim 51, the operations further comprising:

providing software that receives [an] *a third* indication as to a configuration change on at least one broker system; and at least partly causing the module on the at least one broker system for which [an] *the third* indication of a configuration change has been received to be updated or replaced based at least in part on receiving [an] *the third* indication regarding a first configuration change regarding the at least one broker system.

64. The system as defined in claim 51, the operations further comprising receiving [an] *a third* indication that a software configuration of the broker system has changed.

65. Programmatic code stored in a non-transitory computer readable medium, that when executed by a computing system comprising one or more computing devices is configured to cause the computing system to perform operations comprising:

receiving a request for a first resource from a first requester at a resource management system, the resource management system coupled to a plurality of broker systems, wherein the resource management system is separate from the first plurality of broker systems, and at least one broker system in the first plurality of broker systems maintains a different inventory of resources than another broker system in the first plurality of broker systems, and wherein at least one broker system in the first plurality of broker system utilizes a different message format than at least other broker system in the first plurality of broker systems;

maintaining a resource data store storing resource identifiers and associated statuses updated in substantially real time based on status data received from the first plurality of broker systems;

identifying a broker system controlling the first resource using the resource data store;

identifying a message format that will be understood by the broker system based at least in part on information obtained from a module associated with the broker system;

formatting a message in accordance with the identified message format, the message including an identifier associated with the first resource and an identifier associated with the first requester, wherein the message instructs the broker system to cause the first resource to be marked as sold and/or on hold;

transmitting the message over a network to the broker system;

receiving [an] *a first* indication via the broker system as to whether the broker system has placed a hold on the first resource and/or marked the first resource as sold for the first requester; [and]

if [an] *the first* indication is received from the broker system that a hold has been placed on the first resource for the first requester and/or the first resource has been marked as sold for the first requester, at least partly causing the first resource to be transferred to the first requester;

*monitoring a communication status with the first plurality of broker systems; and*

*if the communication status of a given broker system is determined to be unsatisfactory, storing a second indication that the status of resources managed by the given broker system is not reliable and inhibiting the offering of resources from the given broker system.*

66. The programmatic code as defined in claim 65, the operations further comprising[.]*:* causing at least in part a first resource request to be formatted as an XML message.

67. The programmatic code as defined in claim 65, the operations further comprising*:* causing the module to be provided via the resource management system to one or more broker systems.

68. The programmatic code as defined in claim 65, the operations further [comprises] *comprising* receiving [an] *a third* indication as to whether at least one resource request requested a quantity of resources that exceeds a broker specified maximum of offered resources, wherein the offered resources comprise offered tickets.

69. The programmatic code as defined in claim 65, the operations further [comprises] *comprising* receiving [an] *a third* indication as to whether at least one resource request requested a quantity of resources that was less than a broker specified minimum of offered resources, wherein the offered resources comprise offered tickets.

77. The programmatic code as defined in claim 65, the operations further comprising:
providing software that receives [an] *a third* indication as to a configuration change on at least one broker system; and
at least partly causing the module on the broker system to be updated or replaced based at least in part on receiving [an] *a third* indication regarding a first configuration change of the broker system.

78. The programmatic code as defined in claim 65, the operations further comprising receiving [an] *a third* indication that a software configuration of the broker system has changed.

79. *A method for managing network communications, comprising:*
*receiving a request for a first resource from a first requester at a resource management system, the resource management system coupled to a first plurality of broker systems,*
*wherein the resource management system is separate from the first plurality of broker systems,*
*wherein at least one broker system in the first plurality of broker systems is operated by a different entity than an entity operating the resource management system, and at least one broker system in the first plurality of broker systems maintains a different inventory of resources than another broker system in the first plurality of broker systems, and*
*wherein at least one broker system in the first plurality of broker system utilizes a different message format than at least other broker system in the first plurality of broker systems;*
*maintaining a resource data store storing resource identifiers and associated statuses updated in substantially real time based on status data received from the first plurality of broker systems;*
*identifying a first broker system in the first plurality of broker systems controlling the first resource using the resource data store;*
*identifying a message format that will be understood by the first broker system based at least in part on information obtained from a module associated with the first broker system;*
*formatting a message in accordance with the identified message format of the first broker system, the message including an identifier associated with the first resource and an identifier associated with the first requester, wherein the message is configured to cause, at least in part, the first resource to be marked as sold and/or on hold by the first broker system;*
*at least partly causing the message to be serialized, wherein the serialized message is transmitted over a network to the first broker system;*
*receiving an indication via the first broker system as to whether the first broker system has placed a hold on the first resource and/or marked the first resource as sold for the first requester;*
*if the indication is received from the first broker system that a hold has been placed on the first resource for the first requester and/or the first resource has been marked as sold for the first requester, at least partly causing the first resource to be transferred to the first requester; and*
*providing an auto-updater module for the first broker system, the auto-updater module configured to perform operations comprising:*
*detecting a communication error between the first broker system and the resource management system; and*
*at least partly in response to detecting the communication error between the first broker system and the resource management system, causing at least one software application or setting on the first broker system to be automatically updated.*

80. *The method as defined in claim 79, the method further comprising:*
*causing the module to be provided via the resource management system to one or more broker systems.*

81. *The method as defined in claim 79, the method further comprising:*
*receiving a second indication as to whether at least one resource request requested a quantity of resources that exceeds a broker specified maximum of offered resources, wherein the offered resources are offered tickets.*

82. *The method as defined in claim 79, the method further comprising maintaining a blacklist specified by at least one broker that indicates which potential purchasers are not permitted to obtain resources from the at least one broker.*

83. *The method as defined in claim 79, the method further comprising:*
*assigning unique resource identifiers to corresponding resources from the first plurality of broker systems.*

84. *The method as defined in claim 79, wherein the first resource is an event admission voucher.*

85. *The method as defined in claim 79, the method further comprising:*
*receiving a second indication that a software configuration of the first broker system has changed.*

86. *A system for managing network communications, comprising:*
*a computing device;*
*programmatic code stored in a non-transitory computer readable medium, that when executed by a computing system comprising one or more computing devices is configured to cause the computing system to perform operations comprising:*
*receiving a request for a first resource from a first requester at a resource management system, the resource management system coupled to a first plurality of broker systems wherein at least one broker system in the first plurality of broker systems is separate from at least one other broker system in the first plurality of broker systems, and at least one broker system in the first plurality of broker systems uses a different message format than at least one other broker system in the first plurality of broker systems, and at least one broker system in the first plurality of broker systems maintains a different inventory of resources than another broker system in the first plurality of broker systems;*
*maintaining a resource data store storing resource identifiers and associated statuses updated in substantially real time based on status data received from the first plurality of broker systems;*
*identifying a broker system controlling the first resource using the resource data store;* identifying a message format that will be understood by the broker system based at least in part on information obtained from a module associated with the broker system;

formatting a message in accordance with the identified message format, the message including an identifier associated with the first resource and an identifier associated with the first requester, wherein the message instructs the broker system to cause the first resource to be marked as sold and/or on hold;

transmitting the message over a network to the broker system;

receiving an indication via the broker system as to whether the broker system has placed a hold on the first resource and/or marked the first resource as sold for the first requester;

if the indication is received from the broker system that a hold has been placed on the first resource for the first requester and/or the first resource has been marked as sold for the first requester, at least partly causing the first resource to be transferred to the first requester; and providing an auto-updater module for the broker system, the auto-updater module configured to perform operations comprising:
  detecting a communication error between the broker system and the resource management system; and
  at least partly in response to detecting the communication error between the broker system and the resource management system, causing at least one software application or setting on the broker system to be automatically updated.

87. The system as defined in claim 86, the operations further comprising causing the module to be provided via the resource management system to one or more broker systems.

88. The system as defined in claim 86, the operations further comprising receiving a second indication as to whether at least one resource request requested a quantity of resources that exceeds a broker specified maximum of offered resources, wherein the offered resources comprise offered tickets.

89. The system as defined in claim 86, the operations further comprising maintaining a blacklist specified by at least one broker that indicates which potential purchasers are not permitted to obtain resources from the at least one broker.

90. The system as defined in claim 86, the operations further comprising assigning unique resource identifiers to corresponding resources from the first plurality of broker systems.

91. The system as defined in claim 86, wherein the first resource is an event admission voucher.

92. The system as defined in claim 86, the operations further comprising receiving a second indication that a software configuration of the broker system has changed.

93. Programmatic code stored in a non-transitory computer readable medium, that when executed by a computing system comprising one or more computing devices is configured to cause the computing system to perform operations comprising:
  receiving a request for a first resource from a first requester at a resource management system, the resource management system coupled to a plurality of broker systems, wherein the resource management system is separate from the first plurality of broker systems, and at least one broker system in the first plurality of broker systems maintains a different inventory of resources than another broker system in the first plurality of broker systems, and wherein at least one broker system in the first plurality of broker system utilizes a different message format than at least other broker system in the first plurality of broker systems;

maintaining a resource data store storing resource identifiers and associated statuses updated in substantially real time based on status data received from the first plurality of broker systems;

identifying a broker system controlling the first resource using the resource data store;

identifying a message format that will be understood by the broker system based at least in part on information obtained from a module associated with the broker system;

formatting a message in accordance with the identified message format, the message including an identifier associated with the first resource and an identifier associated with the first requester, wherein the message instructs the broker system to cause the first resource to be marked as sold and/or on hold;

transmitting the message over a network to the broker system;

receiving an indication via the broker system as to whether the broker system has placed a hold on the first resource and/or marked the first resource as sold for the first requester;

if the indication is received from the broker system that a hold has been placed on the first resource for the first requester and/or the first resource has been marked as sold for the first requester, at least partly causing the first resource to be transferred to the first requester; and providing an auto-updater module for the broker system, the auto-updater module configured to perform operations comprising:
    detecting a communication error between the broker system and the resource management system; and
    at least partly in response to detecting the communication error between the broker system and the resource management system, causing at least one software application or setting on the broker system to be automatically updated.

94. The programmatic code as defined in claim 93, the operations further comprising:
  causing the module to be provided via the resource management system to one or more broker systems.

95. The programmatic code as defined in claim 93, the operations further comprising receiving a second indication as to whether at least one resource request requested a quantity of resources that exceeds a broker specified maximum of offered resources, wherein the offered resources comprise offered tickets.

96. The programmatic code as defined in claim 93, the operations further comprising maintaining a blacklist specified by at least one broker that indicates which potential purchasers are not permitted to obtain resources from the at least one broker.

97. The programmatic code as defined in claim 93, the operations further comprising assigning unique resource identifiers to corresponding resources from the first plurality of broker systems.

98. The programmatic code as defined in claim 93, the operations further comprising receiving a second indication that a software configuration of the broker system has changed.

99. A method for managing network communications, comprising:

receiving a request for a first resource from a first requester at a resource management system, the resource management system coupled to a first plurality of broker systems, wherein the resource management system is separate from the first plurality of broker systems, wherein at least one broker system in the first plurality of broker systems is operated by a different entity than an entity operating the resource management system, and at least one broker system in the first plurality of broker systems maintains a different inventory of resources than another broker system in the first plurality of broker systems, and wherein at least one broker system in the first plurality of broker system utilizes a different message format than at least other broker system in the first plurality of broker systems;

maintaining a resource data store storing resource identifiers and associated statuses updated in substantially real time based on status data received from the first plurality of broker systems;

identifying a first broker system in the first plurality of broker systems controlling the first resource using the resource data store;

identifying a message format that will be understood by the first broker system based at least in part on information obtained from a module associated with the first broker system;

formatting a message in accordance with the identified message format of the first broker system, the message including an identifier associated with the first resource and an identifier associated with the first requester, wherein the message is configured to cause, at least in part, the first resource to be marked as sold and/or on hold by the first broker system;

at least partly causing the message to be serialized, wherein the serialized message is transmitted over a network to the first broker system;

receiving a first indication via the first broker system as to whether the first broker system has placed a hold on the first resource and/or marked the first resource as sold for the first requester;

if the first indication is received from the first broker system that a hold has been placed on the first resource for the first requester and/or the first resource has been marked as sold for the first requester, at least partly causing the first resource to be transferred to the first requester;

providing software that receives a second indication as to a configuration change on at least one broker system; and at least partly causing the module associated with the first broker system to be updated or replaced based at least in part on receiving the second indication regarding a first configuration change of the first broker system.

100. The method as defined in claim 99, the method further comprising:
causing at least in part a first resource request to be formatted as an XML message.

101. The method as defined in claim 99, the method further comprising:
causing the module to be provided via the resource management system to one or more broker systems.

102. The method as defined in claim 99, the method further comprising:
receiving a third indication as to whether at least one resource request requested a quantity of resources that exceeds a broker specified maximum of offered resources, wherein the offered resources are offered tickets.

103. The method as defined in claim 99, the method further comprising:
maintaining a blacklist specified by at least one broker that indicates which potential purchasers are not permitted to obtain resources from the at least one broker.

104. The method as defined in claim 99, the method further comprising:
assigning unique resource identifiers to corresponding resources from the first plurality of broker systems.

105. The method as defined in claim 99, wherein the first resource is an event admission voucher.

106. A system for managing network communications, comprising:
a computing device;
programmatic code stored in a non-transitory computer readable medium, that when executed by a computing system comprising one or more computing devices is configured to cause the computing system to perform operations comprising:
receiving a request for a first resource from a first requester at a resource management system, the resource management system coupled to a first plurality of broker systems wherein at least one broker system in the first plurality of broker systems is separate from at least one other broker system in the first plurality of broker systems, and at least one broker system in the first plurality of broker systems uses a different message format than at least one other broker system in the first plurality of broker systems, and at least one broker system in the first plurality of broker systems maintains a different inventory of resources than another broker system in the first plurality of broker systems;

maintaining a resource data store storing resource identifiers and associated statuses updated in substantially real time based on status data received from the first plurality of broker systems;

identifying a broker system controlling the first resource using the resource data store;

identifying a message format that will be understood by the broker system based at least in part on information obtained from a module associated with the broker system;

formatting a message in accordance with the identified message format, the message including an identifier associated with the first resource and an identifier associated with the first requester, wherein the message instructs the broker system to cause the first resource to be marked as sold and/or on hold;

transmitting the message over a network to the broker system;

receiving a first indication via the broker system as to whether the broker system has placed a hold on the first resource and/or marked the first resource as sold for the first requester;

if the first indication is received from the broker system that a hold has been placed on the first resource for the first requester and/or the first resource has been marked as sold for the first requester, at least partly causing the first resource to be transferred to the first requester;

providing software that receives a second indication as to a configuration change on at least one broker system; and at least partly causing the module associated with the broker system to be updated or replaced based at least in part on receiving the second indication regarding a first configuration change of the broker system.

107. The system as defined in claim 106, the operations further comprising:
causing at least in part a first resource request to be formatted as an XML message.

108. The system as defined in claim 106, the operations further comprising causing the module to be provided via the resource management system to one or more broker systems.

109. The system as defined in claim 106, the operations further comprising receiving a third indication as to whether at least one resource request requested a quantity of resources that exceeds a broker specified maximum of offered resources, wherein the offered resources comprise offered tickets.

110. The system as defined in claim 106, the operations further comprising maintaining a blacklist specified by at least one broker that indicates which potential purchasers are not permitted to obtain resources from the at least one broker.

111. The system as defined in claim 106, the operations further comprising assigning unique resource identifiers to corresponding resources from the first plurality of broker systems.

112. The system as defined in claim 106, wherein the first resource is an event admission voucher.

113. Programmatic code stored in a non-transitory computer readable medium, that when executed by a computing system comprising one or more computing devices is configured to cause the computing system to perform operations comprising:
receiving a request for a first resource from a first requester at a resource management system, the resource management system coupled to a plurality of broker systems, wherein the resource management system is separate from the first plurality of broker systems, and at least one broker system in the first plurality of broker systems maintains a different inventory of resources than another broker system in the first plurality of broker systems, and
wherein at least one broker system in the first plurality of broker system utilizes a different message format than at least other broker system in the first plurality of broker systems;
maintaining a resource data store storing resource identifiers and associated statuses updated in substantially real time based on status data received from the first plurality of broker systems;
identifying a broker system controlling the first resource using the resource data store;
identifying a message format that will be understood by the broker system based at least in part on information obtained from a module associated with the broker system;
formatting a message in accordance with the identified message format, the message including an identifier associated with the first resource and an identifier associated with the first requester, wherein the message instructs the broker system to cause the first resource to be marked as sold and/or on hold;
transmitting the message over a network to the broker system;
receiving a first indication via the broker system as to whether the broker system has placed a hold on the first resource and/or marked the first resource as sold for the first requester;
if the first indication is received from the broker system that a hold has been placed on the first resource for the first requester and/or the first resource has been marked as sold for the first requester, at least partly causing the first resource to be transferred to the first requester;
providing software that receives a second indication as to a configuration change on at least one broker system; and
at least partly causing the module associated with the broker system to be updated or replaced based at least in part on receiving the second indication regarding a first configuration change of the broker system.

114. The programmatic code as defined in claim 113, the operations further comprising:
causing at least in part a first resource request to be formatted as an XML message.

115. The programmatic code as defined in claim 113, the operations further comprising:
causing the module to be provided via the resource management system to one or more broker systems.

116. The programmatic code as defined in claim 113, the operations further comprising receiving a third indication as to whether at least one resource request requested a quantity of resources that exceeds a broker specified maximum of offered resources, wherein the offered resources comprise offered tickets.

117. The programmatic code as defined in claim 113, the operations further comprising maintaining a blacklist specified by at least one broker that indicates which potential purchasers are not permitted to obtain resources from the at least one broker.

118. The programmatic code as defined in claim 113, the operations further comprising assigning unique resource identifiers to corresponding resources from the first plurality of broker systems.

119. A method for managing network communications, comprising:
receiving a request for a first resource from a first requester at a resource management system, the resource management system coupled to a first plurality of broker systems,
wherein the resource management system is separate from the first plurality of broker systems,
wherein at least one broker system in the first plurality of broker systems is operated by a different entity than an entity operating the resource management system, and at least one broker system in the first plurality of broker systems maintains a different inventory of resources than another broker system in the first plurality of broker systems, and
wherein at least one broker system in the first plurality of broker system utilizes a different message format than at least other broker system in the first plurality of broker systems;
maintaining a resource data store storing resource identifiers and associated statuses updated in substantially real time based on status data received from the first plurality of broker systems;
identifying a first broker system in the first plurality of broker systems controlling the first resource using the resource data store;
identifying a message format that will be understood by the first broker system based at least in part on information obtained from a module associated with the first broker system;
formatting a message in accordance with the identified message format of the first broker system, the message including an identifier associated with the first resource and an identifier associated with the first requester, wherein the message is configured to cause, at least in part, the first resource to be marked as sold and/or on hold by the first broker system;

at least partly causing the message to be serialized, wherein the serialized message is transmitted over a network to the first broker system;

receiving a first indication via the first broker system as to whether the first broker system has placed a hold on the first resource and/or marked the first resource as sold for the first requester;

if the indication is received from the first broker system that a hold has been placed on the first resource for the first requester and/or the first resource has been marked as sold for the first requester, at least partly causing the first resource to be transferred to the first requester; and receiving a second indication that a software configuration of the first broker system has changed.

120. The method as defined in claim 119, the method further comprising:

causing at least in part a first resource request to be formatted as an XML message.

121. The method as defined in claim 119, the method further comprising:

causing the module to be provided via the resource management system to one or more broker systems.

122. The method as defined in claim 119, the method further comprising:

receiving a third indication as to whether at least one resource request requested a quantity of resources that exceeds a broker specified maximum of offered resources, wherein the offered resources are offered tickets.

123. The method as defined in claim 119, the method further comprising:

maintaining a blacklist specified by at least one broker that indicates which potential purchasers are not permitted to obtain resources from the at least one broker.

124. The method as defined in claim 119, the method further comprising:

assigning unique resource identifiers to corresponding resources from the first plurality of broker systems.

125. The method as defined in claim 119, wherein the first resource is an event admission voucher.

126. A system for managing network communications, comprising:

a computing device;

programmatic code stored in a non-transitory computer readable medium, that when executed by a computing system comprising one or more computing devices is configured to cause the computing system to perform operations comprising:

receiving a request for a first resource from a first requester at a resource management system, the resource management system coupled to a first plurality of broker systems wherein at least one broker system in the first plurality of broker systems is separate from at least one other broker system in the first plurality of broker systems, and at least one broker system in the first plurality of broker systems uses a different message format than at least one other broker system in the first plurality of broker systems, and at least one broker system in the first plurality of broker systems maintains a different inventory of resources than another broker system in the first plurality of broker systems;

maintaining a resource data store storing resource identifiers and associated statuses updated in substantially real time based on status data received from the first plurality of broker systems;

identifying a broker system controlling the first resource using the resource data store;

identifying a message format that will be understood by the broker system based at least in part on information obtained from a module associated with the broker system;

formatting a message in accordance with the identified message format, the message including an identifier associated with the first resource and an identifier associated with the first requester, wherein the message instructs the broker system to cause the first resource to be marked as sold and/or on hold;

transmitting the message over a network to the broker system;

receiving a first indication via the broker system as to whether the broker system has placed a hold on the first resource and/or marked the first resource as sold for the first requester;

if the first indication is received from the broker system that a hold has been placed on the first resource for the first requester and/or the first resource has been marked as sold for the first requester, at least partly causing the first resource to be transferred to the first requester; and receiving a second indication that a software configuration of the broker system has changed.

127. The system as defined in claim 126, the operations further comprising:

causing at least in part a first resource request to be formatted as an XML message.

128. The system as defined in claim 126, the operations further comprising causing the module to be provided via the resource management system to one or more broker systems.

129. The system as defined in claim 126, the operations further comprising receiving a third indication as to whether at least one resource request requested a quantity of resources that exceeds a broker specified maximum of offered resources, wherein the offered resources comprise offered tickets.

130. The system as defined in claim 126, the operations further comprising maintaining a blacklist specified by at least one broker that indicates which potential purchasers are not permitted to obtain resources from the at least one broker.

131. The system as defined in claim 126, the operations further comprising assigning unique resource identifiers to corresponding resources from the first plurality of broker systems.

132. The system as defined in claim 126, wherein the first resource is an event admission voucher.

133. Programmatic code stored in a non-transitory computer readable medium, that when executed by a computing system comprising one or more computing devices is configured to cause the computing system to perform operations comprising:

receiving a request for a first resource from a first requester at a resource management system, the resource management system coupled to a plurality of broker systems, wherein the resource management system is separate from the first plurality of broker systems, and at least one broker system in the first plurality of broker systems maintains a different inventory of resources than another broker system in the first plurality of broker systems, and wherein at least one broker system in the first plurality of broker system utilizes a different message format than at least other broker system in the first plurality of broker systems;
maintaining a resource data store storing resource identifiers and associated statuses updated in substantially real time based on status data received from the first plurality of broker systems;
identifying a broker system controlling the first resource using the resource data store.
identifying a message format that will be understood by the broker system based at least in part on information obtained from a module associated with the broker system;
formatting a message in accordance with the identified message format, the message including an identifier associated with the first resource and an identifier associated with the first requester, wherein the message instructs the broker system to cause the first resource to be marked as sold and/or on hold;
transmitting the message over a network to the broker system;
receiving a first indication via the broker system as to whether the broker system has placed a hold on the first resource and/or marked the first resource as sold for the first requester;
if the first indication is received from the broker system that a hold has been placed on the first resource for the first requester and/or the first resource has been marked as sold for the first requester, at least partly causing the first resource to be transferred to the first requester; and
receiving a second indication that a software configuration of the broker system has changed.

134. The programmatic code as defined in claim 133, the operations further comprising:
causing at least in part a first resource request to be formatted as an XML message.

135. The programmatic code as defined in claim 133, the operations further comprising:
causing the module to be provided via the resource management system to one or more broker systems.

136. The programmatic code as defined in claim 133, the operations further comprising receiving a third indication as to whether at least one resource request requested a quantity of resources that exceeds a broker specified maximum of offered resources, wherein the offered resources comprise offered tickets.

137. The programmatic code as defined in claim 133, the operations further comprising:
maintaining a blacklist specified by at least one broker that indicates which potential purchasers are not permitted to obtain resources from the at least one broker.

138. The programmatic code as defined in claim 133, the operations further comprising assigning unique resource identifiers to corresponding resources from the first plurality of broker systems.

139. A method for managing network communications, comprising:
receiving a request for a first resource from a first requester at a resource management system, the resource management system coupled to a first plurality of broker systems,
wherein the resource management system is separate from the first plurality of broker systems,
wherein at least one broker system in the first plurality of broker systems is operated by a different entity than an entity operating the resource management system, and
at least one broker system in the first plurality of broker systems maintains a different inventory of resources than another broker system in the first plurality of broker systems, and
wherein at least one broker system in the first plurality of broker system utilizes a different message format than at least other broker system in the first plurality of broker systems;
maintaining a resource data store storing resource identifiers and associated statuses updated in substantially real time based on status data received from the first plurality of broker systems;
identifying a first broker system in the first plurality of broker systems controlling the first resource using the resource data store;
identifying a message format that will be understood by the first broker system based at least in part on information obtained from a module associated with the first broker system;
formatting a message in accordance with the identified message format of the first broker system, the message including an identifier associated with the first resource and an identifier associated with the first requester, wherein the message is configured to cause, at least in part, the first resource to be marked as sold and/or on hold by the first broker system;
at least partly causing the message to be serialized, wherein the serialized message is transmitted over a network to the first broker system;
receiving an indication via the first broker system as to whether the first broker system has placed a hold on the first resource and/or marked the first resource as sold for the first requester;
if the indication is received from the first broker system that a hold has been placed on the first resource for the first requester and/or the first resource has been marked as sold for the first requester, at least partly causing the first resource to be transferred to the first requester; and
causing the module to be provided via the resource management system to one or more broker systems.

140. A method for managing network communications, comprising:
receiving at a resource management system over a network from a first plurality of broker systems substantially real-time status information regarding resources managed by respective broker systems in the first plurality of broker systems,
wherein the resource management system is separate from the first plurality of broker systems,
wherein at least one broker system in the first plurality of broker systems is operated by a different entity than an entity operating the resource management system, and at least one broker system in the first plurality of broker systems maintains a different inventory of resources than another broker system in the first plurality of broker systems;
maintaining a resource data store storing resource identifiers and associated real- time status information;
receiving a request for a first resource from a first requester at the resource management system;
identifying a first broker system in the first plurality of broker systems controlling the first resource using the resource data store;
formatting a message including an identifier associated with the first resource and an identifier associated with the first requester;

transmitting the message over the network to the first broker system;
receiving an indication from the first broker system as to whether the first resource has been reserved for the first requester;
if the indication is received from the first broker system that the first resource has been reserved for the first requester, facilitating the transfer of the first resource to the first requester;
automatically tracking the configuration of the first plurality of broker systems; and
facilitating the provision of software updates to one or more of the first plurality of broker systems at least partly based on configuration changes of the one or more of the first plurality of broker systems.

141. A method for managing network communications, comprising:
receiving at a resource management system over a network from a first plurality of broker systems substantially real-time status information regarding resources managed by respective broker systems in the first plurality of broker systems,
wherein the resource management system is separate from the first plurality of broker systems,
wherein at least one broker system in the first plurality of broker systems is operated by a different entity than an entity operating the resource management system, and at least one broker system in the first plurality of broker systems maintains a different inventory of resources than another broker system in the first plurality of broker systems;
maintaining a resource data store storing resource identifiers and associated real-time status information;
receiving a request for a first resource from a first requester at the resource management system;
identifying a first broker system in the first plurality of broker systems controlling the first resource using the resource data store;
formatting a message including an identifier associated with the first resource and an identifier associated with the first requester;
transmitting the message over the network to the first broker system;
receiving an indication from the first broker system as to whether the first resource has been reserved for the first requester;
if the indication is received from the first broker system that the first resource has been reserved for the first requester, facilitating the transfer of the first resource to the first requester;
receiving communication protocol information from a plurality of broker systems, wherein at least one broker system uses a different communication protocol than at least one other broker system;
at least partly based on the received protocol information, identifying a communication protocol associated with the first broker system; and
formatting the message in accordance with the identified protocol and using information related to the identified protocol in determining when a communications error has occurred with respect to the first broker system.

142. A method for managing network communications, comprising:
receiving at a resource management system over a network from a first plurality of broker systems substantially real-time status information regarding resources managed by respective broker systems in the first plurality of broker systems,
wherein the resource management system is separate from the first plurality of broker systems,
wherein at least one broker system in the first plurality of broker systems is operated by a different entity than an entity operating the resource management system, and at least one broker system in the first plurality of broker systems maintains a different inventory of resources than another broker system in the first plurality of broker systems;
maintaining a resource data store storing resource identifiers and associated real-time status information;
receiving a request for a first resource from a first requester at the resource management system;
identifying a first broker system in the first plurality of broker systems controlling the first resource using the resource data store;
formatting a message including an identifier associated with the first resource and an identifier associated with the first requester;
transmitting the message over the network to the first broker system;
receiving an indication from the first broker system as to whether the first resource has been reserved for the first requester;
if the indication is received from the first broker system that the first resource has been reserved for the first requester, facilitating the transfer of the first resource to the first requester; and
providing information regarding:
a percentage and/or number of brokers available to accept ticket orders; and
a percentage and/or number of brokers that have not reported information regarding their ticket inventory for one or more specified periods of time.

143. A method for managing network communications, comprising:
receiving at a resource management system over a network from a first plurality of broker systems substantially real-time status information regarding resources managed by respective broker systems in the first plurality of broker systems,
wherein the resource management system is separate from the first plurality of broker systems,
wherein at least one broker system in the first plurality of broker systems is operated by a different entity than an entity operating the resource management system, and at least one broker system in the first plurality of broker systems maintains a different inventory of resources than another broker system in the first plurality of broker systems;
maintaining a resource data store storing resource identifiers and associated real-time status information;
receiving a request for a first resource from a first requester at the resource management system;
identifying a first broker system in the first plurality of broker systems controlling the first resource using the resource data store;
formatting a message including an identifier associated with the first resource and an identifier associated with the first requester;
transmitting the message over the network to the first broker system;

receiving an indication from the first broker system as to whether the first resource has been reserved for the first requester;

if the indication is received from the first broker system that the first resource has been reserved for the first requester, facilitating the transfer of the first resource to the first requester; and providing information regarding:
- a percentage and/or number of brokers that have not upgraded a first software to a first software version; and
- a number of brokers utilizing a first version of the first software.

144. A method for managing network communications, comprising:

receiving at a resource management system over a network from a first plurality of broker systems substantially real-time status information regarding resources managed by respective broker systems in the first plurality of broker systems, wherein the resource management system is separate from the first plurality of broker systems, wherein at least one broker system in the first plurality of broker systems is operated by a different entity than an entity operating the resource management system, and at least one broker system in the first plurality of broker systems maintains a different inventory of resources than another broker system in the first plurality of broker systems;

maintaining a resource data store storing resource identifiers and associated real-time status information;

receiving a request for a first resource from a first requester at the resource management system;

identifying a first broker system in the first plurality of broker systems controlling the first resource using the resource data store;

formatting a message including an identifier associated with the first resource and an identifier associated with the first requester;

transmitting the message over the network to the first broker system;

receiving an indication from the first broker system as to whether the first resource has been reserved for the first requester;

if the indication is received from the first broker system that the first resource has been reserved for the first requester, facilitating the transfer of the first resource to the first requester; and providing a report indicating an amount of time that a given broker is connected to the management system.

* * * * *

(12) EX PARTE REEXAMINATION CERTIFICATE (10652nd)
United States Patent
Smith et al.

(10) Number: US 8,126,991 C2
(45) Certificate Issued: Jul. 7, 2015

(54) METHODS AND SYSTEMS FOR VALIDATING REAL TIME NETWORK COMMUNICATIONS

(75) Inventors: Michael Smith, Paletine, IL (US); Frank Giannantonio, Verona, WI (US)

(73) Assignee: JPMORGAN CHASE BANK, N.A., Houston, TX (US)

Reexamination Request:
No. 90/013,259, Jun. 4, 2014

Reexamination Certificate for:
Patent No.: 8,126,991
Issued: Feb. 28, 2012
Appl. No.: 12/204,648
Filed: Sep. 4, 2008

Reexamination Certificate C1 8,126,991 issued Jul. 16, 2013

Certificate of Correction issued Jul. 10, 2012

Related U.S. Application Data

(60) Provisional application No. 60/969,884, filed on Sep. 4, 2007.

(51) Int. Cl.
*G06F 15/177* (2006.01)
*G06Q 10/02* (2012.01)
*G06Q 20/20* (2012.01)
*H04L 29/08* (2006.01)
*H04L 12/26* (2006.01)
*G06Q 20/12* (2012.01)

(52) U.S. Cl.
CPC ............... *G06Q 10/02* (2013.01); *G06Q 20/12* (2013.01); *G06Q 20/20* (2013.01); *H04L 43/0817* (2013.01); *H04L 67/10* (2013.01); *H04L 67/2823* (2013.01)

(58) Field of Classification Search
None
See application file for complete search history.

(56) References Cited

To view the complete listing of prior art documents cited during the proceeding for Reexamination Control Number 90/013,259, please refer to the USPTO's public Patent Application Information Retrieval (PAIR) system under the Display References tab.

*Primary Examiner* — Angela M Lie

(57) ABSTRACT

Methods and systems for managing network communications are described. An example resource management system includes a communications manager configured to access information regarding communication protocols used by corresponding broker systems and to provide message translations based on an origin and/or destination of the message to be transmitted. A message processor is coupled to the communications manager and is configured to serialize incoming and/or outgoing broker messages and to facilitate queuing of incoming and outgoing message traffic with broker systems. A communications configurer is configured to track one or more communication attributes of broker systems and changes thereto to ensure communications between the resource management systems are broker systems are conducted in accordance with the communication attributes of the broker systems. A communications rules provider is configured to determine which broker system is to be communicated with in order to fulfill a resource request.

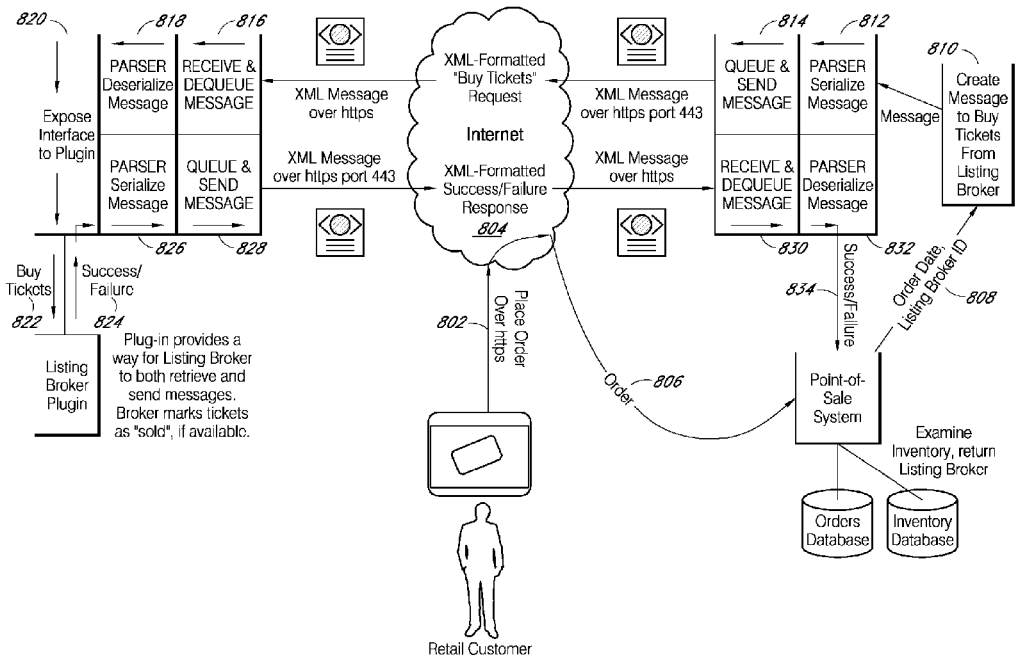

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1-16 and 18-144 is confirmed.
Claim 17 was previously cancelled.

* * * * *